(12) United States Patent
Morad et al.

(10) Patent No.: US 10,996,959 B2
(45) Date of Patent: May 4, 2021

(54) HYBRID PROCESSOR

(71) Applicant: Technion Research and Development Foundation LTD., Haifa (IL)

(72) Inventors: Amir Morad, Tel Aviv (IL); Leonid Yavits, Herzliya (IL); Shahar Kvatinsky, Ramat Gan (IL); Ran Ginosar, Nofit (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 266 days.

(21) Appl. No.: 14/989,880

(22) Filed: Jan. 7, 2016

(65) Prior Publication Data

US 2016/0224465 A1 Aug. 4, 2016

Related U.S. Application Data

(60) Provisional application No. 62/100,967, filed on Jan. 8, 2015.

(51) Int. Cl.
| | |
|---|---|
| *G06F 12/00* | (2006.01) |
| *G06F 9/38* | (2018.01) |
| *G06F 15/167* | (2006.01) |
| *G06F 1/3293* | (2019.01) |
| *G06F 15/78* | (2006.01) |
| *G06F 9/30* | (2018.01) |
| *G06F 13/00* | (2006.01) |
| *G06F 13/28* | (2006.01) |
| *G06F 15/80* | (2006.01) |
| *G06F 12/0897* | (2016.01) |
| *G06F 12/02* | (2006.01) |

(52) U.S. Cl.
CPC .......... *G06F 9/3887* (2013.01); *G06F 1/3293* (2013.01); *G06F 9/30087* (2013.01); *G06F 9/3877* (2013.01); *G06F 15/167* (2013.01); *G06F 15/7825* (2013.01); *G06F 12/0207* (2013.01); *G06F 12/0897* (2013.01); *G06F 15/8007* (2013.01); *Y02D 10/122* (2018.01)

(58) Field of Classification Search
CPC .... G06F 15/80; G06F 15/7867; G06F 9/3004; G06F 15/8007; G06F 12/0246; G06F 2009/45583; G06F 3/064; G06F 12/0875; G06F 9/3885; G06F 9/3887; G06F 9/3836; G06F 9/3001; G06F 9/3877
See application file for complete search history.

(56) References Cited

U.S. PATENT DOCUMENTS 4,870,590 A * 9/1989 Kawata ............ G05B 19/41835
700/115
5,287,532 A * 2/1994 Hunt .................... G06F 15/8023
712/10

(Continued)

OTHER PUBLICATIONS

Yuriy V. Pershin and Massimiliano Di Ventra, Solving mazes with memristors: A massively parallel approach, Published Oct. 14, 2011.*

*Primary Examiner* — Mark A Giardino, Jr.
(74) *Attorney, Agent, or Firm* — Reches Patent

(57) ABSTRACT

A hybrid computer that comprises a sequential processor, a single instruction massively parallel (SIMD) processor, and shared memory module that is shared between the sequential processor and the SIMD processor.

36 Claims, 30 Drawing Sheets

(56) References Cited

U.S. PATENT DOCUMENTS

| | | | | |
|---|---|---|---|---|
| 5,355,508 A * | 10/1994 | Kan | G06F 15/167 | 712/20 |
| 5,825,677 A * | 10/1998 | Agarwal | G06F 15/8023 | 708/520 |
| 5,911,149 A * | 6/1999 | Luan | G06F 13/1684 | 711/147 |
| 6,381,671 B1 * | 4/2002 | Ayukawa | G06F 12/0215 | 711/100 |
| 9,824,753 B2 * | 11/2017 | Hamdioui | G11C 13/0069 | |
| 2005/0210260 A1 * | 9/2005 | Venkatesan | H04L 9/0643 | 713/180 |
| 2005/0223155 A1 * | 10/2005 | Chen | G06F 12/04 | 711/5 |
| 2007/0294663 A1 * | 12/2007 | McGuire | G06F 8/45 | 717/108 |
| 2009/0113141 A1 * | 4/2009 | Bullman | G06F 11/004 | 711/147 |
| 2009/0282211 A1 * | 11/2009 | Hoover | G06F 12/1483 | 711/173 |
| 2010/0165704 A1 * | 7/2010 | Wu | G11C 11/405 | 365/149 |
| 2011/0157195 A1 * | 6/2011 | Sprangle | G06T 1/20 | 345/522 |
| 2012/0063192 A1 * | 3/2012 | Lee | G11C 13/0007 | 365/148 |
| 2012/0110303 A1 * | 5/2012 | Dhanwada | G06F 9/52 | 712/29 |
| 2012/0137075 A1 * | 5/2012 | Vorbach | G06F 9/526 | 711/122 |
| 2012/0144104 A1 * | 6/2012 | Gibney | G06F 13/1626 | 711/105 |
| 2013/0097393 A1 * | 4/2013 | Ninomiya | G06F 13/28 | 711/154 |
| 2013/0204962 A1 * | 8/2013 | Estevez | H04N 7/185 | 709/217 |
| 2013/0301337 A1 * | 11/2013 | Kamalanathan | G11C 13/0002 | 365/148 |
| 2014/0189298 A1 * | 7/2014 | Morrison | G06F 1/3287 | 712/30 |
| 2014/0215193 A1 * | 7/2014 | Seo | G06F 9/30058 | 712/234 |
| 2015/0081982 A1 * | 3/2015 | Warner | G06F 13/1673 | 711/136 |
| 2015/0146491 A1 * | 5/2015 | Akerib | G11C 8/10 | 365/189.02 |
| 2016/0179537 A1 * | 6/2016 | Kunzman | G06F 9/30036 | 712/7 |

* cited by examiner

Cycle 1: RC=0, RA=A0   Cycle 2: RB=B0

Cycle 3: RB=RA+RB+RC, RC=Cout, RA=A2   Cycle 4: S0=RB

Cycle 5: RB=B1   Cycle 6: RB=RA+RB+RC, RC=Cout, RA=A2

FIG. 8

| A | T | S |
|---|---|---|
| 1 | | 1 |
| 2 | | 2 |
| 4 | | 4 |
| 8 | | 8 |
| 16 | | 16 |
| 32 | | 32 |
| 64 | | 64 |

Step-1:
S=A

111

| A | T | S |
|---|---|---|
| 1 | 2 | 3 |
| 2 | 4 | 6 |
| 4 | 8 | 12 |
| 8 | 16 | 24 |
| 16 | 32 | 48 |
| 32 | 64 | 96 |
| 64 | 0 | 64 |

Step-2:
T=S⇑1; S=S+T

112

| A | T | S |
|---|---|---|
| 1 | 12 | 15 |
| 2 | 24 | 30 |
| 4 | 48 | 60 |
| 8 | 96 | 120 |
| 16 | 64 | 112 |
| 32 | 0 | 96 |
| 64 | 0 | 64 |

Step-3:
T=S⇑2; S=S+T

113

| A | T | S |
|---|---|---|
| 1 | 112 | 127 |
| 2 | 96 | 126 |
| 4 | 64 | 124 |
| 8 | 0 | 120 |
| 16 | 0 | 112 |
| 32 | 0 | 96 |
| 64 | 0 | 64 |

Step-4:
T=S⇑4; S=S+T

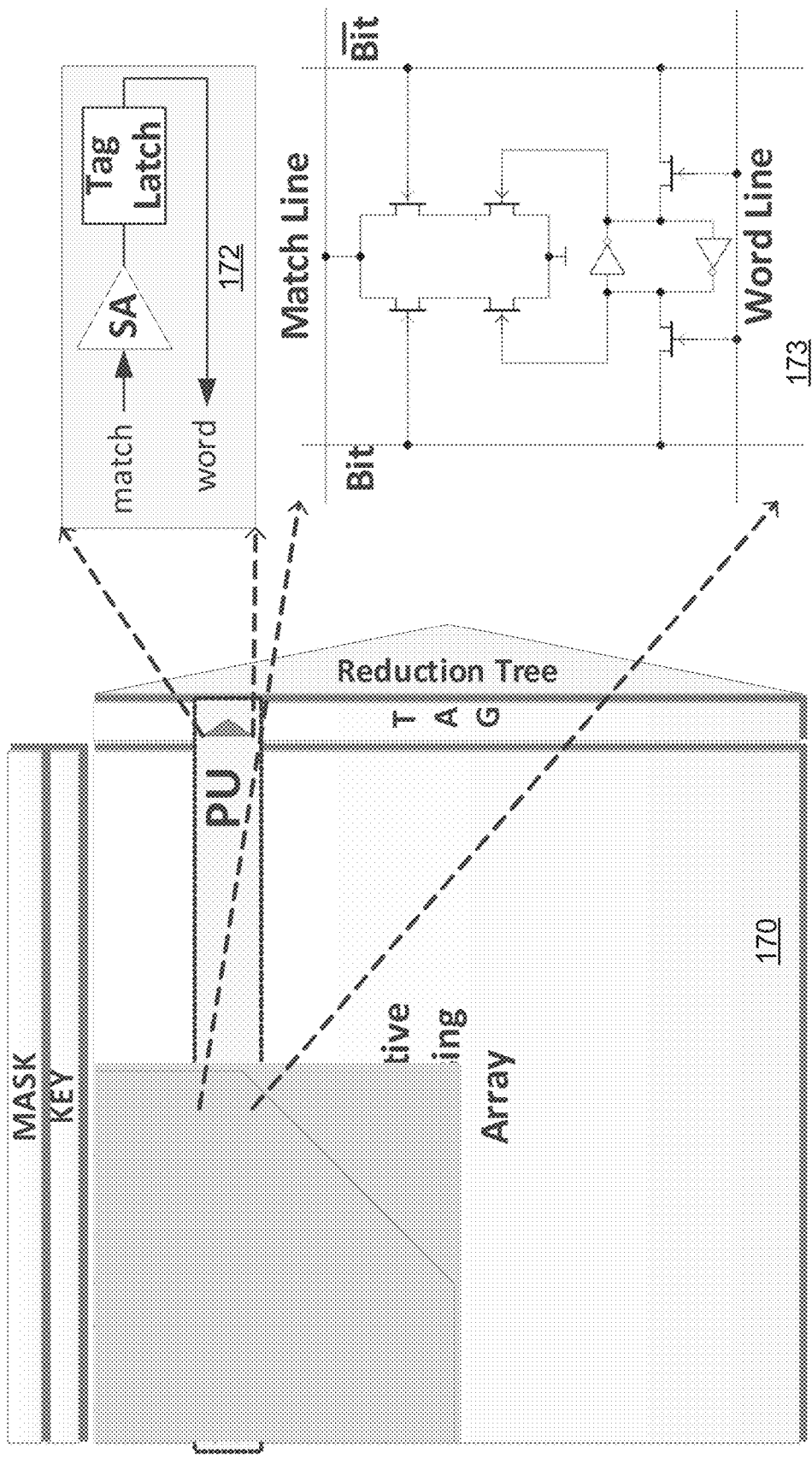

| PU | Value | Row | Column |
|---|---|---|---|
| 1 | $A_{1,1}$ | 1 | 1 |
| 2 | $A_{1,2}$ | 1 | 2 |
| 3 | $A_{2,1}$ | 2 | 1 |
| 4 | $A_{2,2}$ | 2 | 2 |
| 5 | $B_{1,1}$ | 1 | 1 |
| 6 | $B_{1,2}$ | 2 | 1 |
| 7 | $B_{2,1}$ | 1 | 2 |
| 8 | $B_{2,2}$ | 2 | 2 |

| PU | Value | Row | Column | T1 |
|---|---|---|---|---|
| 1 | $A_{1,1}$ | 1 | 1 | |
| 2 | $A_{1,2}$ | 1 | 2 | |
| 3 | $A_{2,1}$ | 2 | 1 | |
| 4 | $A_{2,2}$ | 2 | 2 | |
| 5 | $B_{1,1}$ | 1 | 1 | $A_{1,1}$ |
| 6 | $B_{1,2}$ | 2 | 1 | $A_{1,2}$ |
| 7 | $B_{2,1}$ | 1 | 2 | $A_{1,1}$ |
| 8 | $B_{2,2}$ | 2 | 2 | $A_{1,2}$ |

| PU | Value | Row | Column | T1 | T2 |
|---|---|---|---|---|---|
| 1 | $A_{1,1}$ | 1 | 1 | | |
| 2 | $A_{1,2}$ | 1 | 2 | | |
| 3 | $A_{2,1}$ | 2 | 1 | | |
| 4 | $A_{2,2}$ | 2 | 2 | | |
| 5 | $B_{1,1}$ | 1 | 1 | $A_{1,1}$ | $A_{1,1} \times B_{1,1}$ |
| 6 | $B_{1,2}$ | 2 | 1 | $A_{1,2}$ | $A_{1,2} \times B_{2,1}$ |
| 7 | $B_{2,1}$ | 1 | 2 | $A_{1,1}$ | $A_{1,1} \times B_{1,2}$ |
| 8 | $B_{2,2}$ | 2 | 2 | $A_{1,2}$ | $A_{1,2} \times B_{2,2}$ |

HYBRID PROCESSOR

CROSS REFERENCE TO RELATED APPLICATIONS

This application claims priority from U.S. provisional patent 62/100,967 having a filing date of Jan. 8, 2015 which is incorporated herein by reference.

BACKGROUND OF THE INVENTION

Prior Art References

Alibart F., et al. "Hybrid CMOS/nanodevice circuits for high throughput pattern matching applications," *IEEE Conference on Adaptive Hardware and Systems*, 2011

Alibart F., et al. "High precision tuning of state for memristive devices by adaptable variation-tolerant algorithm." Nanotechnology 23.7 (2012): 075201

Banerjee K., et al., "A self-consistent junction temperature estimation methodology for nanometer scale ICs with implications for performance and thermal management," *IEEE IEDM*, 2003, pp. 887-890.

Burger D., T. Austin. "The SimpleScalar tool set, version 2.0," *ACM SIGARCH Computer Architecture News* 25.3 (1997): 13-25.

Cassuto, S., et al., "Sneak-Path Constraints in Memristor Crossbar Arrays," *Proceedings of the IEEE International Symposium on Information Theory*, pp. 156-160, July 2013.

Chang, M. T, et at "Technology comparison for large last-level caches (L 3 Cs): Low-leakage SRAM, low write-energy STT-RAM, and refresh-optimized eDRAM." *High Performance Computer Architecture (HPCA*2013), 2013 IEEE 19th International Symposium on. IEEE, 2013.

Chen Y., et al., "An Access-Transistor-Free (0T/1R) Non-Volatile Resistance Random Access Memory (RRAM) Using a Novel Threshold Switching, Self-Rectifying Chalcogenide Device," *IEEE IEDM*, pp. 37.4.1-37.4.4, 2003.

Chang M.-F., et al., "A 3T1R Non-volatile TCAM Using MLC ReRAM with Sub-ins Search Time," IEEE International Solid-State Circuits Conference (ISSCC) Dig. Tech. February 2015

Chung E., et al. "Single-chip heterogeneous computing: Does the future include custom logic, FPGAs, and GPGPUs?" 43*rd Annual IEEE/ACM International Symposium on Microarchitecture*, 2010.

Colin L., et al., "Design space exploration for sparse matrix-matrix multiplication on FPGAs." *International Journal of Circuit Theory and Applications* 41.2 (2013): 205-219.

Cong Xu., et al., "Design Implications of Memristor-Based RRAM Cross-Point Structures," *DATE, pp.* 1-6, 2011.

Davis T., et al., "The University of Florida sparse matrix collection," *ACM Transactions on Mathematical Software (TOMS)*, 38, no. 1 (2011): 1.

Dorrance R., et al., "A scalable sparse matrix-vector multiplication kernel for energy-efficient sparse-BLAS on FPGAs", 2014 ACM/SIGDA *international symposium on Field-programmable gate arrays*.

Eshraghian K., et al. "Memristor MOS content addressable memory (MCAM): Hybrid architecture for future high performance search engines", *IEEE Transactions on VLSI Systems*, 19.8 (2011): 1407-1417.

Horowitz, M., "1.1 Computing's energy problem (and what we can do about it)." *Solid-State Circuits Conference Digest of Technical Papers (ISSCC)*, 2014 *IEEE International.* IEEE, 2014.

ITRS Roadmap (http://www.itri.net).

Kamil S., et al., "An Auto-Tuning Framework for Parallel Multicore Stencil Computations," *IEEE International Symposium on Parallel & Distributed Processing* 2010, pages 1-12.

Kawahara A., et al., "An 8 Mb Multi-Layered Cross-Point ReRAM Macro With 443 MB/s Write Throughput," *IEEE Journal of Solid-State Circuits*, Vol. 48, No. 1, January 2013.

Kurzak J., et al., "Scientific Computing with Multicore and Accelerators", CRC Press, Inc., 2010.

Kvatinsky S., et al. "Models of Memristors for SPICE Simulations," *Proceedings of the IEEE Convention of Electrical and Electronics Engineers in Israel*, pp. 1-5, November 2012.

Kvatinsky S., et al. "MRL—Memristor Ratioed Logic," *Cellular Nanoscale Networks and Their Applications (CNNA)*, 2012 13*th International Workshop on*, vol., no., pp. 1, 6, 29-31 Aug. 2012.

Kvatinsky S., et al. "TEAM: threshold adaptive memristor model", *IEEE Transactions on Circuits and Systems I*, 2013.

Lauwereins R., "New Memory Technologies and their Impact on Computer Architectures." HiPeac'15 keynote, 2015.

Liu T-Y., et al., "A 130.7 mm$^2$ 2-Layer 32 Gb ReRAM Memory Device in 24 nm Technology," *Proceedings of the IEEE International Solid-State Circuits Conference*, pp. 210-211, February 2013.

Liu X., et al., "Efficient sparse matrix-vector multiplication on x86-based many-core processors", *International conference on supercomputing, ACM*, 2013.

Meng-Fan C., et. al., "A 0.5V 4 Mb logic-process compatible embedded resistive RAM (ReRAM) in 65 nm CMOS using low-voltage current-mode sensing scheme with 45 ns random read time," *Solid-State Circuits Conference Digest of Technical Papers (ISSCC)*, 2012 *IEEE International* pp. 434,436, 19-23 Feb. 2012.

Ming-Chi W., et. al., "Low-Power and Highly Reliable Multilevel Operation in ZrO2 1T1R RRAM," Electron Device Letters, IEEE, vol. 32, no. 8, pp. 1026, 1028, August 2011.

Morad A., et. al., "Efficient Dense And Sparse Matrix Multiplication On GP-SIMD." *Power and Timing Modeling, Optimization and Simulation (PATMOS)*, September 2014.

Morad A., et. al., "GP-SIMD Processing-in-Memory." *ACM Transactions on Architecture and Code Optimization (TACO)*, December 2014.

Nickel K., "Memristor Materials Engineering: From Flash Replacement Towards a Universal Memory," Proceedings of the IEEE International Electron Devices Meeting, December 2011.

Niu D., et al., "Design Trade-Offs for High Density Cross-Point Resistive Memory," *ISLPED*, 2012, pp. 209-214.

Ou E., et. al., "Array Architecture for a Nonvolatile 3-Dimensional Cross-Point Resistance-Change Memory," *IEEE J. Solid-State Circuits*, vol. 46, no. 9, pp. 2158-2170, September 2011.

Patel, R., et al., "Arithmetic encoding for memristive multi-bit storage," VLSI and System-on-Chip (VLSI-SoC), 2012 IEEE/IFIP 20th International Conference on, vol., no., pp. 99,104, 7-10 Oct. 2012.

Patel R., et al., "Multistate Register Based on Resistive RAM", *IEEE Transactions on VLSI*, 2014.

Saule E., et al., "Performance Evaluation of Sparse Matrix Multiplication Kernels on Intel Xeon Phi." arXiv preprint arXiv:1302.1078 (2013).

Seungbum H., et al., "Emerging Non-Volatile Memories". Springer, 2014.

Shyh-Shyuan S., et. al., "A 5 ns fast write multi-level non-volatile 1 K bits RRAM memory with advance write scheme," VLSI Circuits, 2009 Symposium on, vol., no., pp. 82,83, 16-18 Jun. 2009.

Thatcher J., et al., "NAND Flash Solid State Storage for the Enterprise, An in-depth Look at Reliability," *Solid State Storage Initiative (SSSI) of the Storage Network Industry Association (SNIA)*, April 2009.

Torrezan A., et al., "Sub-nanosecond switching of a tantalum oxide memristor." *Nanotechnology* 22.48 (2011): 485203.

Williams S., et al., "Optimization of sparse matrix-vector multiplication on emerging multicore platforms." *Parallel Computing* 35, no. 3 (2009): 178-194.

Wong, H.-S. P., et al., "Metal-Oxide RRAM," Proceedings of the IEEE, vol. 100, no. 6, pp. 1951, 1970, June 2012.

Yavits L., et al., "Computer Architecture with Associative Processor Replacing Last Level Cache and SIMD Accelerator," *IEEE Trans. On Computers*, 2014

Yavits L., et al., "Resistive Associative Processor", *Computer Architecture Letters*, 2014.

Yavits L., et al., "The effect of communication and synchronization on Amdahl's law in multicore systems", *Parallel Computing Journal*, 2014.

Zangeneh, M., et al., "Design and Optimization of Nonvolatile Multibit 1T1R Resistive RAM," *Very Large Scale Integration (VLSI) Systems, IEEE Transactions on*, vol. 22, no. 8, pp. 1815,1828, August 2014.

Zhuo L., et al., "Sparse matrix-vector multiplication on FPGAs." *Proceedings of the 2005 ACM/SIGDA 13th international symposium on Field-programmable gate arrays*, pp. 63-74. ACM, 2005.

Machine learning algorithms executed on High Performance Computers (HPC) address complex challenges such as mapping the human genome, investigating medical therapies, and executing high frequency derivative trading.

These problems are sequential in the sense that each parallelizable step depends on the outcome of the preceding step, and typically, large amount of data is exchanged (synchronized) within the chip between sequential and parallel processing cores in each step—as illustrated by timing diagram 10 of FIG. 1 in which the y-axis represents the passage of time.

Single Instruction Massively Parallel (SIMD) architectures are a class of parallel computers with multiple processing units performing the same operation on multiple data points simultaneously. Such machines exploit data level parallelism, and are thus well suited for machine learning over Big Data. High utilization of SIMD processor requires very high computation-to-bandwidth ratio and large data sets. Excess of coarse SIMD computing elements operating at high rates results in irregular thermal density and hotspots, further limiting SIMD scalability. Power dissipation and on-chip communication are the primary factors limiting the scalability of on-chip parallel architectures.

It has been shown that the maximal acceleration of a fine grain workload containing sequential and concurrent parts, occurs when the sequential section is assigned to a large, high ILP sequential processor (containing, for example, accelerators such as double precision floating point unit, function generator and branch prediction unit), denoted 23 in FIG. 2. The concurrent part is assigned to a massive number of fine grain low power processing array, denoted SIMD 24 in FIG. 2. SIMD processor 24 accesses SIMD memory array 21, while sequential memory array 22 is accessed by sequential processor 23. The sequential processor is also coupled to block IS/DS (instruction and data cache respectively) 29. SIMD memory array 21 is also accessed by sequencer 27 that is turn is also connected to reduction tree 26, Network on chip NOC 25 and IS 28.

An immediate limiting factor of such architectures is synchronization requiring data exchange (illustrated by double sided arrow SYNCHRONIZATION) between the sequential processor and the processing array, depicted as a red bus in FIG. 2.

SUMMARY

There may be provided a hybrid computer that may include a sequential processor, a single instruction massively parallel (SIMD) processor, and shared memory module that may be shared between the sequential processor and the SIMD processor.

The SIMD processor may be integrated with the shared memory module.

The SIMD processor may be directly coupled to the shared memory module.

The sequential processor may be coupled to the memory model only via a cache memory.

The SIMD processor may be arranged to perform a row access of the shared memory module while the sequential processor may be arranged to perform a column access of the shared memory module.

The SIMD processor and the sequential processor may be arranged to concurrently access the shared memory module.

The SIMD processor and the sequential processor may be arranged to access the shared memory module in an interleaved manner.

The shared memory module may include at least one SIMD memory region that may be writable only by the SIMD processor and at least one sequential processor memory region that may be writable only by the sequential processor.

The shared memory module may include at least one SIMD memory region that may be writable only by the SIMD processor.

The shared memory module may include at least one SIMD memory region that may be writable only by the SIMD processor; wherein the sequential processor may be configured to read content stored in the SIMD memory region.

The shared memory module may include at least one SIMD memory region that may be writable only by the SIMD processor; wherein the sequential processor may be prevented from reading content stored in the SIMD memory region.

The shared memory module may include shared memory cells that may be shared by the SIMD processor and by the sequential processor, and non-shared memory cells that may be accessed only by one of the SIMD processor and the sequential processor; wherein the shared memory cells may include more electrical components than the non-shared memory cells.

The shared memory module may include shared memory cells that may be shared by the SIMD processor and by the sequential processor, and non-shared memory cells that may be accessed only by one of the SIMD processor and the sequential processor; wherein at least some shared memory cells may be coupled to at least four control lines.

The shared memory module may include at least one sequential processor memory region that may be writable only by the sequential processor; wherein the SIMD processor may be configured to read content stored in the sequential processor memory region.

The sequential processor may be configured to control an access of the SIMD processor to the shared memory module.

The SIMD processor may include multiple processing units that may be configured to operate in parallel to each other.

The SIMD processor may include multiple one bit processing units.

The SIMD processor may include multiple multi-bit processing units.

The SIMD processor may include multiple processing units, a sequencer that issues commands to at least some of the multiple processing units, an interconnect and a network on chip (NOC) unit.

The SIMD processor may include multiple processing units, a sequencer that issues commands to at least some of the multiple processing units, a reduction tree and a network on chip (NOC) unit.

The SIMD processor may include multiple processing units and a reduction tree, wherein the reduction tree may include a group of adders that may be coupled to each other and to outputs of the multiple processing units.

The SIMD processor may include multiple processing units, each processing unit may include an adder, multiple registers, and a function generator.

The SIMD processor may include multiple one bit processing units, each one bit processing unit may include a one bit adder, multiple one bit registers, and a one bit function generator.

The SIMD processor may include a first number (N) of processing units, wherein the SIMD processor may be arranged to perform arithmetic operations on vectors that have a second number (N) of elements by performing multiple iterations of N length arithmetic operations; wherein N exceeds N.

The SIMD processor may include a first number (N) of processing units, wherein the SIMD processor may be arranged to perform a search for a key within a vector of a second number (N) of elements by performing multiple compare operations with different segments of the vector; wherein a length of the key does not exceed N and wherein N exceeds N.

The hybrid computer may include a group of SIMD processors, wherein the shared memory module may be virtually segmented to a group of shared memory segments; wherein each SIMD processor of the group of SIMD processors may be arranged to access a single shared memory segment of the group of shared memory segments.

The hybrid computer may include a group of SIMD processors, wherein the shared memory module may be virtually segmented to a group of shared memory segments; wherein the sequential processor may be arranged to access to each shared memory segment of the group of shared memory segments; wherein each SIMD processor of the group of SIMD processors may be arranged to access a single shared memory segment of the group of shared memory segments.

The shared memory module may include memory cells that may include memristive devices.

The shared memory module may include memory cells that may include memristive devices and diodes.

The shared memory module may include shared memory cells that may be accessible to both the SIMD processor and to the sequential processor; wherein the shared memory cells may include memristive devices.

The shared memory module may include shared memory cells that may be accessible to both the SIMD processor and to the sequential processor; wherein the shared memory cells may include memristive devices and diodes.

The shared memory module may include shared memory cells that may be accessible to both the SIMD processor and to the sequential processor; wherein the shared memory cells may include memristive devices; wherein one end of each shared memory cell may be coupled to SIMD processor access circuits and wherein another end of each shared memory cell may be coupled to sequential processor access circuits.

The shared memory module may include shared memory cells that may be accessible to both the SIMD processor and to the sequential processor; wherein the shared memory cells may include memristive devices; wherein one end of each shared memory cell may be coupled to column sensing circuits and row drivers and wherein another end of each shared memory cell may be coupled to row sensing circuits and column drivers.

The shared memory module may include shared memory cells that may be accessible to both the SIMD processor and to the sequential processor; wherein the shared memory cells may include memristive devices; wherein one end of each shared memory cell may be coupled to column sensing circuits and row drivers and wherein another end of each shared memory cell may be coupled to row sensing circuits and column drivers; wherein the SIMD processor and the sequential processor may be configured to access the shared memory cells in a non-overlapping manner.

The shared memory module may include shared memory cells that may be accessible to both the SIMD processor and to the sequential processor; wherein the shared memory cells may include memristive devices; wherein one end of each shared memory cell may be coupled to column sensing circuits and row drivers that may be coupled to the sequential processor and wherein another end of each shared memory cell may be coupled to row sensing circuits and column drivers that may be coupled to the SIMD processor.

The SIMD processor may include multiple processing units that may include memristive devices.

The shared memory module and the SIMD processor may be integrated and may include memristive devices that may be configured to operate as memory cells and to perform arithmetic operations.

The shared memory module may include memory cells that may include multiple bit memristive devices.

The SIMD processor and the shared memory module may be integrated and may include combined memory and computation cells; wherein each memory and computation cell may include a memristive device; wherein the hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

The SIMD processor and the shared memory module may be integrated and may include combined memory and computation cells; wherein each memory and computation cell may include a memristive device; wherein the hybrid computer may be configured to perform a subtraction operation of first and second operands, using a certain memristive device of a certain combined memory and computation cell, by storing in the certain memristive device a value that corresponds to the second operand and feeding the certain memristive devices with one or more programming pulses that correspond to the first operand in a direction that increases a resistivity of the certain memristive device.

The SIMD processor and the shared memory module may be integrated and may include combined memory and computation cells; wherein each memory and computation cell may include a memristive device;

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device;

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device.

The SIMD processor and the shared memory module may be integrated and may include combined memory and computation cells; wherein each memory and computation cell may include a memristive device.

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device;

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device;

The hybrid computer may be configured to perform long multiplications and long divisions by repeating subtraction and addition operations.

The SIMD processor and the shared memory module may be integrated and may include combined memory and computation cells; wherein each memory and computation cell may include a memristive device; wherein the hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

The SIMD processor and the shared memory module may be integrated and may include combined memory and computation cells; wherein each memory and computation cell may include only a single memristive device; wherein the hybrid computer may be configured to perform a subtraction operation of first and second operands, using a certain memristive device of a certain combined memory and computation cell, by storing in the certain memristive device a value that corresponds to the second operand and feeding the certain memristive devices with one or more programming pulses that correspond to the first operand in a direction that increases a resistivity of the certain memristive device.

The SIMD processor and the shared memory module may be integrated and may include combined memory and computation cells; wherein each memory and computation cell may include only a single memristive device.

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device;

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device.

The SIMD processor and the shared memory module may be integrated and may include combined memory and computation cells; wherein each memory and computation cell may include only a single memristive device;

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device;

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device;

The hybrid computer may be configured to perform long multiplications and long divisions by repeating subtraction and addition operations.

The SIMD processor and the shared memory module may be integrated and may include combined memory and computation cells; wherein each memory and computation cell may include only a single memristive device; wherein the hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

The SIMD processor, the sequential processor and the shared memory may be implemented on a same die.

The SIMD processor, the sequential processor and the shared memory share at least one physical layer.

There may be provided a device that may include an array of memristive devices and a programming module; wherein the programming module may be arranged to initially store in a certain memristive device of the memristive device array a value that corresponds to a second operand and to feed the certain memristive device with one or more programming pulses that correspond to a first operand in a direction that decreases a resistivity of the certain memristive device thereby causing the certain memristive device to have a resistance that may be indicative of a sum of the first and second operands.

The device may include a read module that may be arranged to evaluate the resistance of the certain memristive device.

There may be provided a device that may include an array of memristive devices and a programming module; wherein the programming module may be arranged to initially store in each memristive device of the memristive device array a value that corresponds to a second operand and to feed the memristive device with one or more programming pulses that correspond to a first operand in a direction that decreases a resistivity of the memristive device thereby causing the memristive device to have a resistance that may be indicative of a sum of the first and second operands.

There may be provided a device that may include an array of memristive devices and a programming module; wherein the programming module may be arranged to initially store in a certain memristive device of the memristive device array a value that corresponds to a second operand and to feed the certain memristive device with one or more programming pulses that correspond to a first operand in a direction that increases a resistivity of the certain memristive device thereby causing the certain memristive device to have a resistance that may be indicative of a difference between the first and second operands.

There may be provided a method for subtracting a first operand from a second operand, the method may include: initially storing in a memristive device a value that corresponds to the second operand; feeding the memristive device with one or more programming pulses that correspond to the first operand in a direction that increases a resistivity of the certain memristive device thereby causing the memristive device to have a resistance that may be indicative of a difference between the first and second operands.

There may be provided a method for executing first and second instructions, the method may include executing the first instructions by a sequential processor; and executing the second instructions by a single instruction massively parallel (SIMD) processor; wherein the executing of the first and second instructions may include accessing a shared memory module that may be shared by the sequential processor and the SIMD processor.

There may be provided a device that may include an array of memristive devices, wherein each memristive device has a first end and a second end, wherein first ends of the memristive devices of the array may be coupled to a row driver a row sensing circuit; wherein second ends of the memristive devices of the array may be coupled to a column driver and to a column sensing circuit; wherein the row driver and the column sensing circuit may be arranged to operate during first time periods and wherein the column driver and the row sensing circuit may be arranged to operate during second time periods that do not overlap with the first time periods.

Each memristive device of the array may be coupled to an isolating element that may be arranged to reduce a coupling between a row coupled to the memristive device and a column coupled to the memristive device.

The isolating element may be a diode.

There may be provided a device that may include an array of memristive devices, wherein each memristive device has a first end and a second end, wherein first ends of the memristive devices of the array may be coupled to a row driver a row sensing circuit; wherein second ends of the memristive devices of the array may be coupled to a column driver and to a column sensing circuit; wherein the row driver and the column sensing circuit may be arranged to provide row accessibility and wherein the column driver and the row sensing circuit provide column accessibility.

Each memristive device of the array may be coupled to an isolating element that may be arranged to reduce a coupling between a row coupled to the memristive device and a column coupled to the memristive device.

The isolating element may be a diode.

There may be provided a hybrid computer that may include a sequential processor, a single instruction massively parallel (SIMD) processor, and shared memory module that may be shared between the sequential processor and the SIMD processor.

The SIMD processor may be integrated with the shared memory module.

The SIMD processor may be directly coupled to the shared memory module.

The sequential processor may be coupled to the memory model only via a cache memory.

The SIMD processor may be arranged to perform a row access of the shared memory module while the sequential processor may be arranged to perform a column access of the shared memory module.

The SIMD processor and the sequential processor may be arranged to concurrently access the shared memory module.

The SIMD processor and the sequential processor may be arranged to access the shared memory module in an interleaved manner.

The shared memory module may include at least one SIMD memory region that may be writable only by the SIMD processor and at least one sequential processor memory region that may be writable only by the sequential processor.

The shared memory module may include at least one SIMD memory region that may be writable only by the SIMD processor.

The shared memory module may include at least one SIMD memory region that may be writable only by the SIMD processor; wherein the sequential processor may be configured to read content stored in the SIMD memory region.

The shared memory module may include at least one SIMD memory region that may be writable only by the SIMD processor; wherein the sequential processor may be prevented from reading content stored in the SIMD memory region.

The shared memory module may include shared memory cells that may be shared by the SIMD processor and by the sequential processor, and non-shared memory cells that may be accessed only by one of the SIMD processor and the sequential processor; wherein the shared memory cells may include more electrical components than the non-shared memory cells.

The shared memory module may include shared memory cells that may be shared by the SIMD processor and by the sequential processor, and non-shared memory cells that may be accessed only by one of the SIMD processor and the sequential processor; wherein at least some shared memory cells may be coupled to at least four control lines.

The shared memory module may include at least one sequential processor memory region that may be writable only by the sequential processor; wherein the SIMD processor may be configured to read content stored in the sequential processor memory region.

The sequential processor may be configured to control an access of the SIMD processor to the shared memory module.

The SIMD processor may include multiple processing units that may be configured to operate in parallel to each other.

The SIMD processor may include multiple one bit processing units.

The SIMD processor may include multiple multi-bit processing units.

The SIMD processor may include multiple processing units, a sequencer that issues commands to at least some of the multiple processing units, an interconnect and a network on chip (NOC) unit.

The SIMD processor may include multiple processing units, a sequencer that issues commands to at least some of the multiple processing units, a reduction tree and a network on chip (NOC) unit.

The SIMD processor may include multiple processing units and a reduction tree, wherein the reduction tree may include a group of adders that may be coupled to each other and to outputs of the multiple processing units.

The SIMD processor may include multiple processing units, each processing unit may include an adder, multiple registers, and a function generator.

The SIMD processor may include multiple one bit processing units, each one bit processing unit may include a one bit adder, multiple one bit registers, and a one bit function generator.

The SIMD processor may include a first number (N) of processing units, wherein the SIMD processor may be arranged to perform arithmetic operations on vectors that have a second number (N) of elements by performing multiple iterations of N length arithmetic operations; wherein N exceeds N.

The SIMD processor may include a first number (N) of processing units, wherein the SIMD processor may be arranged to perform a search for a key within a vector of a second number (N) of elements by performing multiple compare operations with different segments of the vector; wherein a length of the key does not exceed N and wherein N exceeds N.

The hybrid computer may include a group of SIMD processors, wherein the shared memory module may be virtually segmented to a group of shared memory segments; wherein each SIMD processor of the group of SIMD processors may be arranged to access a single shared memory segment of the group of shared memory segments.

The hybrid computer may include a group of SIMD processors, wherein the shared memory module may be virtually segmented to a group of shared memory segments; wherein the sequential processor may be arranged to access to each shared memory segment of the group of shared memory segments; wherein each SIMD processor of the group of SIMD processors may be arranged to access a single shared memory segment of the group of shared memory segments.

The shared memory module may include memory cells that may include memristive devices.

The shared memory module may include memory cells that may include memristive devices and diodes.

The shared memory module may include shared memory cells that may be accessible to both the SIMD processor and to the sequential processor; wherein the shared memory cells may include memristive devices.

The shared memory module may include shared memory cells that may be accessible to both the SIMD processor and to the sequential processor; wherein the shared memory cells may include memristive devices and diodes.

The shared memory module may include shared memory cells that may be accessible to both the SIMD processor and to the sequential processor; wherein the shared memory cells may include memristive devices; wherein one end of each shared memory cell may be coupled to SIMD processor access circuits and wherein another end of each shared memory cell may be coupled to sequential processor access circuits.

The shared memory module may include shared memory cells that may be accessible to both the SIMD processor and to the sequential processor; wherein the shared memory cells may include memristive devices; wherein one end of each shared memory cell may be coupled to column sensing circuits and row drivers and wherein another end of each shared memory cell may be coupled to row sensing circuits and column drivers.

The shared memory module may include shared memory cells that may be accessible to both the SIMD processor and to the sequential processor; wherein the shared memory cells may include memristive devices; wherein one end of each shared memory cell may be coupled to column sensing circuits and row drivers and wherein another end of each shared memory cell may be coupled to row sensing circuits and column drivers; wherein the SIMD processor and the sequential processor may be configured to access the shared memory cells in a non-overlapping manner.

The shared memory module may include shared memory cells that may be accessible to both the SIMD processor and to the sequential processor; wherein the shared memory cells may include memristive devices; wherein one end of each shared memory cell may be coupled to column sensing circuits and row drivers that may be coupled to the sequential processor and wherein another end of each shared memory cell may be coupled to row sensing circuits and column drivers that may be coupled to the SIMD processor.

The SIMD processor may include multiple processing units that may include memristive devices.

The shared memory module and the SIMD processor may be integrated and may include memristive devices that may be configured to operate as memory cells and to perform arithmetic operations.

The shared memory module may include memory cells that may include multiple bit memristive devices.

The SIMD processor and the shared memory module may be integrated and may include combined memory and computation cells; wherein each memory and computation cell may include a memristive device; wherein the hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

The SIMD processor and the shared memory module may be integrated and may include combined memory and computation cells; wherein each memory and computation cell may include a memristive device; wherein the hybrid computer may be configured to perform a subtraction operation of first and second operands, using a certain memristive device of a certain combined memory and computation cell, by storing in the certain memristive device a value that corresponds to the second operand and feeding the certain memristive devices with one or more programming pulses that correspond to the first operand in a direction that increases a resistivity of the certain memristive device.

The SIMD processor and the shared memory module may be integrated and may include combined memory and computation cells; wherein each memory and computation cell may include a memristive device;

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device;

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device.

The SIMD processor and the shared memory module may be integrated and may include combined memory and computation cells; wherein each memory and computation cell may include a memristive device;

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device;

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device;

The hybrid computer may be configured to perform long multiplications and long divisions by repeating subtraction and addition operations.

The SIMD processor and the shared memory module may be integrated and may include combined memory and computation cells; wherein each memory and computation cell may include a memristive device; wherein the hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

The SIMD processor and the shared memory module may be integrated and may include combined memory and computation cells; wherein each memory and computation cell may include only a single memristive device; wherein the hybrid computer may be configured to perform a subtraction operation of first and second operands, using a certain memristive device of a certain combined memory and computation cell, by storing in the certain memristive device a value that corresponds to the second operand and feeding the certain memristive devices with one or more programming pulses that correspond to the first operand in a direction that increases a resistivity of the certain memristive device.

The SIMD processor and the shared memory module may be integrated and may include combined memory and computation cells; wherein each memory and computation cell may include only a single memristive device;

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device;

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device.

The SIMD processor and the shared memory module may be integrated and may include combined memory and computation cells; wherein each memory and computation cell may include only a single memristive device;

The hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

The hybrid computer may be configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device;

The hybrid computer may be configured to perform long multiplications and long divisions by repeating subtraction and addition operations.

The SIMD processor and the shared memory module may be integrated and may include combined memory and computation cells; wherein each memory and computation cell may include only a single memristive device; wherein the hybrid computer may be configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

The SIMD processor, the sequential processor and the shared memory may be implemented on a same die.

The SIMD processor, the sequential processor and the shared memory share at least one physical layer.

There may be provided a device that may include an array of memristive devices and a programming module; wherein the programming module may be arranged to initially store in a certain memristive device of the memristive device array a value that corresponds to a second operand and to feed the certain memristive device with one or more programming pulses that correspond to a first operand in a direction that decreases a resistivity of the certain memristive device thereby causing the certain memristive device to have a resistance that may be indicative of a sum of the first and second operands.

There may be provided a device that may include a read module that may be arranged to evaluate the resistance of the certain memristive device.

There may be provided a device may include an array of memristive devices and a programming module; wherein the programming module may be arranged to initially store in each memristive device of the memristive device array a value that corresponds to a second operand and to feed the memristive device with one or more programming pulses that correspond to a first operand in a direction that decreases a resistivity of the memristive device thereby causing the memristive device to have a resistance that may be indicative of a sum of the first and second operands.

There may be provided a device that may include an array of memristive devices and a programming module; wherein the programming module may be arranged to initially store in a certain memristive device of the memristive device array a value that corresponds to a second operand and to feed the certain memristive device with one or more programming pulses that correspond to a first operand in a direction that increases a resistivity of the certain memristive device thereby causing the certain memristive device to have a resistance that may be indicative of a difference between the first and second operands.

There may be provided a method for subtracting a first operand from a second operand, the method may include: initially storing in a memristive device a value that corresponds to the second operand; feeding the memristive device with one or more programming pulses that correspond to the first operand in a direction that increases a resistivity of the certain memristive device thereby causing the memristive device to have a resistance that may be indicative of a difference between the first and second operands.

There may be provided a method for executing first and second instructions, the method may include executing the first instructions by a sequential processor; and executing the second instructions by a single instruction massively parallel (SIMD) processor; wherein the executing of the first and second instructions may include accessing a shared memory module that may be shared by the sequential processor and the SIMD processor.

There may be provided a device that may include an array of memristive devices, wherein each memristive device has a first end and a second end, wherein first ends of the memristive devices of the array may be coupled to a row driver a row sensing circuit; wherein second ends of the memristive devices of the array may be coupled to a column driver and to a column sensing circuit; wherein the row driver and the column sensing circuit may be arranged to operate during first time periods and wherein the column driver and the row sensing circuit may be arranged to operate during second time periods that do not overlap with the first time periods.

Each memristive device of the array may be coupled to an isolating element that may be arranged to reduce a coupling between a row coupled to the memristive device and a column coupled to the memristive device.

The isolating element may be a diode.

There may be provided a device that may include an array of memristive devices, wherein each memristive device has a first end and a second end, wherein first ends of the memristive devices of the array may be coupled to a row driver a row sensing circuit; wherein second ends of the memristive devices of the array may be coupled to a column driver and to a column sensing circuit; wherein the row driver and the column sensing circuit may be arranged to provide row accessibility and wherein the column driver and the row sensing circuit provide column accessibility.

Each memristive device of the array may be coupled to an isolating element that may be arranged to reduce a coupling between a row coupled to the memristive device and a column coupled to the memristive device.

The isolating element may be a diode.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 8:
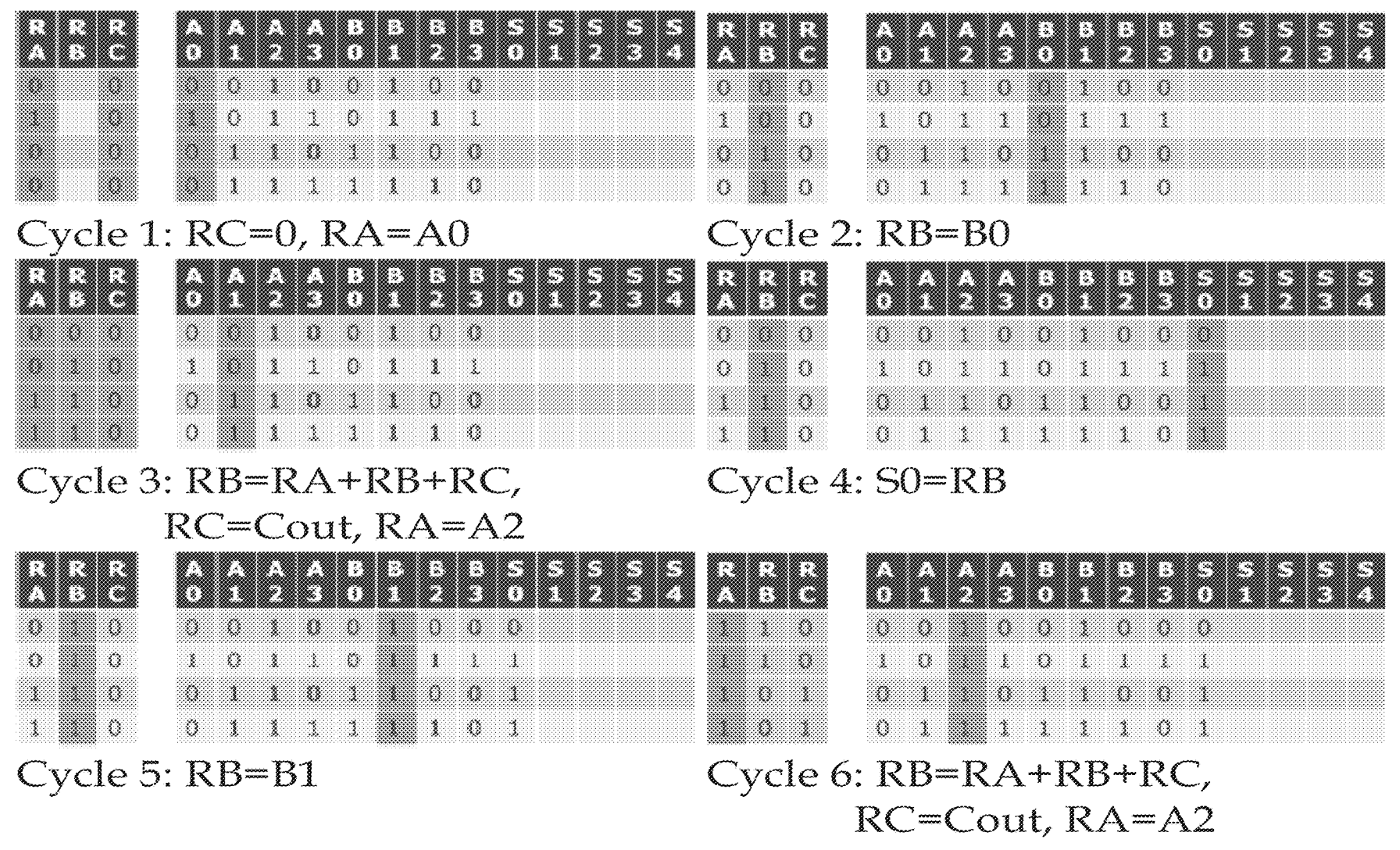

FIG. 8 illustrates multiple cycles of an addition operation executed by the hybrid computer according to an embodiment of the invention;

FIG. 11 illustrates an implementation of a software reduction tree according to an embodiment of the invention;

FIGS. 17A-C illustrate an associative processor, a tag logic and a NOR-type bit cell of the associative processor according to an embodiment of the invention;

FIG. 22 illustrates a storage of information using a Coordinate List (COO) format within a shared memory module of a hybrid processor according to an embodiment of the invention;

FIG. 25 illustrates a broadcast operation according to an embodiment of the invention;

FIG. 26 illustrates a multiplication operation according to an embodiment of the invention;

DETAILED DESCRIPTION OF THE DRAWINGS

Figure 1:
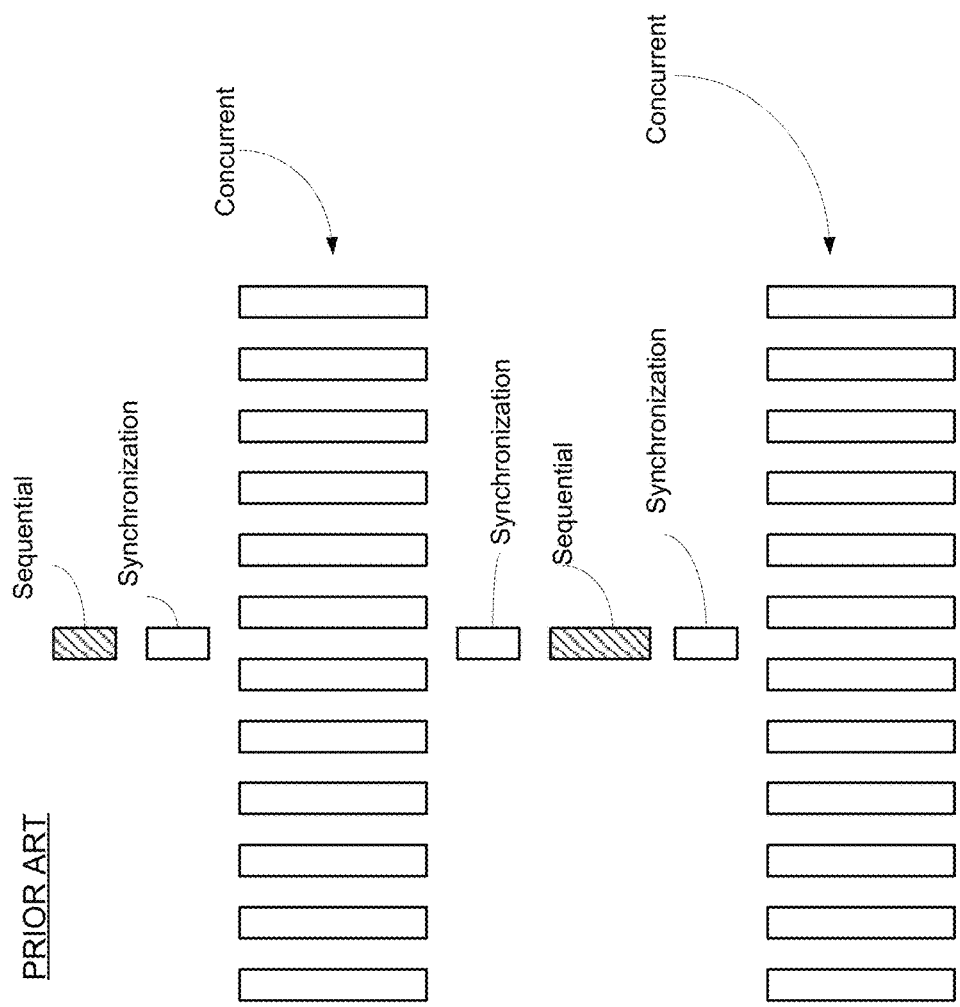
FIG. 1 illustrates a prior art timing diagram.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The term "memristor" means any memristive device. It may include any two-port resistive device that is used to store data, including MIM (Metal-Insulator-Metal) resistive switches, MTJ (Magnetic Tunnel Junction), PCM (Phase Change Memory) and others.

Any reference to resistive memory (for example ReRAM) should be interpreted as a reference to any memristive device memory.

There is provided a hybrid general purpose SIMD computer architecture (GP-SIMD) that resolves the issue of synchronization by in-memory computing, through combining data storage and massively parallel processing.

GP-SIMD employs a two-dimensional access memory with modified SRAM storage cells and a bit-serial processing unit per each memory row. An analytic performance model of the GP-SIMD architecture is presented, comparing it to Associative Processor and to conventional SIMD architectures. Cycle-accurate simulation of four workloads supports the analytical comparison. Assuming a moderate die area, GP-SIMD architecture outperforms both the Associative Processor and conventional SIMD co-processor architectures by almost an order of magnitude while consuming less power.

Figure 3:
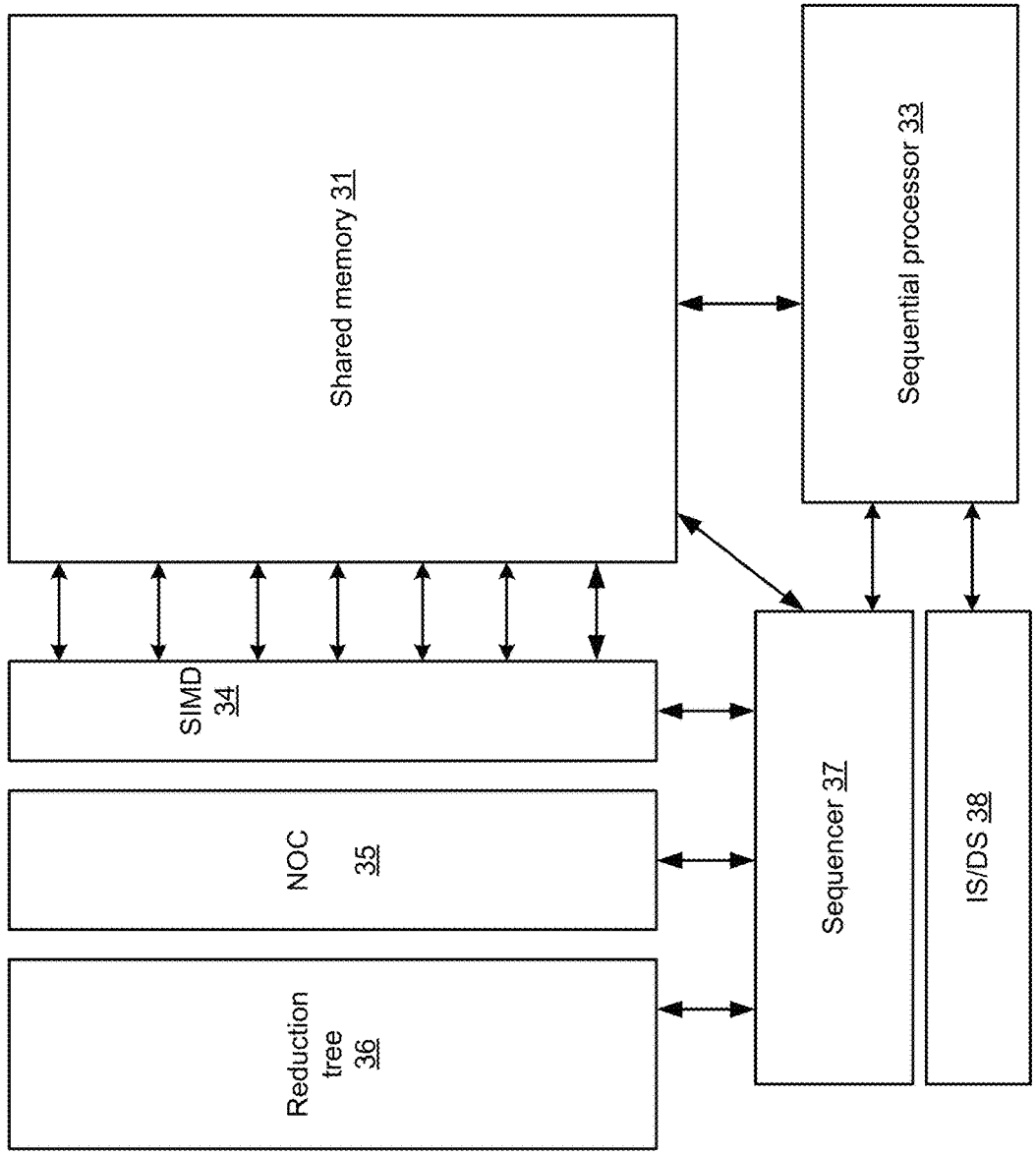
FIG. 3 illustrates a hybrid computer according to an embodiment of the invention.

FIG. 3 details the conceptual architecture of the hybrid processor 30 (also referred to as GP-SIMD processor), comprising a sequential processor 33 (Also termed sequential CPU), a shared memory 31 with two-dimensional access, instruction and data caches, a SIMD processor 34 (also referred to as SIMD coprocessor), and a sequencer 37. Sequencer 37 is also coupled to NOC 35 and reduction tree 36. The SIMD coprocessor contains a large number of fine-grain processing units, each comprising a single bit ALU (for performing bit-serial computations), single bit function generator and register file containing four single bit registers. The GP-SIMD processor is thus a large memory with massively parallel processing capability. No data synchronization between the sequential and parallel segments is required since both the general purpose sequential processor and SIMD co-processor access the very same memory array. Thus, no time and power penalties are incurred for data synchronization between the sequential and SIMD processor.

The GP-SIMD delivers a number of advantages over Conventional SIMD (CSIMD) architecture:

Data processing and data storage are unified. There is no need for data transfer between sequential memory and the SIMD memory;

GP-SIMD allows concurrent operation of the sequential processor and SIMD co-processors on the shared memory, allowing the sequential processor to offload a task to the SIMD while continuing to process some other sequential functions.

The number of GP-SIMD fine grain processing units matches the number of memory rows, striving to match the entire dataset and obtain maximum parallelism.

The GP-SIMD architecture enables the sequential processor to associatively address the memory array. It may thus allow reduction of software complexity for certain sequential algorithms.

GP-SIMD power dissipation is distributed uniformly over the entire processing array rather than being concentrated around a smaller number of large, power hungry processing cores. Thus, there are fewer hotspots leading to further reduction of temperature dependent leakage power [005].

In this application there is provided a description of an integration of a fine grain massively parallel SIMD co-processor with a standard general purpose sequential processor and a shared memory with two-dimensional access, leading to improvement in performance as well as reduction in power dissipation. In this application there is provided a comparative performance and power analysis of GP-SIMD, a Conventional SIMD processor (CSIMD) and an Associative Processor (AP) [0044], supported by analytical modeling. GP-SIMD performance and power are validated with cycle-accurate simulations. It has been found that an inflection point where GP-SIMD outperforms both Conventional SIMD (CSIMD) and Associative Processor (AP) in both performance and power.

Figure 4:
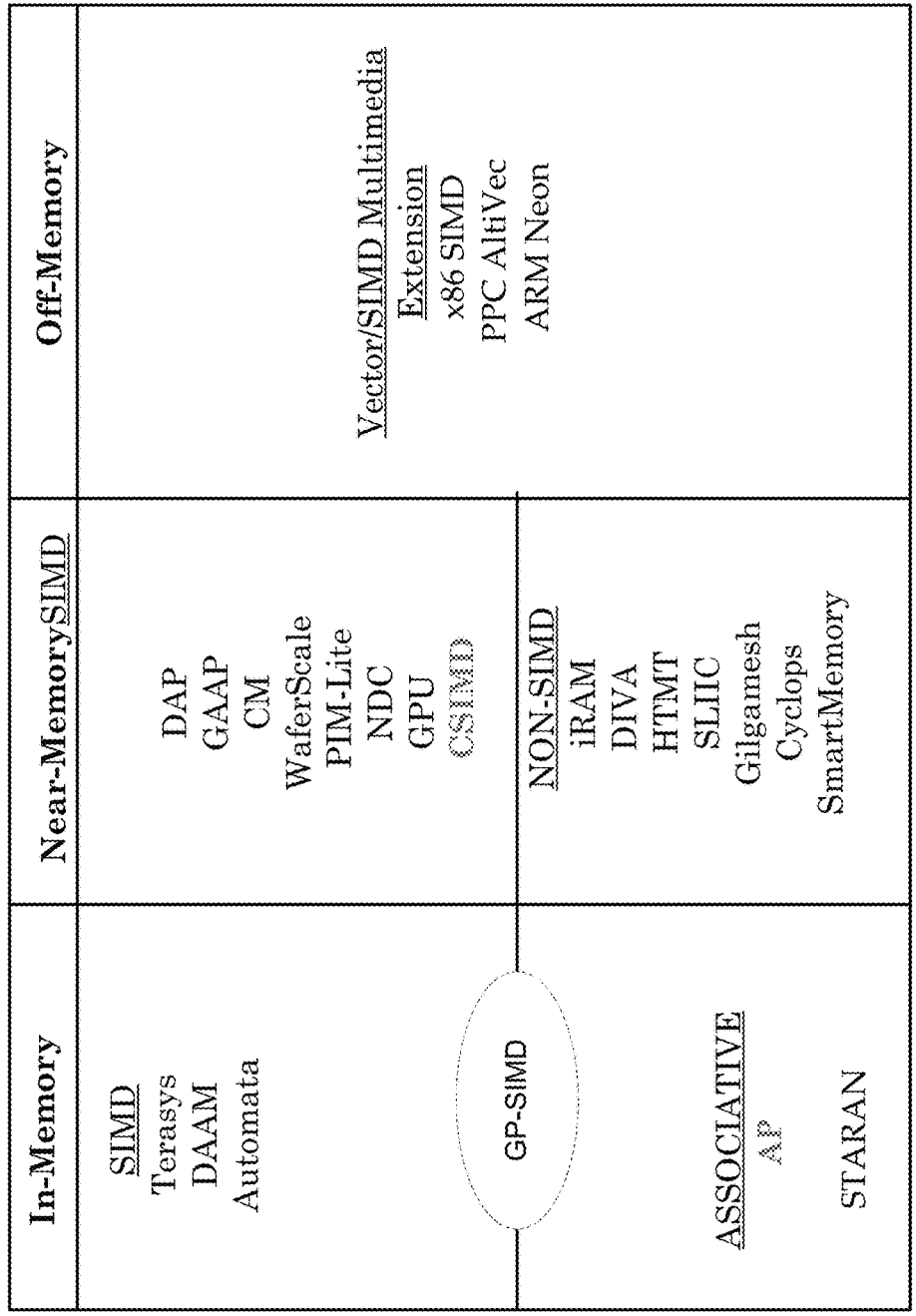
FIG. 4 illustrates PiM and SIMD taxonomy.

FIG. 4 illustrates PiM and SIMD taxonomy—as illustrated by table 40.

The GP-SIMD Processor

Top Level Architecture

The GP-SIMD is a hybrid general purpose and SIMD computer architecture 50 that resolves the issue of data synchronization by in-memory computing, through combining data storage and massively parallel processing.

Figure 5:
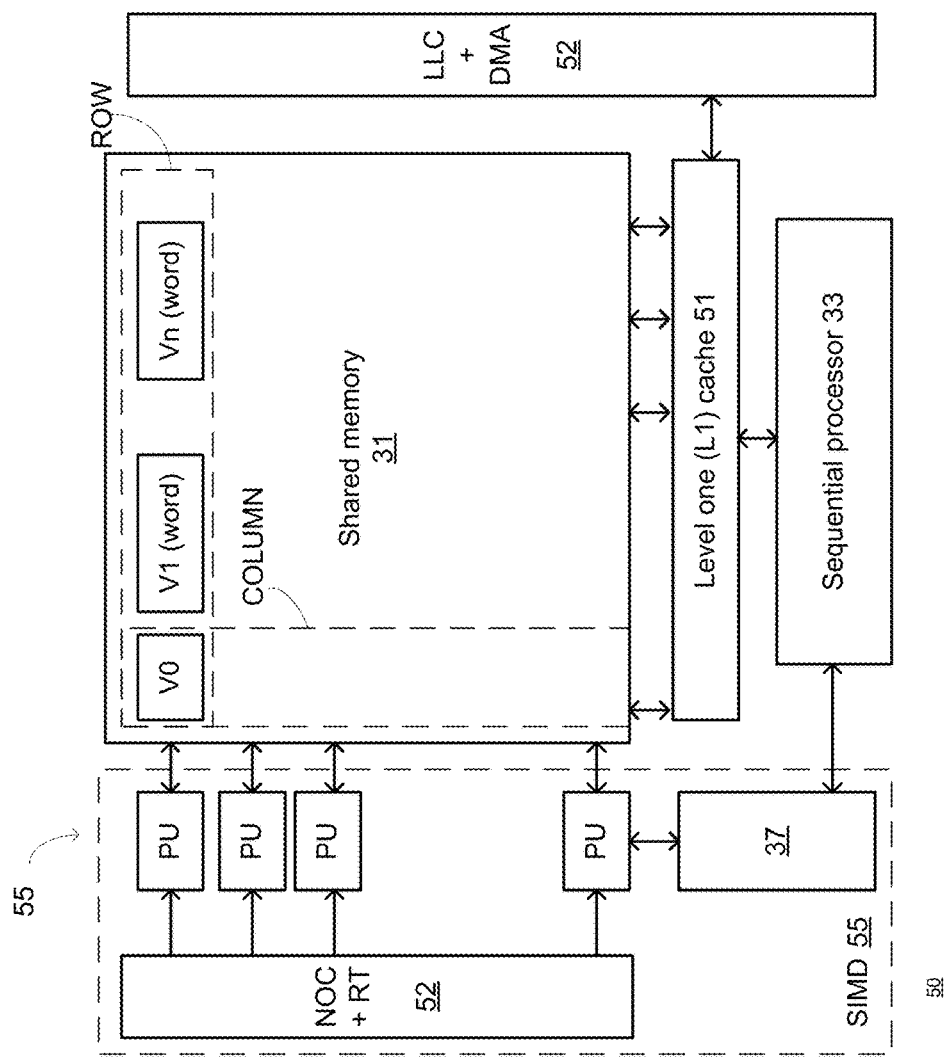
FIG. 5 illustrates a hybrid computer according to an embodiment of the invention.

As illustrated in FIG. 5, references to on-chip memory (shared memory module 31) row and column are physical. Each row may contain many words $V_0$-$V_n$, of software programmable width. The number of rows typically matches the number of dataset elements, D. Each Memory row is allocated a single Processing Unit.

The sequential processor 33 accesses either one word at a time, or multiple words. Typically, such a transaction accesses one physical row at a time.

The SIMD processor 55 reads/writes a bit-slice (having r bits) comprising the same bit-number from all words in some partition of the memory. Physically, it may access multiple bits in a physical row and all rows per access, namely accessing multiple columns of the physical array (one after another).

Figure 6:
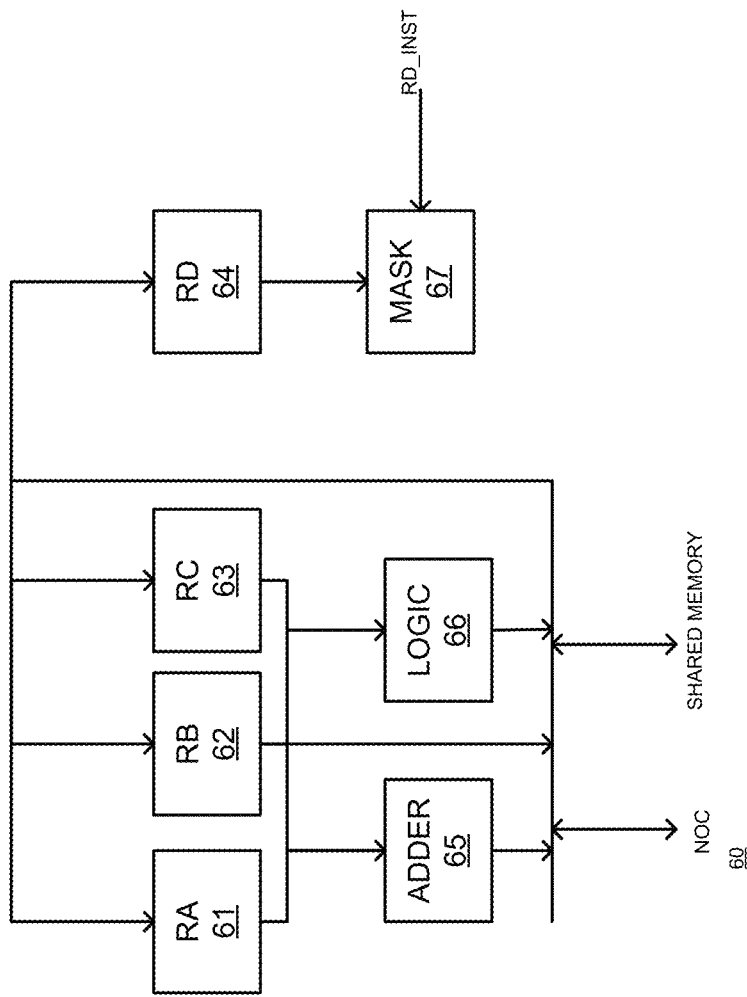
FIG. 6 illustrates a processing unit (PU) of a SIMD processor of the hybrid computer according to an embodiment of the invention.

FIG. 5 details the architecture of a GP-SIMD processor, comprising the sequential CPU 33, shared memory module (array) 31, L1 cache 51, SIMD coprocessor 55, SIMD sequencer 37, interconnection network and a reduction tree (NOC+RT 52) and last cache level and direct memory access controller (LLC+DMA) 52. The sequential processor schedules and operates the SIMD processor via the sequencer. In a sense, the sequential processor is the master controlling a slave SIMD co-processor. Any common sequential processor may be used, be it a simple RISC or a complicated processor. At the very least, the selected processor should execute normal sequential programs. The SIMD coprocessor contains r fine-grain bit-serial Processing Units (PUs), depicted in FIG. 6, each containing a single bit Full Adder ("+") 65, single bit Function Generator ("Logic") 66 and a 4-bit register file, RA, RB, RC and RD 61, 62, 63 and 64. A single PU is allocated per row of the shared memory array, and physically resides close to that row. The PU 60 is illustrates as being connected to mask 67 (that may receive control signals RD_INST), to NOC and to the shared memory module.

Figure 9:
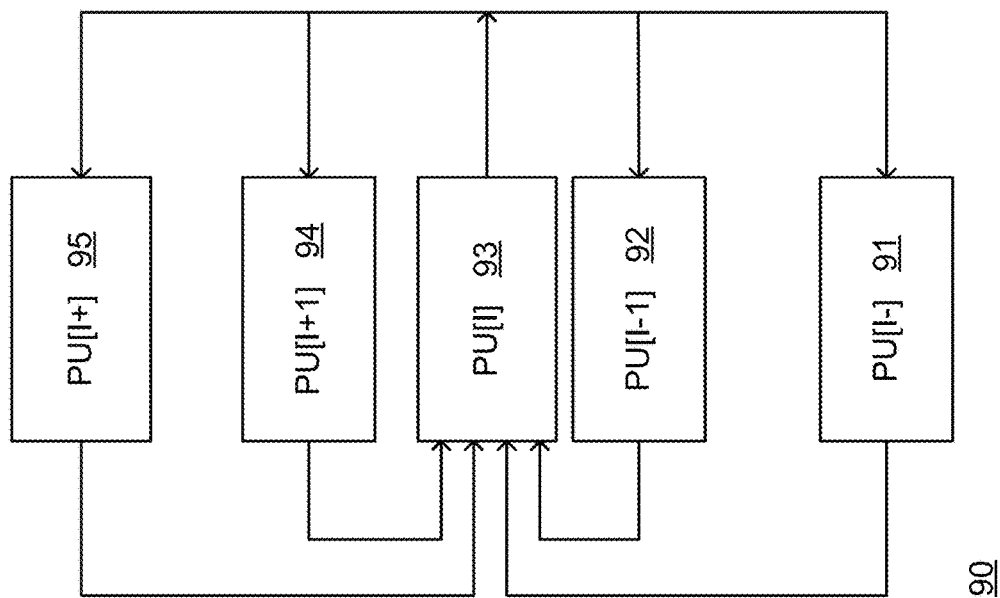
FIG. 9 illustrates multiple processing units of the SIMD processor and the connectivity between these multiple processing units according to an embodiment of the invention.

The PUs are interconnected using an interconnection network (discussed in the context of FIG. 9 below). The set of all row registers of the same name constitute a register slice. Note that the length of the memory row (e.g., 256 bits) may be longer than the word length of the sequential processor (e.g., 32 bits), so that each memory row may contain several words.

Note the key architectural differences between CPUs and GPU/APUs and GP-SIMD: While CPUs and GPU/APUs only share a memory, the GP-SIMD also enables in-memory processing (PIM). Further, while CPUs and GPU/APUs can only access their shared memory in a word-sequential manner, the SIMD of GP-SIMD accesses memory in a word-parallel manner, reaching all memory words at once. In addition, while current CPUs and GPU/APUs access their shared memory through a multi-level cache hierarchy, the SIMD in GP-SIMD accesses the shared memory directly and no transfers to cache are needed. As a result of these differences, [0030] details an advantage of power efficiency (GFLOPS/W) relative to such conventional architectures.

When the SIMD reads data from the shared memory, the contents of a bit slice of the memory are transferred into the register slice (RAs, RBs or RCs). Upon writing to the shared memory by the SIMD, the contents of one of the register slices are transferred into the GP-SIMD memory array. The PU is controlled by micro-instructions that are broadcast by the sequencer to all PUs. Some operations are conditioned by the single bit register RD, as determined by a two-bit field of the micro-instruction, RD_INST. The conditional operations are listed in TABLE 1. These conditional micro-instructions are handy for implementation of a variety of algorithms. While the first four operations are self-explanatory, the last two operations allow the sequential processor to perform associative commands on the memory array.

TABLE 1

Conditional/Masked PU Micro-Instructions

| RD INST | Rd Value | Operation |
|---|---|---|
| 00 | 0 | Memory access (read/write) by the sequential processor or the SIMD co-processor. |
| 00 | 1 | Condtional read command, according to a RD: (RD>0? RB = 0: RB = Memory output) |
| 01 | 0 | SIMD co-processor memory-write of RA |
| 01 | 1 | Conditional write command, according to RD: (RD>0? Memory input = RB: Memory input = RA). |
| 10 | 0 | Conditional (masked) read/write: Disable row for memory access sequential processor. Used during associative access |

TABLE 1-continued

Conditional/Masked PU Micro-Instructions

| RD INST | Rd Value | Operation |
|---|---|---|
| 10 | 1 | Conditional (masked) read/write: Enable row for memory access sequential processor. Used during associative access |

Operating Modes

The GP-SIMD may be operated in three modes:

a. Sequential Processing mode, in which the general purpose sequential processor accesses data in memory during the execution of the sequential segments of a workload; data is typically transferred in lines to and from L1 cache (when the L1 cache line is longer than the row in shared memory, a single line from L1 spans multiple rows).

b. SIMD Processing mode, in which the parallelizable segments of a workload are executed. The SIMD addresses a column of the memory, and reads or writes to all rows of memory. Note that each PU corresponds to a single memory row. Thus in a single SIMD memory access, all PUs simultaneously read from or write into a single column of the memory array.

c. Concurrent Mode, in which both the sequential processor and the SIMD co-processor can access the shared memory.

In contrast with typical operation of Off-Memory SIMD accelerators, the sequential and SIMD processors may operate concurrently. In such a case, the sequential processor issues a SIMD instruction to the SIMD sequencer in a non-blocking manner, and proceeds to execute its own sequential code. The WAIT( ) synchronization instruction waits for the sequencer to complete a pending sequence of SIMD instructions before the sequential processor can proceed. There are no coherency issues (as there are no race conditions). The hardware does not provide special means, rather, the software is designed to enable non-interfering operation of both CPU and SIMD, as demonstrated in [0030]. The memory block is divided into a shared memory segment, which is shared by the sequential processor and the SIMD, and a SIMD-Only segment, which is accessible only by the SIMD. Data does not need to be transferred by SIMD to the CPU. Rather, shared data is created in the shared segment, either by the SIMD or the CPU. Thus, no data synchronization between sequential and parallel segments is required since both the sequential processor and SIMD co-processor access the very same memory array. Consequently, time and power are no longer incurred for data synchronization.

Arithmetic/Logic Operations

Figure 7:
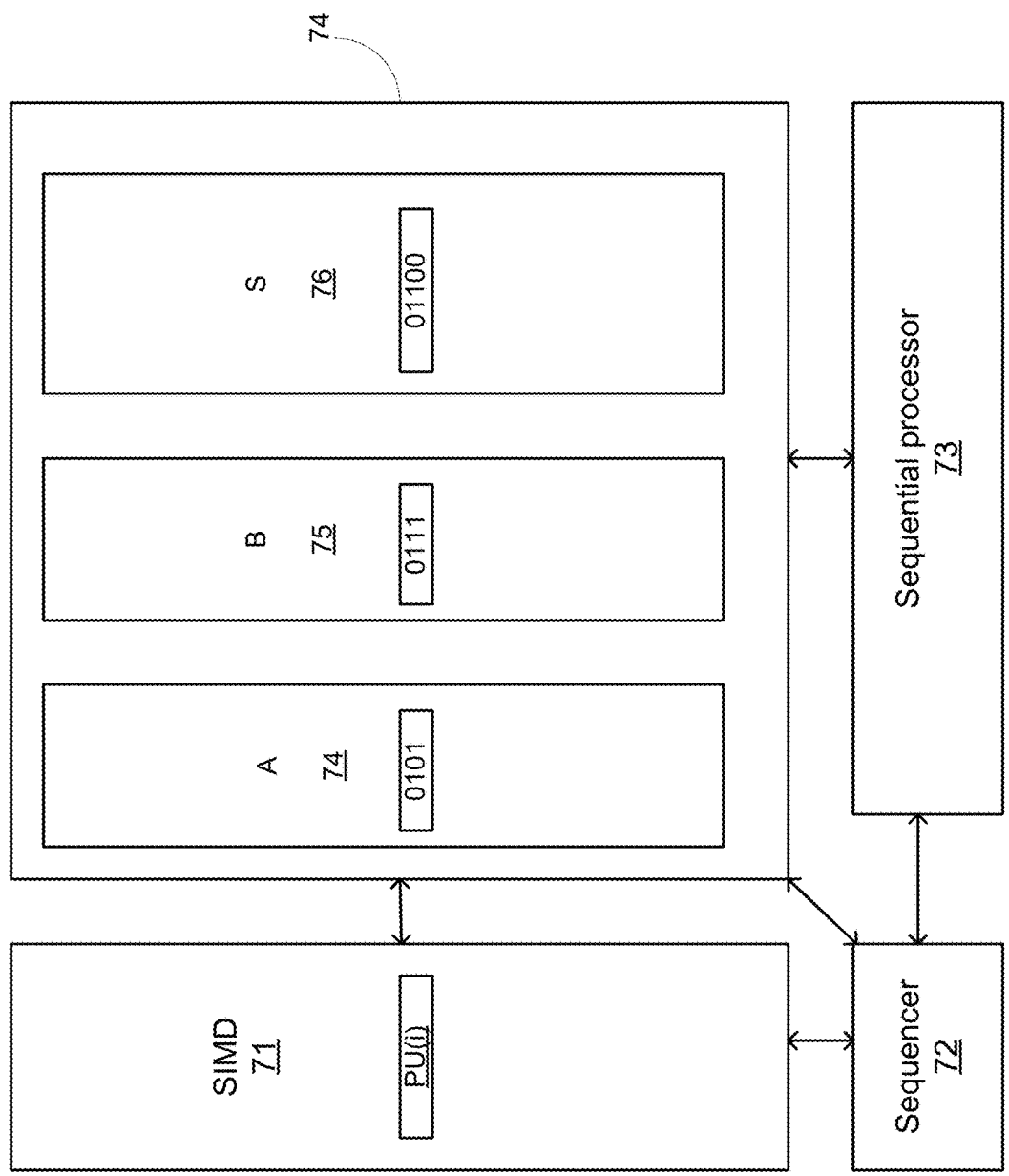
FIG. 7 illustrates a portion of a hybrid computer that stores multiple vectors each including multiple operands according to an embodiment of the invention.

GP-SIMD can implement a wide range of arithmetic and logic processing tasks. Consider a workload using two datasets, A and B, each containing D elements, where each element is m bits wide. These vectors are mapped into the GP-SIMD memory array 74 such that two m bit adjacent column-groups hold vectors A and B (denoted 74 and 75 in FIG. 7), such that each memory row holds a single element of A and B. Assume that there is a need to add the two vectors and place the results into m+1 bit column-group S (denoted 76), as illustrated in FIG. 7 (where m=4). FIG. 7 also illustrates sequencer 72 and sequential processor 73.

The addition is performed in m single-bit addition steps:

$$c[*]|s[*]_i = a[*]_i + b[*]_i + c[*] \forall i=0,\ldots,m-1 \quad (1)$$

where i is the bit index and '*' indexes a PU and a memory row. A bitwise vector addition of datasets having four elements (D=4) of four bits word-length (m=4) is shown in FIG. 8. Six cycles are demonstrated in six sub-figures. Each sub-figure illustrates the PU registers RA, RB, RC and the memory array with the operands A, B and the output S. In cycle 1, column A[0] is copied into RA and RC is reset to all zeroes. In cycle 2, column B[0] is copied into RB. In cycle 3, RA and RB are added; the sum is written into RB and the carry replaces RC. In addition, column A[1] is read into RA. In cycle 4, the sum in RB is copied to S[0]. In cycle 5, column B[1] is read into RB. This process repeats in subsequent cycles. Since addition is carried out simultaneously for all vector elements, fixed point m bit addition consumes $3m \in O(m)$ cycles, independent of the size of the vector D. Note the contrast with CSIMD architectures having k PUs where k<<D, such as 2-16 PUs SIMD accelerators in CPUs; they require $O(D/k) \in O(D)$ cycles to add D data elements.

Fixed point multiplication and division in GP-SIMD are also implemented bit-serially but word-parallel, consisting of a series of add-shift and subtract-shift vector operations. Shift is implemented by appropriate column addressing and therefore requires no extra cycles.

Thus, fixed point m×m bit vector multiplication requires $3m*m \in O(m^2)$ cycles, regardless of the vector size, D. Floating point arithmetic for GP-SIMD is somewhat more complex to implement. IEEE single precision floating point vector multiplication takes close to 2500 cycles, regardless of the length of the dataset, D (assuming the entire dataset fits into GP-SIMD memory).

In This application, we consider single bit processing unit, and single bit SIMD memory access. However, the processing unit and memory access may employ larger word length. In such a case the following considerations may apply:

If the PU is made x-bit parallel with y-bit parallel memory access, the two dimensional memory array should increase, as typical memory rows are single bit high, allowing very few horizontal wires. Note further that y-bit SIMD access to memory complicate sequential processor memory access as a single word is mapped into y separate rows.

If the PU is made x-bit parallel with serial (1-bit) memory access, its sheer size may not allow placing it in the form-factor of memory rows. Further, the PU hardware may become heavily underutilized due to waiting for data.

Matrix Multiplication on GP-SIMD

It is assumed that two input matrices, the N×M multiplier matrix A and M×L multiplicand matrix B, are stored in the GP-SIMD memory in the Coordinate List (COO) format, where nonzero elements are stored along with their row and column indices. The output C=A×B is of dimension N×L. FIG. 22 illustrates the COO storage format 220 of two 2×2 dense matrices; the PUs of the GP-SIMD are shown to the left. Note that the GP-SIMD storage may have large number of memory columns (typically, 256). These memory columns may be grouped together into fields, each representing a variable, flag, etc. Note also that, for efficient implementation, the multiplicand matrix B is stored in a transposed form. Further, each column of the multiplicand matrix B is stored in a number of memory rows round up to the nearest power of two (2 memory rows in the FIG. 22).

In this example, the value field (Val) is allocated 32 bit-slices (memory columns 0:31) to accommodate a single precision floating-point number. The Row and Col fields are allocated 1 bit-slice each (memory columns 32:33).

Dense Matrix Multiplication

Dense matrix multiplication is explained by means of the example of FIG. 22. Element $A_{1,1}$ is to be multiplied by all elements of the first row of matrix B, to form two singleton products. In the same manner, $A_{1,2}$ is to be multiplied by all elements of the second row of the multiplicand matrix B, to form two singleton products, and so on. We thus have three main procedures:

Broadcast: match the row-elements of B with the appropriate column-elements of A (namely, match $A_{*,i}$ with $B_{i,*}$).

Multiply: multiply pairs of matched elements

Reduce: add the singleton products together

The broadcast procedure is performed as a sequence of associative operations on the sequential processor, while Multiply and Reduce are performed as parallel operations on the SIMD processor, as follows. In GP-SIMD, the sequential processor can associatively match rows of memory array with a Key of k bits (in O(k) cycles, cf. Sect. [00266]). Once executed, all rows matching the Key are tagged (RD of the tagged rows contain '1'). The sequential processor can then execute associative read/write from/to the tagged rows (in O(1) cycles), achieving Broadcast.

Figure 23:
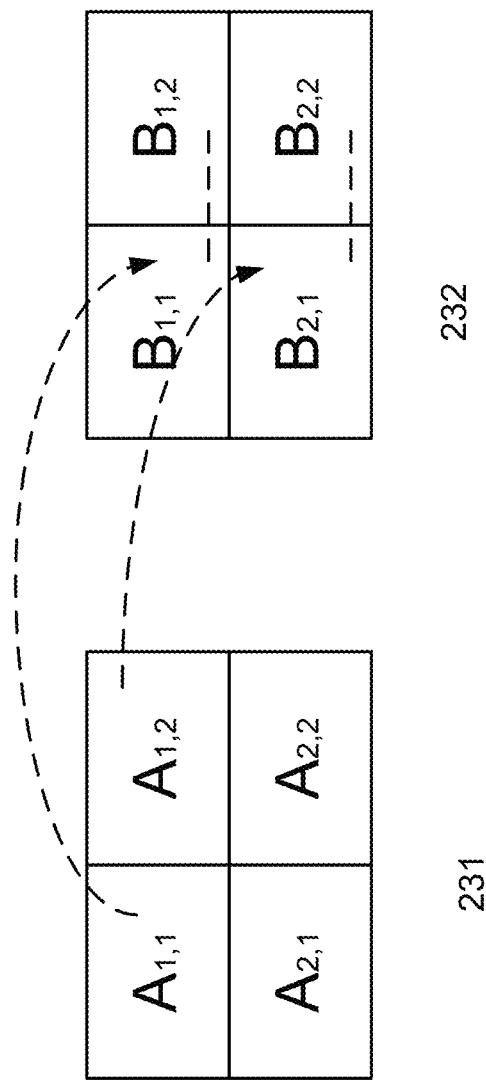
FIG. 23 illustrates a two by two broadcast according to an embodiment of the invention.
Figure 24:
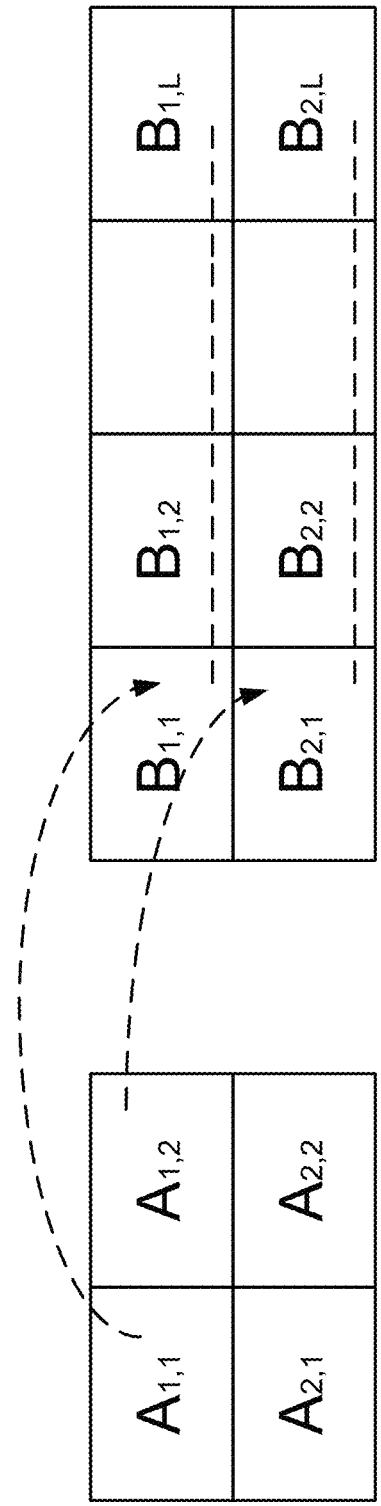
FIG. 24 illustrates a two by L broadcast according to an embodiment of the invention.

FIG. 23 and FIG. 24 illustrate two general cases of broadcast 230 and 240, while FIG. 25 and FIG. 26 demonstrate Broadcast 250 and Multiply 260 on the example of FIG. 22. Starting from the first row of A, the sequential processor fetches $A_{1,1}$ and $A_{1,2}$ (231 and 241), broadcasting (232 OR 242) them one by one to the appropriate rows of B (into temporary field $T_1$), as follows:

Element $A_{1,1}$ is read by the sequential processor (O(1) cycles),

The Row index fields of B are compared with the column index of $A_{1,1}$ ('1') and matching memory rows are tagged (O(1) cycles), $A_{1,1}$ is written into field $T_1$ of the tagged rows (O(1) cycles).

Thus, broadcasting a single element of A into matching pairs of B takes three cycles. In the general case, for N×M multiplier matrix, Broadcast entails O(M log M) cycles per row. Once all elements of the first row of matrix A are broadcast into the appropriate places (as depicted in FIG. 25), a single floating-point multiplication is performed, and M×L singleton products are stored (as illustrated in FIG. 26).

Since the multiplicand matrix B is transposed, the sum of the singletons residing in rows 5 and 6 yields $C_{1,1}$, the first element of the output matrix, and the sum of singletons residing in rows 7, 8 yields $C_{1,2}$. The Reduction process is effectively implemented by the hardware reduction tree. For single precision floating-point vector summation, the hardware reduction tree takes about 32 cycles (bit-serially feeding the 32 bits of the numbers into the tree, which subsequently reduces these number off-line in a pipeline fashion) and following the transfer of these singletons into the tree, processing of the next matrix row (Broadcast and Multiply) is initiated. The outputs of reduction tree are fed directly to the sequential processor that stores the computed elements of C into the designated memory addresses.

Although we detailed a single precision floating-point Broadcast, Multiply, and Reduce procedures, any operand word length may be considered. Further, although the example shows matrices A and B stored in separate PUs and memory rows, typically they would be stored side by side to enable handling larger matrices.

The hardware reduction tree of floating-point operands entails considerable area penalty. For effective implementation, note that Reduce follows a very long Multiply procedure of 2500 cycles. Pipelined Multiply-Reduce is thus preferable, in which a single floating-point accumulator can serially add up to 2500 singleton products, before piping its results to the next level of the tree. With that, the area and power of the reduction tree is kept at bay.

The Broadcast, Multiply, and Reduce procedures are now repeated for the next row of the multiplier matrix A, until all rows have been processed. The pseudo code of the algorithm is depicted below. It includes two nested loops. The external loop goes over the rows of matrix A. The internal loop performs Broadcast of all row elements of A.

Dimensions:
    A: Multiplier, N×M single precision floating-point matrix
    B: Multiplicand, M×L single precision floating-point matrix
Data structure:
    COO: each element accompanied by its row and col indices
Memory column fields:
    A and B: 32b single precision
    ROW_INDEX: COO row index, max(log(N),log(L)) bits
    COL_INDEX: COO column index, log(M) bits
    T: 32b single precision temporary. Used to store singletons
GP-SIMD-DMM(A, B)
    Clear column-field T ~32 cycles
    For all A rows i=1:N
      Broadcast: For all A columns j=1:M
        Read A[i,j] by sequential CPU ~1 cycle
        Tag all rows in B that have ROW_INDEX == j O(log(M))
        Conditional write A[i,j] to T in tagged rows ~1 cycle
      Multiply: Multiply B by T, store the results into T
      Reduce: Reduction tree on column-field T
      Store outputs in designated space
end The complexity of the algorithm is as follows:

$$M(1+\log_2 M+1)+C_{Mult}+C_{Reduction} \qquad (2)$$

where $C_{Mult}$=2500 cycles and $C_{Reduction}$=32 cycles.

Note that for large N, M, the complexity of GP-SIMD DMM approaches O(NM $\log_2$ M) and O($N^2$ $\log_2$ N) for square matrices. For example, the estimated complexity of multiplying a 10,000×10,000 matrix A exceeds 1B cycles.

The GP-SIMD DMM algorithm may also be used for multiplying dense matrix by dense vector, but it takes the same number of cycles regardless of the number of columns (L) of B (as illustrated in 24). Thus, the efficiency of the GP-SIMD DMM algorithm grows with the number of columns of the multiplicand matrix B (efficiency is defined as the number of actually performed arithmetic operations divided by the number of PUs times total cycle count, namely the maximum number of operations possible during the execution time).

d. Sparse Matrix Multiplication

The following description refers to an example of an implementation of multiplication of sparse matrix A by dense matrix B. The algorithm is similar to dense matrix multiplication but instead of processing all N×M elements of A, we only process the nonzero elements:

Broadcast is executed only for nonzero elements of A,

Multiply and Reduce are performed only for nonzero rows of A.

The pseudo code of the GP-SIMD SpMM algorithm is depicted below:

Dimensions:
    A: Multiplier, N×M single precision floating-point sparse matrix
    B: Multiplicand, M×L single precision floating-point dense matrix -continued

```
Data structure:
    COO: each element accompanied by its row and col indices
Memory column fields:
    A and B: 32b single precision
    ROW_INDEX: COO row index, max(log(N),log(L)) bits
    COL_INDEX: COO column index, log(M) bits
    T: 32b single precision temporary. Used to store singletons
GP-SIMD-SpMM(A, B)
    Clear column-field T↺ ~32 cycles
    Last_row=1;
    While (not end of matrix A)
        Broadcast: Read the next value of A↺ ~1 cycle
            Store the element's row index into current_row_index
        If(Last_row<current_row_index)
            Multiply: Multiply B by T, store the results into T
            Reduce: Reduction tree on column-field T
            Store outputs in designated space
            For i=1: current_row_index- Last_row-1 //skip empty rows
                Store zero outputs in designated space
            Last_row=current_row_index;
            Clear column-field T↺ ~32 cycles
        Broadcast: Tag all rows in B that have ROW_INDEX == j↺
O(log(M))
        Broadcast: Conditional write A[i,j] to tagged column T↺ ~1 cycle
end
```

The complexity of GP-SIMD SpMM is approximately $$N_{NNZ}[M_{NNZ}(1+\log_2 M+1)+C_{Mult}+C_{Reduction}]$$

Where $N_{NNZ}$ is the number of nonzero rows of matrix A and $M_{NNZ}$ is the average number of nonzero elements per row (equal to number of nonzero elements of the multiplier matrix A, denoted by $A_{NNZ}$, divided by $N_{NNZ}$). Thus, for large $N_{NNZ}$, $M_{NNZ}$, the complexity of the algorithm approaches $O(A_{NNZ} \log_2 M)$. For example, given sparse 10,000×10,000 matrix A with only 1,000 nonzero elements ($10^{-5}$ density) and large $M_{NNZ}$, the complexity of GP-SIMD SpMM is about 16,000 cycles, $10^5$ times shorter than GP-SIMD DMM. Similar to the GP-SIMD DMM algorithm, GP-SIMD SpMM efficiency grows with the number of columns in the multiplicand matrix B.

Note that GP-SIMD SpMM is similar to GP-SIMD DMM, except for several cycles spent by the sequential processor handling matrix indices. It is thus preferable to employ the GP-SIMD SpMM algorithm even for dense matrices (with a minor modification for skipping zero elements). Hence, in the following section, only the results of GP-SIMD SpMM cycle accurate simulations are presented.

Associative Operations

GP-SIMD, besides being a massively parallel SIMD accelerator, can implement classical CAM operations such as associative search, sorting and ordering. The CAM allows comparing all data words to a key, tagging the matching words, and possibly reading some or all tagged words one by one. Consider a large vector, where each element is m bits wide, illustrated by column A in FIG. 7. The Sequential processor wishes to find all elements in vector A 74 matching a certain Key of m bits, and reset the matched values of A (that is, A[i|A[i]==Key]=0). The sequential CPU issues a compare of Key on column A, storing the single bit-slice compare results output in register RD (of processing units). At this point, register RD has logic one in the rows where A matches the Key and zero elsewhere. Next, a masked write is performed by the sequential processor only to flagged rows of the memory array. To that end, RD enables writing of each memory row (RD_INST='10', cf. TABLE 1), and the sequential processor writes '0' to the A column of the memory array. Only the matching rows are enabled for writing, and the A values of only these rows are reset. Elsewhere, in non-matching rows, the A values are left unaffected.

Content-addressable access is achieved as follows. Assume that the memory array contains a vector of unique indices (A), adjacent to a vector of data (B). Comparing vector A with a key, followed by setting the RD_INST Bus to '10' while issuing read to the memory array, allows the sequential processor to fetch a single value of vector B, corresponding to the row in which vector A matched the Key (that is, Output=B[i|A[i]=Key]). When multiple rows match the key, the values must be read one by one. The associative commands have proved valuable for efficient implementation of, e.g., sparse matrix multiplication. In addition, GP-SIMD can also implement a TCAM.

Interconnection Network

Arithmetic, logic and associative operations presented above require the relevant operands to be available at the memory row of the PU. However, common workloads require inter-PU data communications. Depending on the workload, communication requirements may vary from no communication (for "embarrassingly parallel" tasks such as Black-Scholes option pricing) to relatively intense communications (e.g., for FFT). In some cases, support for special pre-defined communication patterns or permutations can be useful (e.g., the permutations required for FFT). A dedicated interconnect is employed to allow all PUs to communicate in parallel.

Since GP-SIMD processing operation is mainly bitwise, the interconnection can be a relatively simple circuit-switched network. An example of an efficient network is a ±8 nearest neighbor, as in FIG. 9 showing seventeen PUs PU[I−8]91 . . . PU[I−1]92, PU[I]93, PU[I+1]94 . . . PU[I+8]95. Each PU has a single bit direct access to its ±Y (in FIG. 8 Y equals eight but only some of the PUs are shown) neighbors, where $Y \in \{1,2,4,8\}$. Transferring in parallel an entire vector of D rows by H rows up or down entails approximately H/8 cycles, independent of the vector size, D.

Reduction Tree

Figure 10:
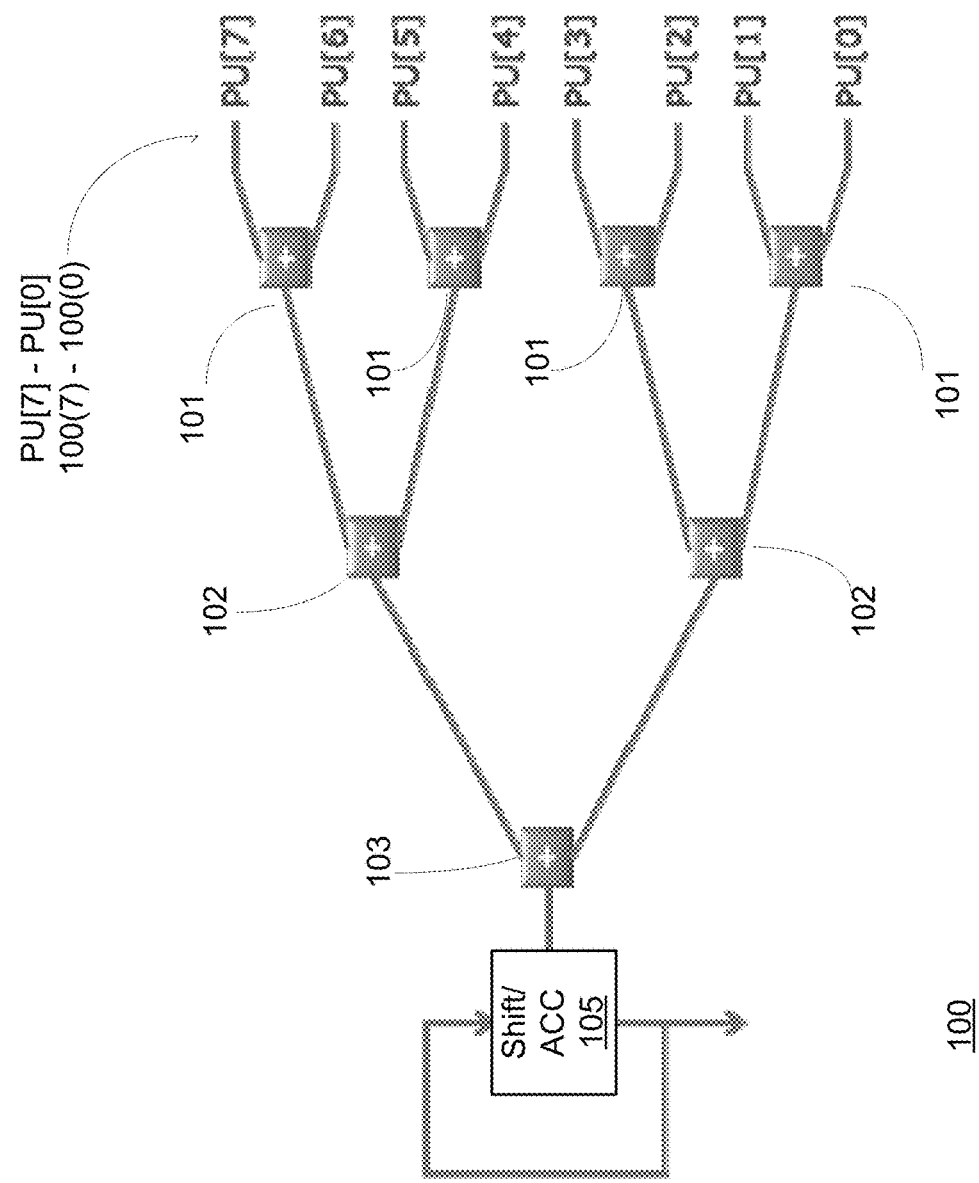
FIG. 10 illustrates a hardware reduction tree according to an embodiment of the invention.

A common reduction operation sums up a large array of values. Other common reduction operations are minimum or maximum. Reduction Tree (earlier introduced as a 'response counter' in) is an adder tree, enabling bit-serial parallel summation of PU values. Consider a vector A of D fixed point m-bit elements, as illustrated in FIG. 7. Further, consider a hardware reduction tree implemented using a pipelined binary adder tree. The first level of the tree sums two single bits from two adjacent PUs. Following $\log_2 N$ levels, the scalar sum of the entire array becomes available, as illustrated in FIG. 10. The fixed precision summation of vector A entails reading a single column slice of vector A, LSB first, and summing this column via the reduction tree. The addition is carried out simultaneously for all vector elements, column-slice at a time until all m columns have been processed. The m outputs of the adder tree are summed together using an accumulator, where in each summation loop, the output of the adder tree is shifted left corresponding to the bit location being processed. Therefore, fixed point m bit reduction entails $O(m+\log_2(N)+1) \in O(m+\log_2(N))$ cycles. Partial sums in the intermediate levels are also available to the sequential processor; this is used, for instance, in DMM. FIG. 10 illustrates the outputs of eight PUs PU[0]-PU[7]100(0)-100(7) that are coupled to a hardware reduction tree that includes three levels of adders 92, 82 and 93 that are coupled to each other in a binary format and a shifter/accumulator 95.

The reduction tree can also be implemented in software using the PUs and the interconnection network. Consider for example a vector A of eight fixed point 7-bit elements, as in FIG. 11. Vectors T, S contain partial sums.

Similarly to the hardware implementation, the parallel binary tree is implemented as follows:

In the first (initialization) step 111, vector A is copied onto S.

In the second step 112, vector S is shifted one row up and stored in vector T, followed by adding vectors T and S. The oddly addressed elements of vector S contain the results of the first step of the binary tree addition.

In the third step 113, vector S is shifted two rows up and stored in vector T, followed by adding vectors T and S. Vector S now contains the results of the second level of the addition tree.

In the fourth step 114, vector S is shifted four rows up and stored in vector T, followed by adding vectors T and S. Vector S now contains the results of the third level of the tree, and the sum of all elements of A appears in the first element of S.

In general, given a $\pm \log_2 N$ interconnection network, fixed point m-bit reduction entails $O(2m+(2m+3m) \log_2(N)) \in O(m \log_2(N))$ cycles. In case of large datasets and limited interconnection networks, the last few shifting and summation steps can be executed serially by the sequential processor, so as to save processing time and power.

Circuit Implementation

Figure 12:
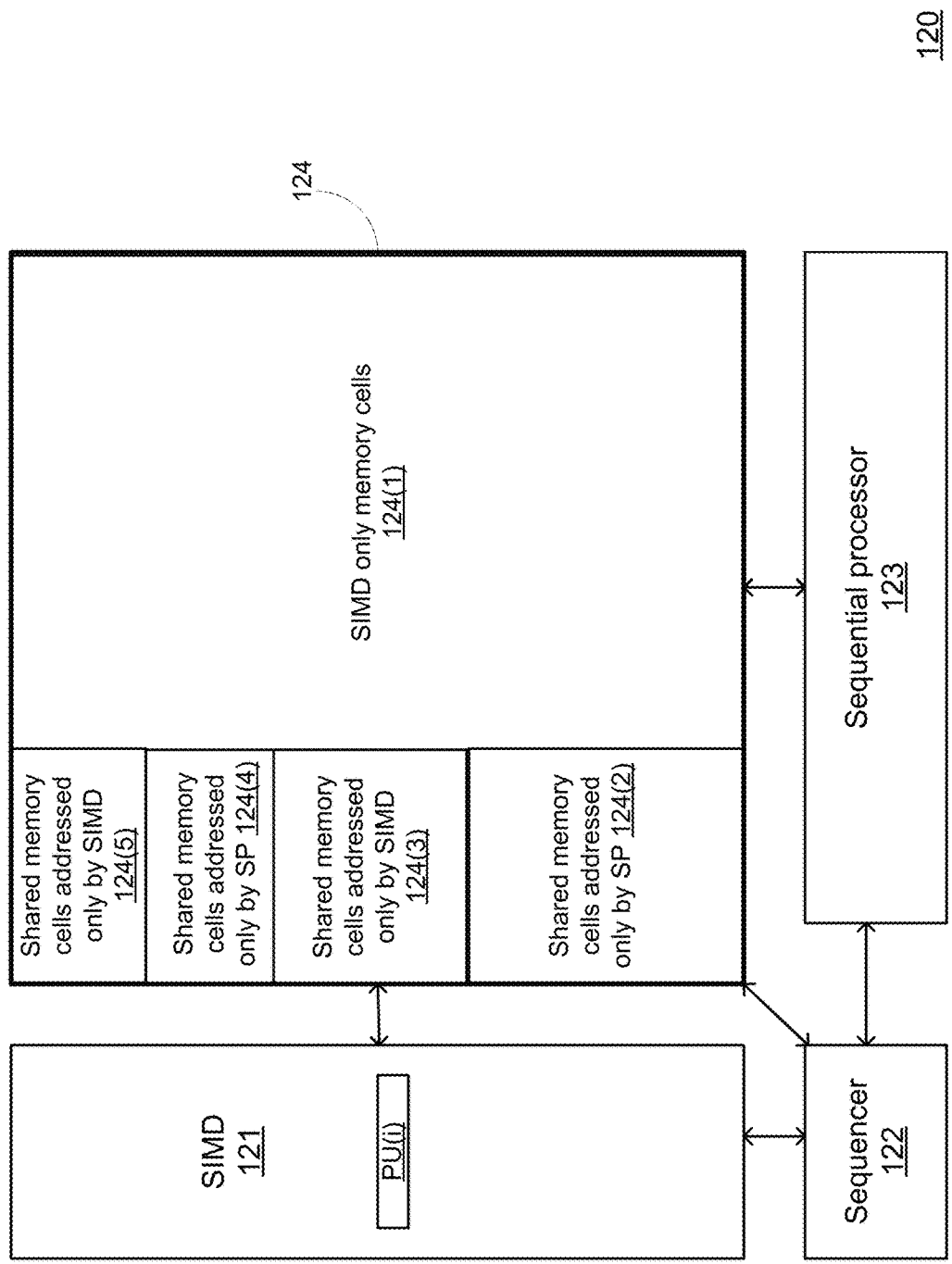
FIG. 12 illustrates a segmentation of a shared memory module of the hybrid computer according to an embodiment of the invention.

The GP-SIMD PU utilizes its memory row as its register file for storing variables and temporaries. The width of the memory array is much higher than the word width of the sequential processor (e.g. 256 distinct columns vs. 32-bit word). A typical GP-SIMD memory array 124 is depicted in FIG. 12. To enable 2D access (word access by the sequential processor and column access by the SIMD co-processor), two types of cells are proposed. Shared memory cells are included in the left columns of the GP-SIMD memory array while SIMD only memory cells are located at the right columns of the GP-SIMD memory array. Software may control the access to different rows of the shared memory cells—thus resulting in a software based partition to provide regions 124(2), 124(3), 124(4) and 124(5). The software based partition may use a mask. The mask can be stored in a column of the GP-SIMD memory array and be fed into the processing units of the SIMD. For example a set bit can be read as an enable and a reset bit can be read as a disable. Processing units that are fed with reset mask bits are prevented from reading their rows.

Figure 13:
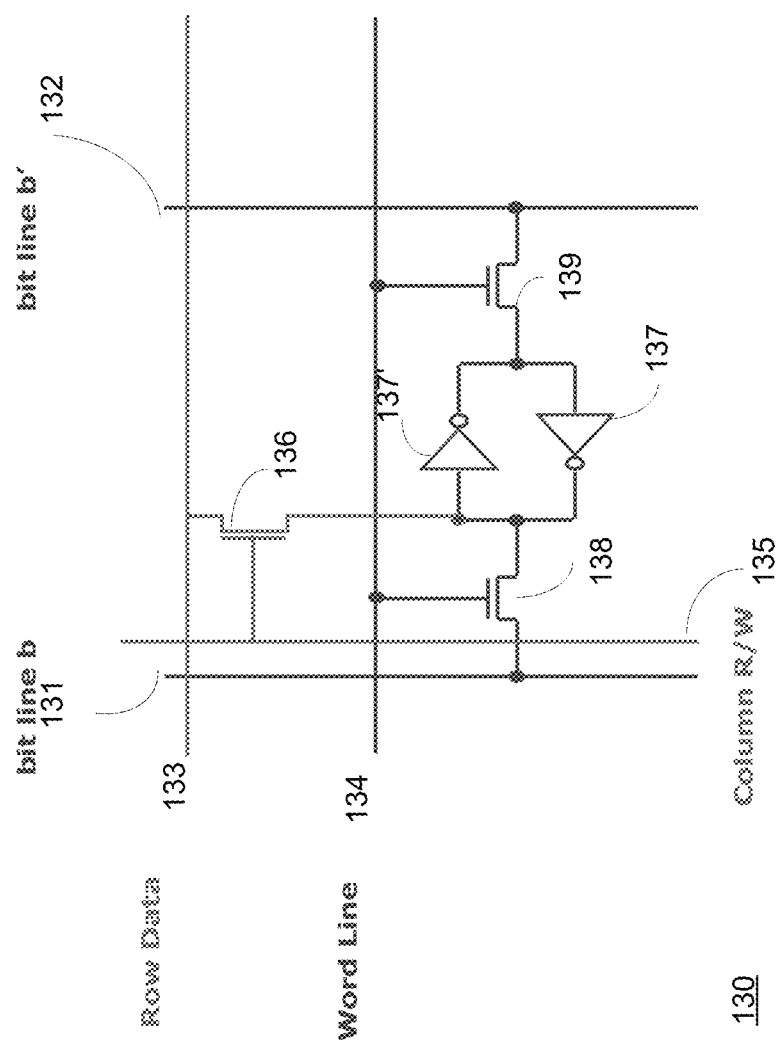
FIG. 13 illustrates a shared memory cell a shared memory module of the hybrid computer according to an embodiment of the invention.
Figure 14:
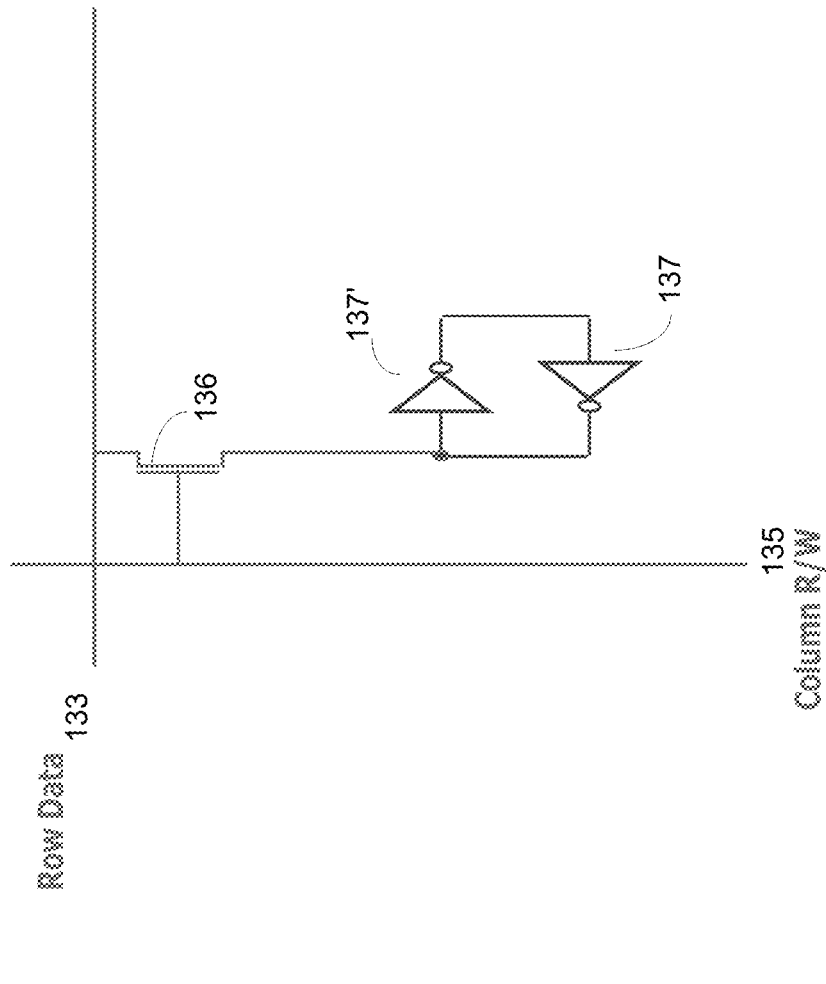
FIG. 14 illustrates a non-shared memory module of the hybrid computer according to an embodiment of the invention.

A shared-memory cell consisting of a 7-transistor SRAM bit (transistors 136, 138, 139 and transistors in inverters 137 and 137' of a latch) is used in the shared columns (cell 130 of FIG. 13), and a SIMD-Only cell using a 5-transistor cell (transistor 136 and transistors in inverters 137 and 137' of a latch) is used in the SIMD-only columns (cell 140 of FIG. 14).

In the shared-memory cell, the standard 6T SRAM bit cell (including transistors 128, 138, latches 137 and 137' as well as bit_line 131, bit_line' 132 and word_line 134) is amended by a pass-gate (transistor 136) to enable column read/write access (column_line 135 and row_Data 133).

In the SIMD-only static bit cell (FIG. 14), a 4T latch (including inverters 137 and 137') is connected by a pass-gate (136) to enable column read/write access. The bit_line, bit_line_not, word_line and associated pass-gates of FIG. 13 are eliminated in FIG. 14 as the sequential processor does not address these cells. Reading and writing to the two dimensional memory array is performed as follows:

e. By sequential processor: to read data from memory, the bit_line and bit_line-not lines are pre-charged, the word_line is asserted, and the bit lines are sensed. To write data to the memory, the bit_line, bit_line-not and the word_line are asserted.

f. By SIMD co-processor: to read data from memory, the column_line is asserted, and the row_data is pre-charged. To write data to the memory, the column_line and the row_data are asserted.

Figure 16:
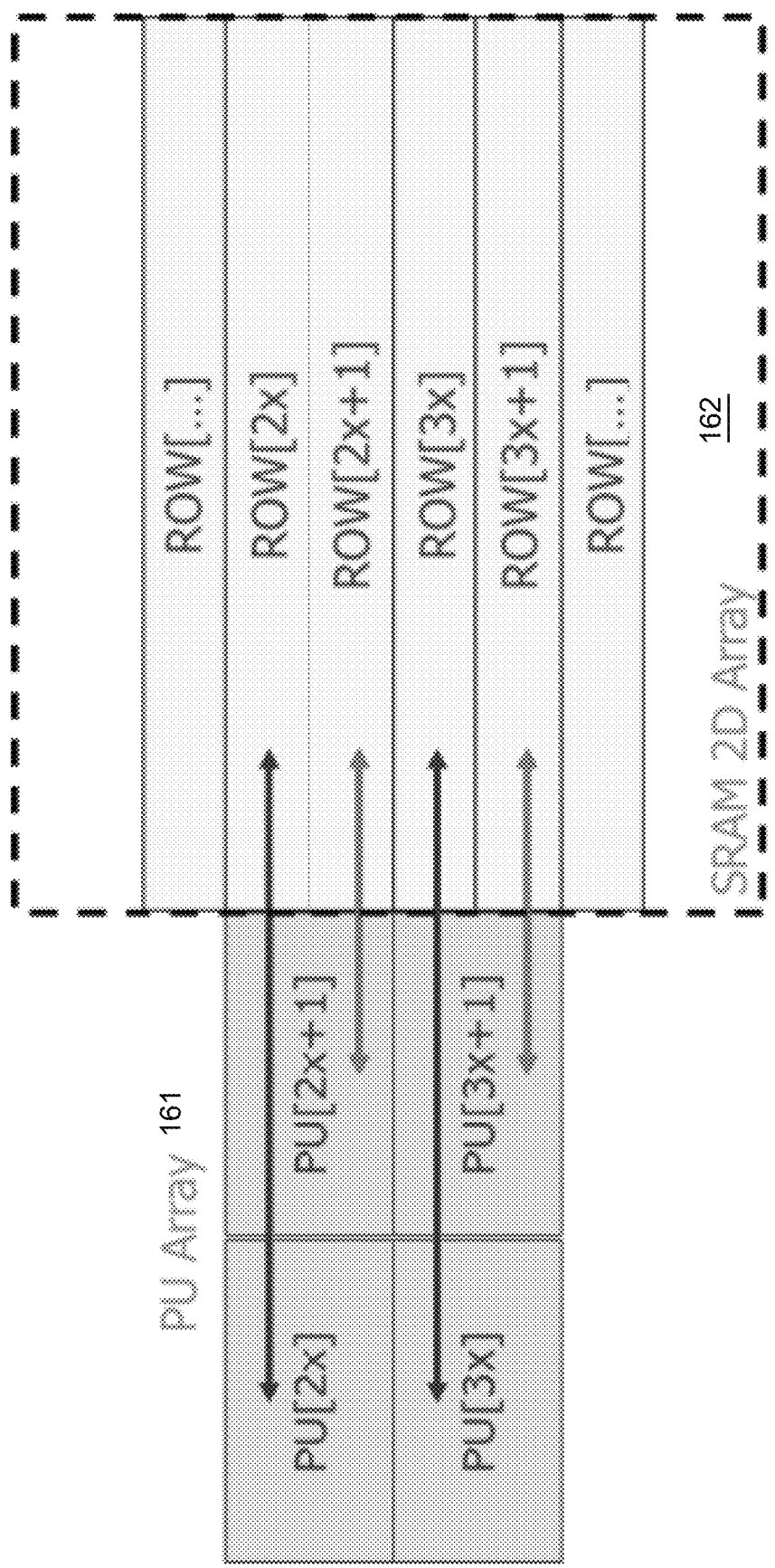
FIG. 16 illustrates a staggered processing unit layout according to an embodiment of the invention.

When the width of the memory is sufficiently small (e.g., 256 columns), a single pass-gate transistor is tied to the row data. In wider arrays, a differential pair, namely, row_data and row_data-not and an additional pass-gate transistor may be required. GP-SIMD's 6T and 5T SRAM cell outweigh the AP 12T cell of [0044] both area and power-wise. For the same die area, GP-SIMD array thus packs nearly twice the number of memory rows, and offers twice the AP performance for the same die area. These cells have been validated with Spice and demonstrate no degradation in performance vs. standard SRAM cell. There are several alternatives to placing the PUs alongside the memory rows: (1) Customized layout positioning the PU within the pitch of the memory rows, specifically since the size of the PU is relatively small; (2) k PUs placed side by side next to k memory rows, as in FIG. 16 (see PU array 161 and SRAM 2D array 162); (3) PUs placed on both sides of the memory block. To account for possible place and route mismatch, the analysis reserves 15% spare area.

The memory architecture enables the sequential processor and the SIMD co-processor to concurrently read from and write to the shared memory. Further, the architecture inherently allows segmentation of the memory array along both dimensions, so as to avoid conflict and allow processing on parts of the data, as follows:

g. Segmentation in the horizontal dimension: since the memory width is larger than sequential processor data-bus (for example, 64 bit data-bus and 256 bit wide array), the SIMD co-processor may be programmed to read from the entire memory array, but write only to the SIMD-Only section, while the sequential processor continues to process the shared memory space.

h. Segmentation along the vertical dimension: RD can be used to mask the word_line of certain rows.

i. Full segmentation: Access by the sequential processor and the SIMD co-processor may be interleaved, to avoid all interference.

The sequential processor may not have access to the entire SIMD memory. Thus, the software must assure minimal transfers between the Shared and SIMD-Only segments. Since the number of memory rows in a typical GP-SIMD implementation could be quite high (above one million), the GP-SIMD array can be partitioned into n smaller blocks each having D/n processors (and D/n complete memory rows). Each block could have, for example, its own sequencer. In such a case, all blocks share a piped version of the bus to the sequential processor.

Figure 15:
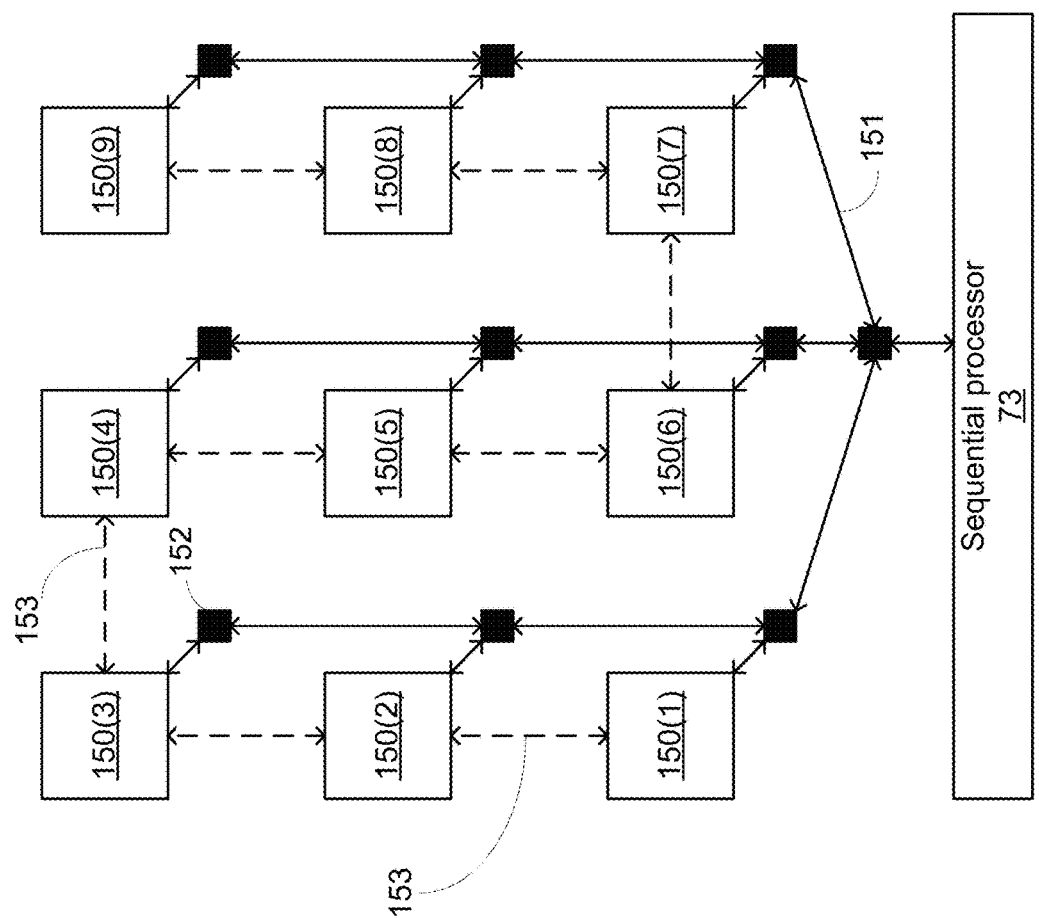
FIG. 15 illustrates a partitioning of a shared memory module of the hybrid computer according to an embodiment of the invention.

A potential layout of such an implementation is depicted in FIG. 15 in which a GP-SIMD array is partitioned into nine smaller blocks 150(1)-150(9), each having D/9 PUs and associated memory rows. Note the connectivity simplicity—the interconnection network 153 that coupled the blocks is chained, and the sequential processor 73 has a memory bus 151 that is connected to all blocks in parallel.

Note that since the sequential processor accesses no more than a single memory row at a time, such access involves only a single GP-SIMD block and the path to it; only that path is activated to conserve power. Reading data from a GP-SIMD block could entail a few cycles due the long path the signal may have to traverse. To mitigate such access delays, the sequential processor includes a (write through) data cache. If cache hierarchy exists, the shared memory array having a designated and distinct address space, shall connect to the sequential processor's L1 cache (see FIG. 5). While the sequential processor may retain a typical cache hierarchy, data that needs SIMD processing may be fetched directly into the shared memory bypassing L1. Since most processing is done in the shared memory array, the GP-SIMD architecture may not incorporate higher level of cache hierarchies beyond L1. As described in [0030], 8 million rows of PUs, each having 256 bits memory rows, and a reasonably sized sequential processor would occupy close to 200 mm² in 22 nm technology.

GP-SIMD Programming Model and Performance

The SIMD co-processor is controlled by its sequencer. The sequencer converts each SIMD instruction into a sequence of micro-instructions for the SIMD PUs. The SIMD instruction set is listed in TABLE 2, and the special sequential processor instruction set is listed in TABLE 3. In contrast with typical operation of Off-Memory SIMD accelerators, the sequential and SIMD processors of GP-SIMD may operate concurrently. The sequential processor issues a SIMD instruction to the SIMD sequencer in a non-blocking manner, and proceeds to execute its own sequential code. Naturally, the sequencer does not process an instruction prior to completing the previous one. The WAIT( ) instruction waits for the sequencer to complete its pending sequence of SIMD instructions before the sequential processor can proceed. TABLE 2 also summarizes the arithmetic/logic performance of the SIMD co-processor. The SIMD instruction sequences are either programmed manually or generated by compilers. Typically, SIMD operations should be made available as library functions.

TABLE 2

SIMD Instruction Set

| Instruction | Type | Performance (cycles) |
|---|---|---|
| INV (SRC, DST) | Logic | $(1 + 2m) \in O(m)$ |
| AND/OR/XOR (SRC1, SRC2, DST) | Logic | $(1 + 3m) \in O(m)$ |
| ANDI/ORI/XORI (SRC1, SRC2, DST) | Logic (Imm.) | $(1 + 2m) \in O(m)$ |
| ADD/SUB_FIXED (SRC1, SRC2, m, DST) | Arith., Fixed Point | $(1 + 3m) \in O(m)$ |
| ADD/SUB_FP (SRC1, SRC2, DST) | Arith., FP | 600 |
| MUL/DIV_FIXED (SRC1, SRC2, m, DST) | Arith., Fixed Point | $m(1 + 3m) \in O(m^2)$ |
| MUL/DIV_FP (SRC1, SRC2, DST) | Arith., FP | 2500 |
| UP_/DOWN_FIXED (SRC, NUM, m, DST) | NoC., Fixed Point | $(1 + 2m) \in O(m)$ |
| UP/DOWN_FP (SRC, NUM, DST) | NoC., FP | 65 |
| CPY_FIXED (SRC, m, DST) | Arith., Fixed Point | $(2m) \in O(m)$ |
| CPY_FP (SRC, DST) | Arith., FP | 64 |
| RED_SW_FIXED (SRC, m, DST) | Reduction, SW, Fixed | $(1 + 3m + 1 + 2m) \log_2 N \in O(m \log N)$ |
| RED_SW_FP (SRC, DST) | Reduction, SW, FP | $(600 + 1 + 64) \log_2 N \in O(\log N)$ |
| RED_HW_FIXED (SRC, m, DST) | Reduction, HW, Fixed | $(1 + m + \log_2 N) \in O(m + \log N)$ |
| RED_HW_FP (SRC, DST) | Reduction, HW, FP | $(1 + 32 + \log_2 N) \in O(\log N)$ |

TABLE 2-continued

SIMD Instruction Set

| Instruction | Type | Performance (cycles) |
|---|---|---|
| READ_RD (COL) | Read a col into RD | 1 |
| READ_MASK (COL) | Masked Read | 1 |
| WRITE_MASK (COL, DATA, m) | Masked Write | 1 |
| READ_COND (COL, DATA, m) | Seq. Associative Read | 1 |
| WRITE_COND (COL, DATA, m) | Associative Write | |
| COMPARE (DATA, COL, m) | Associative Compare | $(1 + m) \in O(m)$ |

TABLE 3

Sequential Processor Special Instruction Set

| Instruction | Type | Performance (cycles) |
|---|---|---|
| SP_READ (ROW, COL, m) | Seq. Proc. Read | 1 |
| SP_WRITE (ROW, COL, DATA, m) | Seq. Proc. Write | 1 |
| WAIT ( ) | Synchronization | |

Mnemonics:

SRCx Source column (LSB of the variable's source)

DST Destination column (LSB of the variable's destination)

FIXED Fixed point arithmetic

FP Floating point arithmetic

Due to the novel bitcell of the GP-SIMD shared memory array (FIG. 13-FIG. 14), SP_READ and SP_WRITE may be executed concurrently with SIMD operation. The software should avoid writing conflicts by both processors to the same memory rows and columns. Analysis Analytic Model and Comparative Analysis In this section, we provide an analytical performance and power consumption model of the CSIMD, AP and GP-SIMD and compare their relative performance, area and power consumption under constrained area and power resources. For the purpose of modeling, it is assumed that the sequential processor is identical in all architectures, and focus on concurrent workloads. We further assume that the CSIMD executes a single fused multiply-add operation in 1.5 GHz, while the GP-SIMD and AP employ faster clocks of 2.5 GHz, as they execute bitwise rather than word-parallel instructions and thus have shorter critical paths.

Consider a workload having WL single cycle instructions (i.e., arithmetic, control, register file access and alike). The workload consists of N fine grain concurrent execution segments, requiring $T_{Ref}=WL*1$ cycles to execute on a baseline reference floating point engine capable of performing 1 FLOP/Cycle (single precision floating point operation per cycle). Such floating point engine consumes an area of 0.01 mm² in 45 nm and dissipates 10 mW. With 22 nm process technology, the same floating point engine would consume an area of 0.003 mm² and dissipate roughly 5 mW. These figures pertain to a baseline floating point engine, without the accompanying connectivity logic, register file and the like.

A portion of the workload instructions, $C_{Sync}$, is dedicated to data synchronization before and after each segment starts and ends respectively, while a further portion of the workload, $C_{Inter}$, is dedicated to data exchange among the execution units. The remaining portion of the workload, $C_{Proc}$, is actual processing.

have: $C_{Proc}+C_{Sync}+C_{Inter}=1$

Figure 27:
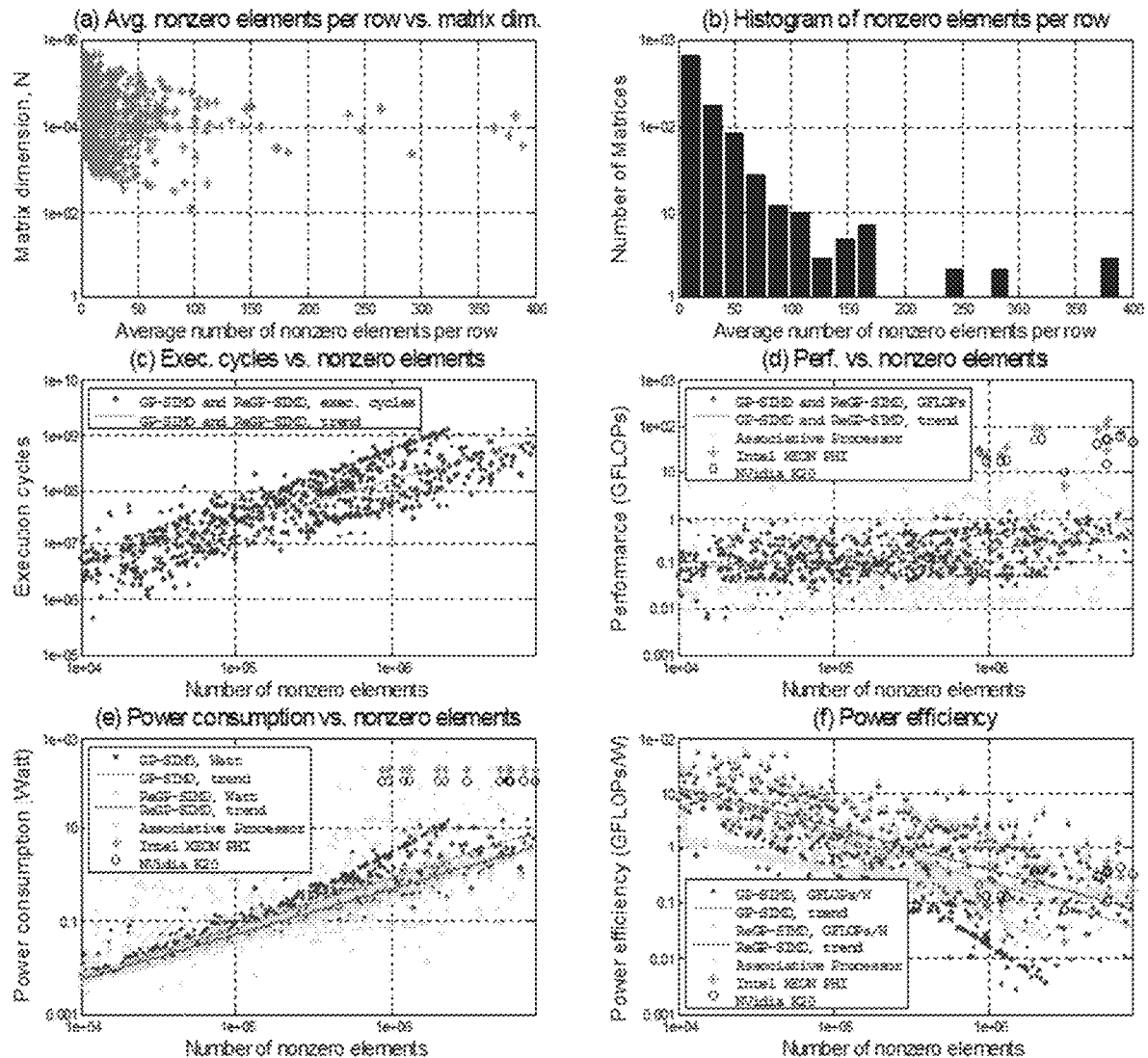
FIG. 27 illustrates results of simulations according to an embodiment of the invention.

In a large design comprising thousands of PUs, it is impractical to consider a complex network topology that would consume super-linear area. We thus assume a linear complexity ring topology interconnection network in all three architectures, where in CSIMD the network is 32 bit wide, and in GP-SIMD and AP, the network is 1 bit wide. In a ring topology, within O(N) serial steps, N PUs can exchange data according to any permutation. To simplify the analysis, CSIMD, AP and GP-SIMD analytical equations were consolidated into TABLE 7 of FIG. 27.

Conventional SIMD Processor

Figure 2:
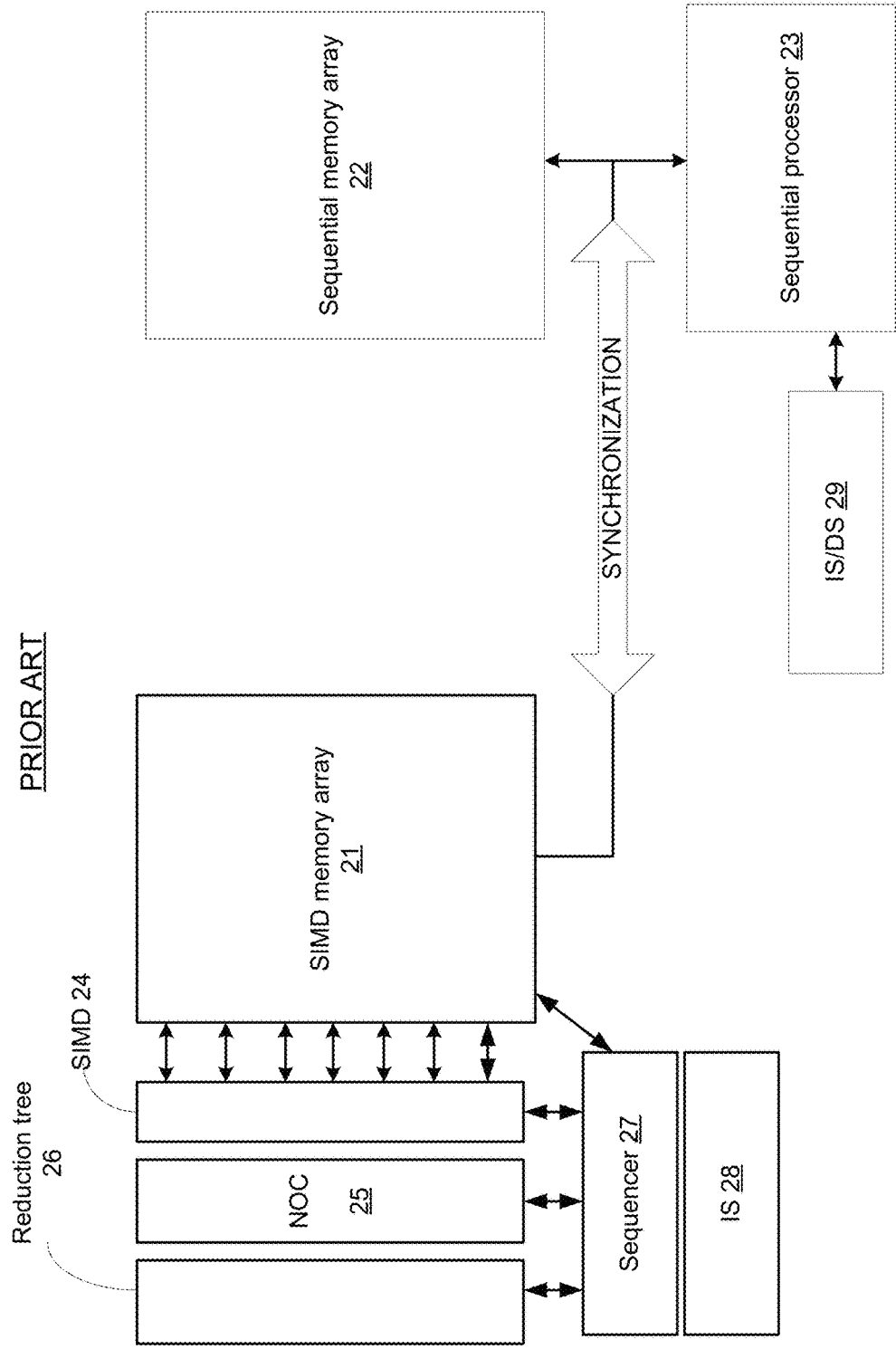
FIG. 2 illustrates a prior art computer.

A Conventional SIMD (CSIMD) co-processor is depicted on the left side of FIG. 2. The CSIMD coprocessor contains $n_{CSIMD}$ baseline PUs, each containing a floating point unit and a register file. The PUs are interconnected using an interconnection network. The PUs are also connected to the sequential processor shown on the right, through a bandwidth-limited interface (denoted by the red bus). Synchronization is moving data from the sequential processor to the CSIMD coprocessor before the parallel segment begins, and back from CSIMD after the parallel segment completes. Since it involves access to a shared resource, $T_{Sync-CSIMD}$ might depend on the number of PUs. The synchronization time can be expressed as in section (3) of table 4, where $C_{Sync}$ denotes the fraction of the workload that corresponding to synchronization overhead, and BW denotes the bandwidth (words per second) of the interface. The execution time of the workload on the CSIMD co-processor is section (6) of table 4, where $n_{CSIMD}$ is the number of CSIMD's Pus. The speedup of the CSIMD processor over the sequential CPU can be written as in section (9) of table 4.

The area of the CSIMD processor can be presented as in section (12) of table 4, where $A_{ALU}$ is the ALU area and $A_{RF}$ is the register file area. The inter-PU connection network is omitted for simplicity. For efficient comparison between PU and memory areas, we represent all area values (ALU, registers, memory) in terms of baseline SRAM cell area. Let the baseline SRAM cell area be 1. In 22 nm CMOS technology, the actual figure is in the range of 0.1 $\mu m^2$.

Then we can write the expression of section (15) of table 4, where $A_{CSIMDALUo}$ is the area of a single bit of a high speed parallel ALU and $A_{CSIMDRFo}$ is the area of a register bit (a flip-flop), both measured in baseline SRAM cell area units; m is data wordlength and k is the size of the register file. This model assumes that a floating point ALU is similar in area to a large integer multiplier. The model is quite simplistic and does not take into account numerous aspects of CSIMD design (instruction cache, communication and control, etc.). Its purpose is providing the best case reference figures for the comparative analysis of the CSIMD processor's speedup, area and power.

The average power of the CSIMD processor can be written as in section (17) of table 4, where $P_{Proc-CSIMD}$ is the average power consumed during a single processing operation; $P_{Inter}$ is the average power consumed during inter-PU communication; $P_{Sync-CSIMD}$ is the average power consumed during synchronization, and $P_{Leak-CSIMD}$ is the leakage power. Just as in the case of area comparison, we represent all power values (ALU, registers, memory) through the write power consumption of a baseline SRAM memory cell. Let the power consumption of the baseline SRAM cell during write from '0' to '1' or from '1' to '0' be 1. In 22 nm CMOS technology, the actual figure is in the range of 1 $\mu W$ at 4 GHz. Then we can further write the CSIMD power consumption as in section (20) of table 4, where $PC_{CSIMDALUo}$ and $P_{CSIMDRFo}$ are the average per-bit power consumptions of the ALU and RF respectively during computation. $P_{INTERo}$ is the per-bit power consumption during the inter-PU communication. $P_{SYNCo}$ is the per-bit power consumed during synchronization. $P_{Proc-CSIMD}$, $P_{Inter-CSIMD}$ and $P_{Sync-CSIMD}$ are measured in SRAM cell write power consumption units. Leakage power can be expressed as in section (26) of table 4, where A is the area, V is the supply voltage, $\alpha$ and $\beta$ are constants, and $\gamma$ is the leakage area coefficient that depends on silicon process and operating conditions.

Associative Processor

In this section we detail the analytical model for the speedup, area and power consumption of the Associative Processor (AP). AP is based on Content Addressable Memory (CAM), which allows comparing the stored data words to a key, tagging the matching words, and writing new data in tagged rows. AP is a non-von Neumann in-memory computing accelerator. The results of basic computing operations are pre-calculated and compiled into a sequence of AP instructions. The operands are stored in the CAM array. In response to an input combination, the result is written into the CAM, typically to multiple locations.

The architecture of AP 170 is presented in FIG. 17A. The Associative Processing Array (essentially a CAM) comprises of bit cells (denoted 172 in FIG. 17B) organized in bit-columns and word-rows. Typically, a word-row makes a Processing Unit (PU). Several special registers are appended to the associative processing array. The KEY register contains a key data word to be written or compared against. The MASK register defines the active fields for write and read operations, enabling bit selectivity. The TAG register marks the rows that are matched by the compare operation and may be affected by a parallel write. An optional interconnect switch allows the PUs within the AP to communicate in parallel. A Reduction Tree is an adder tree, enabling quick parallel accumulation of TAG bits (and of an array of numbers). An example of a CMOS based associative bit cell as well as the tag logic are shown in FIG. 17B.

SA is a small sense amplifier. A detailed AP design is presented in [0044]. In a conventional CAM, a compare operation is typically followed by a read of the matched data word. In AP, a compare is usually followed by a parallel write into the unmasked bits of all tagged rows. In a similar manner to GP-SIMD, a fixed-point m bit addition takes $16m \in O(m)$ cycles. Subtraction is performed similarly and also requires O(m) cycles.

Fixed point multiplication and division in AP require $O(m^2)$ cycles.

In a similar manner to GP-SIMD, the AP [0044] does not entail data synchronization unless the entire data set does not fit in the AP's memory array, thus, see section (4) of table 4. The execution time of the concurrent portion of the workload can be written as in section (7) of table 4, where $n_{AP}$ is the number of PUs in the AP, $S_{APe}$ is the speedup of associative PU relative to the CSIMD's PU. Lacking a-priori knowledge of the workloads to be executed on the AP, it is assumed that the worst case scenario comprising a continuous series of single precision floating point multiplications, which in one direct implementation takes 8800 cycles vs. a single cycle on the baseline CSIMD's PU. In this case $S_{APE}=1/8800$. The speedup of the AP can then be written as in (10).

The area of the AP can be written as in section (13) of table 4, where k is the width of the associative processor memory array (in m-bit data words) reserved for temporary storage, $A_{APTAGo}$ is the AP TAG cell area, $A_{APo}$ is the AP memory cell area, both measured in SRAM cell area units, and $2A_{ALUo}$ is the per-PU hardware reduction tree size, assuming the adders of each tree level are of growing word length [0044]. Similarly to the CSIMD coprocessor, we ignore the area of the interconnection network for simplicity.

The average power of the AP can be written as in (18), where $P_{Proc-AP}$ is the average power consumed during a single processing operation; $P_{Inter-AP}$ is the average power consumed during inter-PU communication; $P_{Sync-AP}$ is the average power consumed during synchronization when the entire data set does not fit in the AP, and $P_{Leak-AP}$ is the leakage power. In a similar manner to the previous section, we can further write the AP power consumption as in (21), where $P_{APo}$ is the average per-bit power consumptions of the AP during computation. $P_{INTER-o}$ is the per-bit power consumption during the inter-PU communication. $P_{SYNCo}$ is the per-bit power consumed during synchronization. $P_{Proc-AP}$, $P_{Inter-AP}$ and $P_{Sync-AP}$ are measured in SRAM cell write power consumption units. Leakage power can be expressed as in section (27) of table 4. Note that for comparison purposes we use the same leakage power formulation (represented as a function of area only as in section (26) of table 4) for both the AP and the CSIMD processor. This may overestimate AP power somewhat: First, the leakage power per area could be lower for memory than for logic. Second, APs have fewer hotspots. Since the leakage power is highly temperature dependent, hotspots may lead to higher leakage in the CSIMD processor.

GP-SIMD Processor

In this section we detail the analytical model for the speedup, area and power consumption of the GP-SIMD. As discussed above, the GP-SIMD does not entail data synchronization unless the entire data set does not fit in the GP-SIMD's memory array. Thus section (5) of table 4. The execution time of the concurrent portion of the workload can be written as in section (8) of table 4, where $n_{AP}$ is the number of PUs in the GP-SIMD, SIMD, $S_{GP-SIMDe}$ is the speedup of associative PU relative to the CSIMD's PU. Similar to the AP analysis, it is assumed that the worst case scenario comprising a continuous series of single precision floating point multiplications, which in one direct implementation takes 2500 cycles vs. 1 cycle on the baseline CSIMD's PU. In this case $S_{GP-SIMDe}=1/2500$. The speedup of the GP-SIMD can then be written as in section (11) of table 4.

It is assumed that the GP-SIMD's sequential processor accesses only the first L bits of the memory array. Thus, the average size of the memory bit cell is in section (14) of table 4, where k is the width of the GP-SIMD memory array (in m-bit data words) reserved for temporary storage, $A_{SHAREDo}$ is the shared memory cell area and $A_{SIMDONLYo}$ is the SIMD-only memory cell area, both measured in SRAM cell area units. The total area of the GP-SIMD can be written as in section (16) of table 4, where $A_{GPSIMDPUo}$ is the GP-SIMD processing unit cell area measured in SRAM cell area units, and $2A_{ALUo}$ is the per-PU hardware reduction tree size. Similarly to the CSIMD coprocessor and the AP, we ignore the area of the interconnection network for simplicity.

The average power of the GP-SIMD can be written as in section (19) of table 4, where $P_{Proc-GPSIMD}$ is the average power consumed during a single processing operation; $P_{Inter-GPSIMD}$ is the average power consumed during inter-PU communication; $P_{Sync-GPSIMD}$ is the average power consumed during synchronization when the entire data set does not fit in the AP, and $P_{Leak-GPSIMD}$ is the leakage power.

In a similar manner to the previous section, we can further write the GP-SIMD power consumption as in section (22) of table 4, where $P_{GPSIMDo}$ is the average per-bit power consumptions of the AP during computation. $P_{INTERo}$ is the per-bit power consumption during the inter-PU communication. $P_{SYNCo}$ is the per-bit power consumed during synchronization. $P_{Proc-GPSIMD}$, $P_{inter-GPSIMD}$ and $P_{Sync-GPSIMD}$ are measured in SRAM cell write power consumption units. Leakage power can be expressed as in section (28) of table 4.

Note that for comparison purposes we use the same leakage power formulation (represented as a function of area only as in section (26) of table 4) for the CS[MD, AP and GP-SIMD architectures. This might be somewhat unfair to the GP-SIMD: First, the leakage power per area could be lower for memory than for logic. Second, GP-SIMD, in a similar manner to AP, may have fewer hotspot found. Since the leakage power is highly temperature dependent, hotspots may lead to higher leakage in the CSMD processor. Note that the AP's arithmetic/logic performance is 2.5-5-lower than GP-SIMDs arithmetic performance, regardless of the number of processing elements, N.

Performance Under Constrained Area

Consider a given die total area, $A_{Total}$. The number of the CSIMD, AP and the GP-SIMD processing units can be found as in sections (26)-(28) of table 4. Substituting $n_{SIMD}$, $n_{AP}$ and $n_{GPSIMD}$ into the equations listed in the previous sub-sections, we determine the speedup and the power equations of each architecture. The area and power parameters we use for modeling purposes are listed in TABLE 4.

Figures 18A, 18B, 18C:
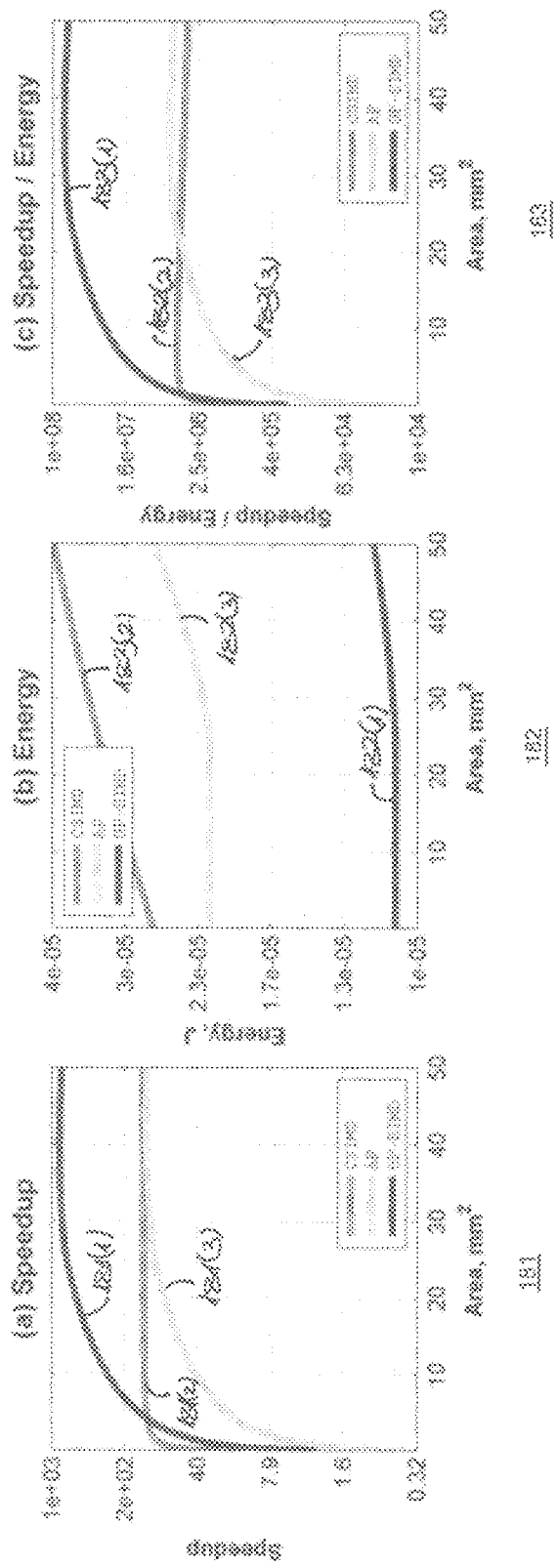
FIGS. 18A-C illustrate analytic results of various computers, including the hybrid computer, according to an embodiment of the invention.

Speedup vs. area for the CSIMD coprocessor, the AP and the GP-SIMD are shown in curves 181(1)-181(3) of graph 181 of FIG. 18A. For example, at 2 mm² about 500 reference floating point engines are enabled (including registers and other logic besides the ALUs) in the CSIMD processor, and dissipate about 8W. The portion of the workload dedicated for synchronization Csync, is assumed to be 0.03 (namely, synchronization takes 3% of the workload). Note that 3% is quite conservative, as for certain workloads such as DMM (Dense Matrix Multiplication), the CPU-GPU synchronization may consume 20% of the processing time. As the area budget increases, the speedup of the CSIMD coprocessor exhibits diminishing returns caused by synchronization, because the size of the data set grows while the CPUp⇔SIMD bandwidth remains fixed. After sufficient area becomes available the speedup saturates.

TABLE 4

Model Parameters

| Parameter | Description | Attributed to | Value |
|---|---|---|---|
| $A_{CSIMDALUo}$ | FP ALU bit cell area | CSIMD | 40 [1] |
| $P_{CSIMDALUo}$ | FD ALU bit cell power | CSIMD | 40 [1] |
| $A_{ALUo}$ | ALU cell area | All | 10 [1] |
| $P_{ALUo}$ | ALU cell power | All | 10 [1] |
| $A_{CSIMDRFo}$ | Register bit (FF) area | CSIMD | 3 [1] |
| $P_{CSIMDRFo}$ | Register bit (FF) power | CSIMD | 3 [1] |
| $S_{APe}$ | AP speedup relative to sequential CPU | AP | 1/8800 |
| $A_{APo}$ | AP bit cell area | AP | 2 [1] |
| $P_{APo}$ | AP bit cell power | AP | 4 [1] |

TABLE 4-continued

Model Parameters

| Parameter | Description | Attributed to | Value |
|---|---|---|---|
| $A_{APTAGo}$ | AP TAG cell area | AP | 1 [1] |
| $S_{GPSIMDe}$ | GP-SIMD speedup relative to sequential CPU | GP-SIMD | 1/2500 |
| $A_{SHAREDo}$ | GP-SIMD Shard bit cell area | GP-SIMD | 7/6 [1] |
| $A_{SIMDONLYo}$ | GP-SIMD SIMD-Only cell area | GP-SIMD | 5/6 [1] |
| $A_{GPSIMDPUo}$ | GP-SIMD PU area | GP-SIMD | 10 [1] |
| $P_{GPSIMDPUo}$ | GP-SIMD PU power | GP-SIMD | 10 [1] |
| $P_{INTERo}$ | GP-SIMD Intercommunication power | All | 200 [1] |
| $P_{SYNCo}$ | GP-SIMD Synchronization power | All | 200 [1] |
| m | Data word length | All | 32 |
| k | Register file size (in 32-bit words) | All | 8 |
| L | Sequential processor word length | GP-SIMD | 64 |
| γ | Statis power coefficient | All | 50 mW/mm² |
| $C_{Sync}$ | Workload portion dedicated for Synchronization | All | 3% |
| $C_{Inter}$ | Workload portion dedicated for inter-core communication | All | 0% |
| BW | Bandwith (number of 32b words per cycle) | CSIMD | 4 |

Area and power parameters are relative to the area and power of SRAM bit cell respectively; the values are based on typical standard cell libraries.

For smaller total area, the speedups of the AP and GP-SIMD are lower than the speedup of the CSIMD coprocessor. The breakeven point lies around 14 mm² for the GP-SIMD. Diminishing returns affect the GP-SIMD and AP speedups to a lesser extent than in the CSIMD, since they only occur when the data set does not fit into the internal memory array. Following [0044], to emphasize this effect, and for illustrative purpose only, it is assumed that that the data set size grows with the GP-SIMD and AP size respectively, and up until $A_{Total}$=25 mm² (at which point, $n_{GPSIMD}$=1.0×10⁶ and $n_{AP}$=5.3×10⁵) the GP-SIMD and AP internal memory array have just enough space to hold all necessary program variables. However, from that point on, both processors will have to exchange additional data with, for example, an external DRAM. It is assumed that for each additional processing unit beyond $A_{Total}$=25 mm², a single 32b data-word per 300 additional processing units will incur synchronization delay. These assumptions cause the GP-SIMD and AP speedup to saturate as well. Note that without this assumption, both GP-SIMD and AP Speedup would have continued to climb linearly with area. Thus, Off-chip bandwidth affects GP-SIMD in a similar manner to conventional GPUs. Note however, that at $A_{Total}$=25 mm² (just prior to saturation), the GP-SIMD provides speedup of 5.5× over the CSIMD, and 7× over the AP. The speedup factor over CSIMD continues to grow till the GP-SIMD saturates at $A_{Total}$=40 mm².

Energy vs. area is shown in curves 182(1)-182(3) of graph 182 of FIG. 18B. Energy of both GP-SIMD and AP is lower than that of the CSIMD processor. Note that even when the speedups saturate, energy continues to grow with area, due to addition of processing units and leakage.

The speedup/energy ratio vs. area is shown in curves 183(1)-183(3) of graph 183 of FIG. 18C. For the CSIMD processor, the speedup/energy ratio eventually drops because the speedup saturates while energy continues to grow with increasing area. As CSIMD's speedup saturates, both GP-SIMD and AP yield better speedup/energy ratios. With further area growth, the speedup/energy ratio of both the GP-SIMD and AP drop due to assumed saturation.

In general, GP-SIMD achieves higher performance than CSIMD due to CSIMD stalling on synchronization. GP-SIMD achieves higher performance-per-area than AP due to its lower memory cell area (~2×), allowing the integration of twice the amount of PUs and memory rows per a given area, and its faster floating point implementation (~3.5×) due to GP-SIMD arithmetic PU vs. associative-only PU of AP.

GP-SIMD Cycle-Accurate Simulation

The GP-SIMD, CSIMD and AP high level analytical models cannot be used for realistic simulations of known workloads, but are useful for early architectural design space exploration and trend analysis. In this section, we detail a home-grown cycle-accurate simulator of GP-SIMD, useful for the design and performance evaluation of real workload. Following [0046] and [0044], four workloads have been selected for performance and energy consumption simulations:

N-point Fast Fourier Transform (FFT)
N-option pairs Black-Scholes option pricing (BSC)
N-point Vector Reduction (VR)
Dense Matrix Multiplication of two $\sqrt{N}\times\sqrt{N}$ matrices (DMM)

Where N is the data set size, scaled for simplicity to the processor size (following the methodology suggested in and [0044]), i.e. N=$n_{GPSIMD}$. Note that simulations do not cover the cases where the data size exceeds the size of the processor (requiring data synchronization).

The workloads are hand-coded for the simulations. For FFT, we use optimized parallel implementation outlined in. For N point FFT, the sequential computing time is O(N log N). For N PU parallel implementation, computing time is reduced to O(log N). Following each computing step, N intermediate results need to be exchanged among the PUs. We thus assign each multiply-accumulate operation to a single PU. For Black-Scholes (BSC), we used a direct implementation. With sequential computing time of O(N), Black and Scholes option pricing requires no interaction between separate option calculations (Black and Scholes option pricing is an example of an 'embarrassingly parallel' task). We thus assign a single PU to handle a single call option of a single security at a single strike price and a single expiration time. Vector reduction (VR) is implemented using the software reduction tree where a single PU retains a single vector element. For $\sqrt{N}\times\sqrt{N}$ dense matrix multiplication (DMM), the sequential execution time is O($N^{3/2}$). The GP-SIMD DMM algorithm utilizes N PUs and yields parallel execution time of O(N), with $\sqrt{N}$ data elements being broadcast every step [0030]. The DMM algorithm employs the hardware reduction tree to accelerate multiple vector summations in parallel: at half the depth of the reduction tree, all $\sqrt{N}$ vector sums are available and are transferred directly to the sequential processor.

The simulator is cycle based, keeping records of the state of each register of each PU, and of the memory row assigned to it. Each command (for example, floating point multiply) is broken down to a series of fine-grain single bit PU operations. In a similar manner to SimpleScalar [006], the simulator also keeps track of the registers, buses and memory cells that switch during execution. With the switching activity and area power models of each baseline operation detailed in TABLE 4, the simulator tracks the total energy consumed during workload execution. We follow the area assumptions detailed in TABLE 4, and simulate speedup and power for growing datasets corresponding to growing number of PUs and hence growing total area.

Figures 19A, 19B, 19C:
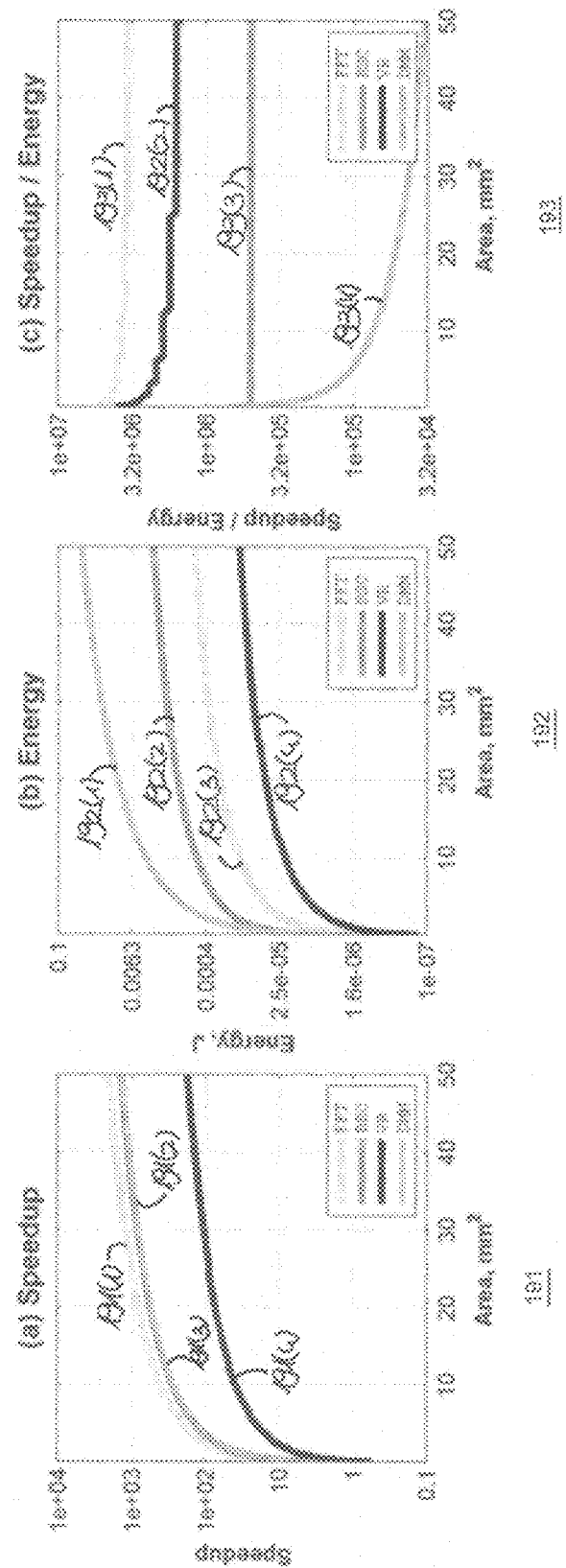
FIGS. 19A-C illustrate analytic results of various computers, including the hybrid computer, according to an embodiment of the invention.

Cycle-based simulated speedup is presented in curves 191(1)-191(4) of graph 191 of FIG. 19A.

Speedup is defined in section (11) of table 4. Energy consumption is shown in curves 192(1)-192(4) of graph 192 of FIG. 19B, with DMM being the most energy hungry benchmark.

Curves 193(1)-193(4) of graph 193 of FIG. 19C depict the speedup/energy ratio. Note the small discontinuities in FFT and VR charts, which are due to the fact that these algorithms are designed for specific data sizes (N integral power of 2). DMM shows the worst speedup/energy over all workloads. As BSC is an embarrassingly parallel workload, its speedup/energy ratio remains practically constant with growing data set size and area.

Sparse Matrix multiplication (SpMM) on GP-SIMD [0030] on a large set of matrices, demonstrated potentially improved power efficiency of 20× relative to a number of GPU designs. Specifically, GP-SIMD SpMM power efficiency ranges between 0.1-100 GFLOPS/W. SpMM power efficiency of GPUs such as NVidia's K20 and GTX660 is in the 0.1-0.5 GFLOPS/W range (as reported by references cited in [0030]). A wide variety of multi-core processors such as quad-core AMD Opteron 2214, quad-core Intel Xeon E5345, eight-core Sun UltraSparc T2+T5140 and eight-SPE IBM QS20 Cell reportedly reach SpMM power efficiency of up to 0.03 GFLOPS/W.

Resistive GP-SIMD

The resistive GP-SIMD employs a resistive shared memory array instead of the CMOS memory of the original GP-SIMD design [0031]. In this section, this application may illustrate the ReRAM memory crossbar array, symmetric two-dimensional access to memory in the resistive GP-SIMD, and the potential for multi-valued computations within the resistive memory array.

Resistive Memory Crossbar

One of the limitations of commercially available flash non-volatile memory is its low endurance. Flash cells may withstand around 100,000 write cycles before the wear begins to deteriorate the integrity of the storage [0040]. Further, endurance drops with scaling to smaller geometries, and modern multilevel 16 nm NAND flash are limited to ~2000 write cycles. The size and power consumption of circuits such as charge pump further limits flash scalability. As VLSI geometries get smaller, the yield and reliability of flash cells decrease dramatically [0034]. These limitations lead to the development of alternative nonvolatile memory technologies, such as Ferroelectric RAM (FeRAM), Magnetoresistive random access memory (MRAM), Spin-transfer torque random access memory (STT-RAM) potentially replacing MRAM, Phase-change memory (PRAM), Conductive-bridging RAM (CBRAM), and ReRAM, resistive random access memory. ReRAM consists of a normally insulating dielectric material that can be made to conduct through a filament or conduction path formed after the application of a sufficiently high voltage.

Once the filament is formed, it may be RESET (broken, resulting in high resistance state) or SET (re-formed, resulting in lower resistance state) by an appropriately applied voltage. Further promising features include low operating voltage, small cell area, and fast write time. To further increase ReRAM density, a crossbar structure is employed. In crossbar arrays, ReRAM cells are sandwiched between wordlines and bitlines, having area as small as $4F^2$ (where F is the feature size). Moreover, since a crossbar array permits a multilayered structure, its effective cell area may be further reduced [001][0013][0020].

The resistance of ReRAM is changed by applying electrical current or voltage. The resistance is bounded by a minimum resistance $R_{LRS}$ (low resistive state, logic '1') and a maximum resistance $R_{HRS}$ (high resistive state, logic '0'). Write reliability is a serious concern in ReRAM crossbar arrays: Voltage applied across a crossbar varies based on the location of the cell as well as the data pattern stored in other ReRAM cells in the array, due to wire resistance and sneak currents. To that end, several schemes for write operation have been proposed. When multiple cells are selected for write in a single row, it is impossible to complete the write operations (both SET and RESET) in one step. Thus, SET and RESET operations are separated into two steps: first SET is performed for all designated columns, followed by RESET of the other columns [0013]. Read operation is also affected by sneak current, especially when the selected cell of a row is in high resistance state and the others are in low resistance state [007]. In order to alleviate read disturbance, parallel read can be employed to read all the cells in the same row. A per-cell diode [001][0036] may be used is to terminate read and write sneak paths.

Figure 20A:
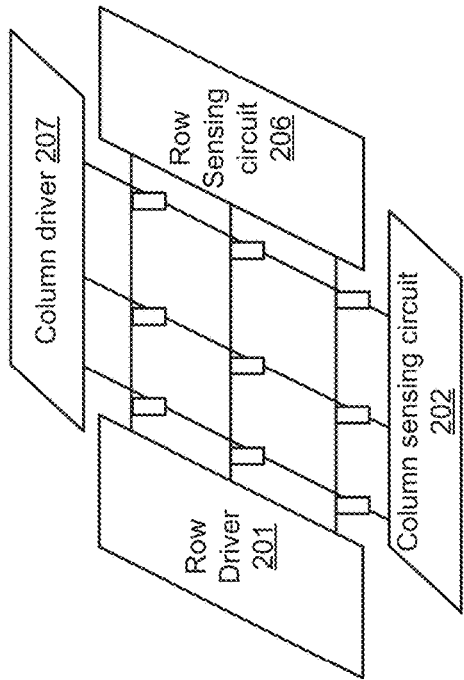
FIG. 20A illustrates a prior art crossbar.
Figure 20D:
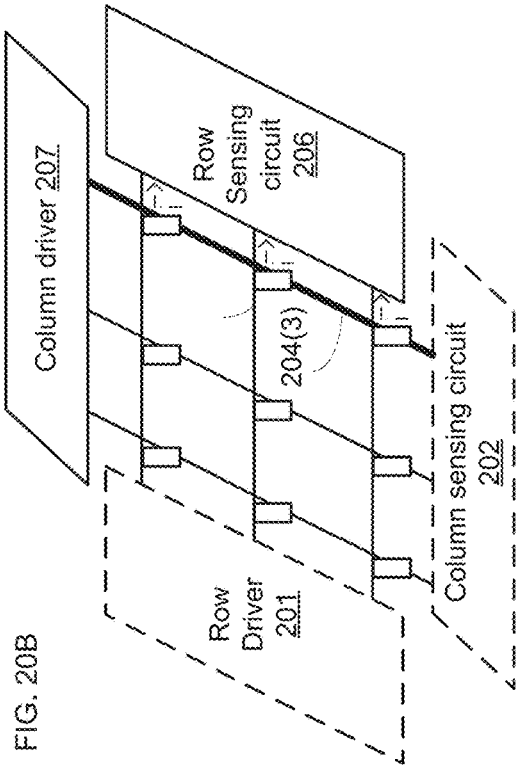
FIG. 20D illustrates an access of a SIMD processor to a crossbar of a hybrid processor according to an embodiment of the invention.
Figure 20C:
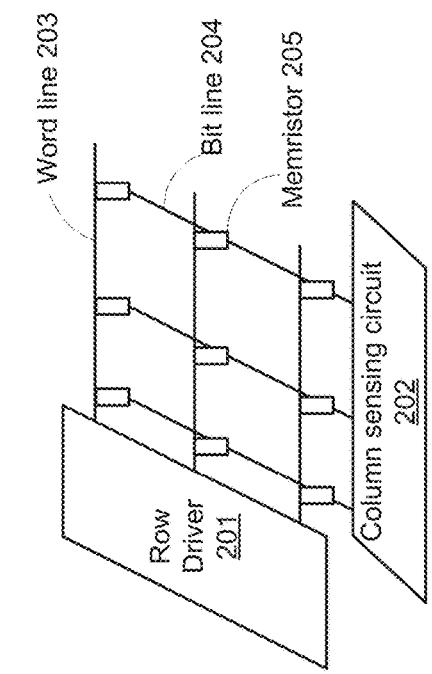
FIG. 20C illustrates an access of a sequential processor to a crossbar of a hybrid processor according to an embodiment of the invention.
Figure 20B:
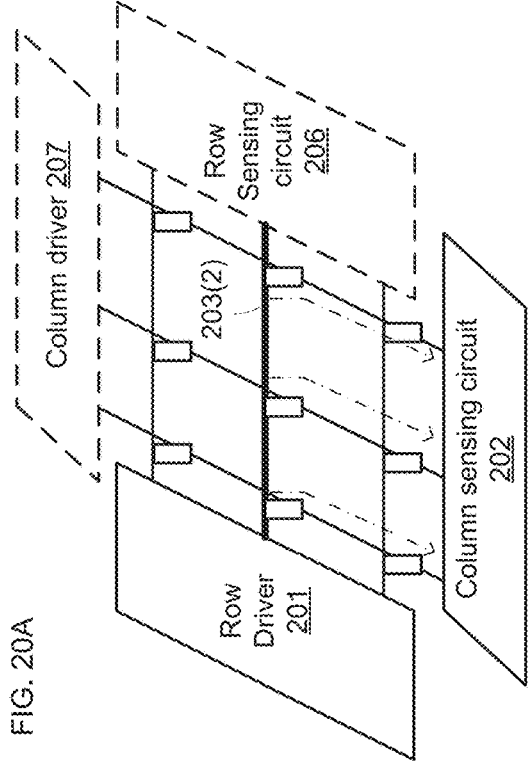
FIG. 20B illustrates a crossbar of a hybrid processor according to an embodiment of the invention.

A conventional resistive crossbar (FIG. 20A—includes memristors 205 connected between word lines 203 from row driver and between bit lines 204 of column sensing circuit 202) utilizes a single ReRAM device as its per-cell storage element. Access to the stored data is enabled by asserting a designated word_line and reading or writing from/to the crossbar columns. Such a crossbar implementation may have a row driver for address select, column drivers for pre-charging the bit_lines and column sensors for inferring the date during crossbar read access.

Symmetric 2-D Access to Resistive Shared Memory Array

We introduce a shared resistive memory crossbar array that facilitates row and column addressability. The conventional array (FIG. 20) is designed for access to columns of one row at a time.

There is provided a two-dimensional symmetric access array (FIG. 20B), each cell consists of a single ReRAM device (possibly incorporating a diode for preventing sneak paths).

There is provided a two-dimensional symmetric access array includes an array of memristors, wherein one end of the memristors is connected to word lines that are coupled to row driver 201 and row sensing circuit 206. Another end of the memristors are connected to bit lines that are coupled to column driver 207 and column sensing circuit 202.

It is designed to enable area efficient access to either the columns of one row (by the sequential processor) or to all rows of a single column (by the SIMD processor). The top level architecture of the resistive GP-SIMD (ReGP-SIMD) closely follows the CMOS based GP-SIMD architecture of FIG. 3, except that the storage element is ReRAM based. Two modes of shared memory access are enabled. First, the sequential processor can access a row (see FIG. 20C). Second, the SIMD processor can access a complete column, as in FIG. 20D. While in the shared CMOS array three transistors are needed to enable both modes of access (in addition to the storage 4-transistor latch itself), in ReRAM all that is needed is the storage node. The resistive storage element may be accessed from either of its two terminals, thus enabling symmetric two-dimensional access at much reduced area: $4F^2$, in contrast with $1904F^2$ required for the CMOS shared memory cell. Further, partitioning the memory array to Shared and SIMD-only sections (as used in the CMOS GP-SIMD) is no longer required for area savings.

Reading and writing the memory crossbar array by the sequential processor and the SIMD are interleaved. Depending on the current sequential processor instruction and SIMD microinstruction (namely, if there is access to the array), up to four operations out of the following six possibilities may take place during a single access, requiring either one read or two writes for each processor:

Sequential processor access (FIG. 20C):
1. Read: SIMD's row and column circuits are disconnected from the array. Sequential processor's column sensing circuits and row drivers are connected to the array. The bit_lines are precharged and the appropriate row driver corresponding to the sequential processors' addressed row grounds its word_line. Current flows from the bit_lines through all SET ReRAM devices connected to the grounded word_line. The columns sensing circuits sense changes on the bit_line, and output the corresponding bits to the sequential processor.
2. Write ones, SET: SIMD's row and column circuits are disconnected from the array. Sequential processor's row drivers are connected to the array. The bit_lines designated to be SET are grounded, and the appropriate row driver corresponding to the sequential processors' addressed row asserts its word_line. Current flows from the word_line through all designated ReRAM devices connected to the asserted bit_line, and sets them to low resistance.
3. Write zeros, RESET: SIMD's row and column circuits are disconnected from the array. Sequential processor's row drivers are connected to the array. The bit_lines designated to be RESET are asserted, and the appropriate row driver corresponding to the sequential processors' addressed row grounds its word_line. Current flows from the bit_lines through all designated ReRAM devices connected to the grounded word_line, and resets them to high resistance.

SIMD co-processor access (FIG. 20D):
1. Read: Sequential processor's row and column circuits are disconnected from the array. SIMD's Row sensing circuits and column drivers are connected to the array. The word_lines are precharged and the appropriate column driver corresponding to the SIMD co-processors' addressed column grounds its bit_line. Current flows from the word_lines through all SET ReRAM devices connected to that column. The rows sensing circuits sense changes on the word_lines, and outputs the corresponding bits to the SIMD PUs.
2. Write ones, SET: Sequential processor's row and column circuits are disconnected from the array. The SIMD's column drivers are connected to the array. The word-lines designated to be SET are grounded, and the appropriate column driver corresponding to the SIMD co-processors' addressed column asserts its bit_line. Current flows from the bit_line through all designated ReRAM devices connected to the asserted bit_line, and sets them to low resistance.
3. Write zeros, RESET: Sequential processor's row and column circuits are disconnected from the array. The SIMD's column drivers are connected to the array. The word_lines designated to be RESET are asserted, and the appropriate column driver corresponding to the SIMD co-processors' addressed column grounds its bit_line. Current flows from the word_lines through all designated ReRAM devices connected to the grounded bit_line, and resets them to high resistance.

Reading and writing by the SIMD or by the sequential processor are not concurrent. Thus, the SIMD sequencer may issue: (a) no access operation if the SIMD neither reads nor writes to the array; (b) a single access operation if the SIMD reads from the array; (c) two access operations if the SIMD writes to the array, and similarly for the sequential processor. Hence, zero to four shared memory operations are executed per a single clock cycle of the sequential processor (combining one SIMD memory operation and one memory operation of the sequential processor). The shared memory array is thus clocked with a frequency of four times the clock of the sequential and SIMD processor. That is, four distinct shared memory operations may be executed in a single sequential- or SIMD-processor cycle, and interleaving happens within that single clock cycle. Note that the interleaved addressing enables the sequential processor and the SIMD co-processor to read from and write to the shared memory without conflicts, as accesses are separated into distinct operation.

A more advanced implementation may allow the sequential processor to access the shared memory array on all four timeslots if the SIMD processor is not accessing it. However, our simulation and comparative analysis does not assume such implementation.

The GP-SIMD sequencer, depending on the combination of sequential and SIMD instructions being executed, selects from one to four operations. Note that the interleaved addressing enables the sequential processor and the SIMD co-processor to concurrently read from and write to the shared memory without conflicts, as accesses are separated into distinct operation.

In ReGP-SIMD, sneak currents affect both the read and write operations as in a standard ReRAM crossbar. The purpose of per-cell diode is to terminate such sneak paths. Note that the diode is placed above ReRAM and hence takes no additional area. Utilizing a ReRAM crossbar reduces ReGP-SIMD storage cell to $4F^2/k$ footprint (where k is the number of vertically integrated ReRAM layers [001]). Such level of integration allows placing 200M (k=1) 256-bit PU ReGP-SIMD on a single 200 $mm^2$ silicon die. To compare, the CMOS GP-SIMD cell area is approximately $190F^2$ [008], limiting the GP-SIMD to 8.2M PU in the same silicon area. Only the shared memory array scales with ReRAM. The PU however is implemented in CMOS, and thus limits the scalability of ReGP-SIMD.

The switching time of ReRAM may reach the range of a hundred picoseconds [0041], allowing memory access rates at frequencies of more than 1 GHz. The energy consumption of the resistive cell during read is less than 1fJ per bit. Unfortunately, the ReRAM write energy is in the range of a few tens of fJ per bit [008][0036], and in addition to the energy required by the PU CMOS logic [0031], prohibit scaling the ReGP-SIMD to 200M rows. However, write energy depends on the ReRAM material, and fortunately research of efficient ReRAM materials is likely to result in lower write energy consumption in the future. Further, resistive implementation of logic [0023] may result in a power- and area-efficient ReRAM PU. Another factor potentially limiting the use of ReGP-SIMD is the resistive memory endurance, which is in the range of $10^{12}$ [0032]. Given that during arithmetic operations with write operation typically occurring once every third cycle (taking vector add as an example, and considering only SIMD accesses to the array), the probability of a single bit to be written is $(1/256) \cdot (1/3) \approx 1 \cdot 10^{-3}$ per cycle. At 1 GHz, it limits the endurance-driven MTBF of a ReGP-SIMD to $\sim 1 \cdot 10^6$ sec, less than two weeks. However, recent studies predict that the endurance of resistive memories is likely to grow to the $10^{14}$-$10^{15}$ range, which may extend the endurance-driven MTBF of a ReGP-SIMD to a number of years.

A notable advantage of ReRAM is that it may be placed over logic and over other circuits [0026]. Moreover, the area over a single PU may accommodated about 500 resistive memory cells; if the per-PU shared memory word is 500 or fewer bits, there is no need for any area dedicated for memory, and the majority of the ReGP-SIMD area consists of PUs with shared memory overlaid on top. In addition to saving area, access time by the PU is significantly reduced because no long wires are needed.

This area reduction benefit is much more pronounced in processing-in-memory architectures than in other many-cores. For instance, if CMOS memory occupies 50% of the chip area in a many-core, replacing memory by resistive cells laid on top the logic might cut chip area by two; CMOS GP-SIMD memory occupies more than 95% of chip area and converting to ReGP-SIMD may result in area reduction by a factor of 20.

Single RERAM, Multi-Valued Adder/Subtracter

ReRAM cells may be able to store multi-valued data [0047]. The stored multi-valued data corresponds to the voltage and time interval the resistive cell was subjected to. Assume we can subject the resistive cell to a sequence of pulses, each timed to set the multi-valued cell to a number corresponding to powers of 2 (that is, 1, 2, 4, 8, 16 . . . ). If the dielectric material of the resistive cell can change from conductance state to insulating (and vice versa), a single resistive element can not only store a multi-valued data but also perform addition and subtraction.

Addition is performed by passing only the pulses corresponding to the bits that are set in the first operand, to the resistive cell storing the second operand. The voltage is applied in the direction that decreases the resistivity of the cell. Subtraction is performed by passing only the pulses corresponding to the bits that are set in the first operand, to the resistive cell storing the second operand. The voltage is applied in the direction that increases the resistivity of the cell. To exemplify this process, assume a resistive cell capable of storing four bits or 16 levels. We may subject the cell to four distinct pulses, each corresponding to the time interval it takes to set the cell to values 1, 2, 4, and 8, and to voltage applied per the operation direction (increase or decrease resistivity). Assume that the cell currently stores the value '1001', and we wish to subtract from it the value '0110'. Out of the four available voltage pulses, we pass the second and third pulses in the direction that increases the resistivity of the cell. At the end of the operation, the cell contains the value '0011'.

Subtraction and addition can be used to perform long multiplication and division. RESET is accomplished by reading the current multi-valued value and subtracting from it the negated value. This unique capability potentially transforms the resistive crossbar to massively parallel multi-cell processor grid, capable of executing many calculations in parallel, in a small die.

Simulations and Comparative Analysis

In this section, we evaluate power and performance of ReGP-SIMD and compare it to CMOS GP-SIMD. In our simulations, we use the previously reported GP-SIMD cycle-accurate simulator [0031]. The simulator employs the ReGP-SIMD performance and power figures obtained by SPICE simulations. We use CMOS 22 nm process with operating frequency of 2.5 GHz, and single precision floating point arithmetic. To evaluate ReRAM characteristics, we use the TEAM model [0022][0024][0045]. Access time to the shared memory by the SIMD PU is significantly shorter than in CMOS GP-SIMD, due to the elimination of long wires (all word bits are laid above the corresponding PU).

Access time for the sequential processor is the same in ReGP-SIMD as in the CMOS version; the memory is partitioned for this purpose[0031].

Dense Matrix Multiplication of a two $\sqrt{N} \times \sqrt{N}$ matrices (DMM) workload has been selected for our simulations, where N is the data set size, scaled for simplicity to the processor size, i.e., $N=n_{GPSIMD}$. Note that simulations do not cover the cases where the data size exceeds the size of the processor (requiring off-chip data synchronization). For $\sqrt{N} \times \sqrt{N}$ dense matrix multiplication (DMM), the sequential execution time is $O(N^3/2)$. The GP-SIMD DMM algorithm utilizes N PUs and yields parallel execution time of $O(N)$, with $\sqrt{N}$ data elements being broadcast every step [0030]. The GP-SIMD simulator is cycle based, recording the state of each register of each PU, and of the memory row assigned to it. Each command (for example, floating point multiply) is broken down to a series of fine-grain single bit PU operations. In a similar manner to SimpleScalar [006], the simulator also keeps track of the registers, buses and memory cells that switch during execution. With the switching activity and area power models of each baseline operation detailed in [0031], the simulator tracks the total energy consumed during workload execution.

We follow the assumptions detailed in [0031] and in section [00371], and simulate speedup and power for growing datasets corresponding to the growing number of PUs and hence growing total area. The number of PUs as a function of the GP-S[MD area for the CMOS and resistive designs are depicted in graph 211 of FIG. 21A. In all simulations, each PU is allocated with 256 memory bits. The matrix dimension W, as a function of GP-SIMD area for the CMOS and resistive designs are depicted in graph 212 of FIG. 21B. The number of simulated execution cycles and simulated performance as functions of die area are depicted in graphs 213 and 214 of FIG. 21B.

Figures 21A, 21B, 21C, 21D, 21E, 21F:
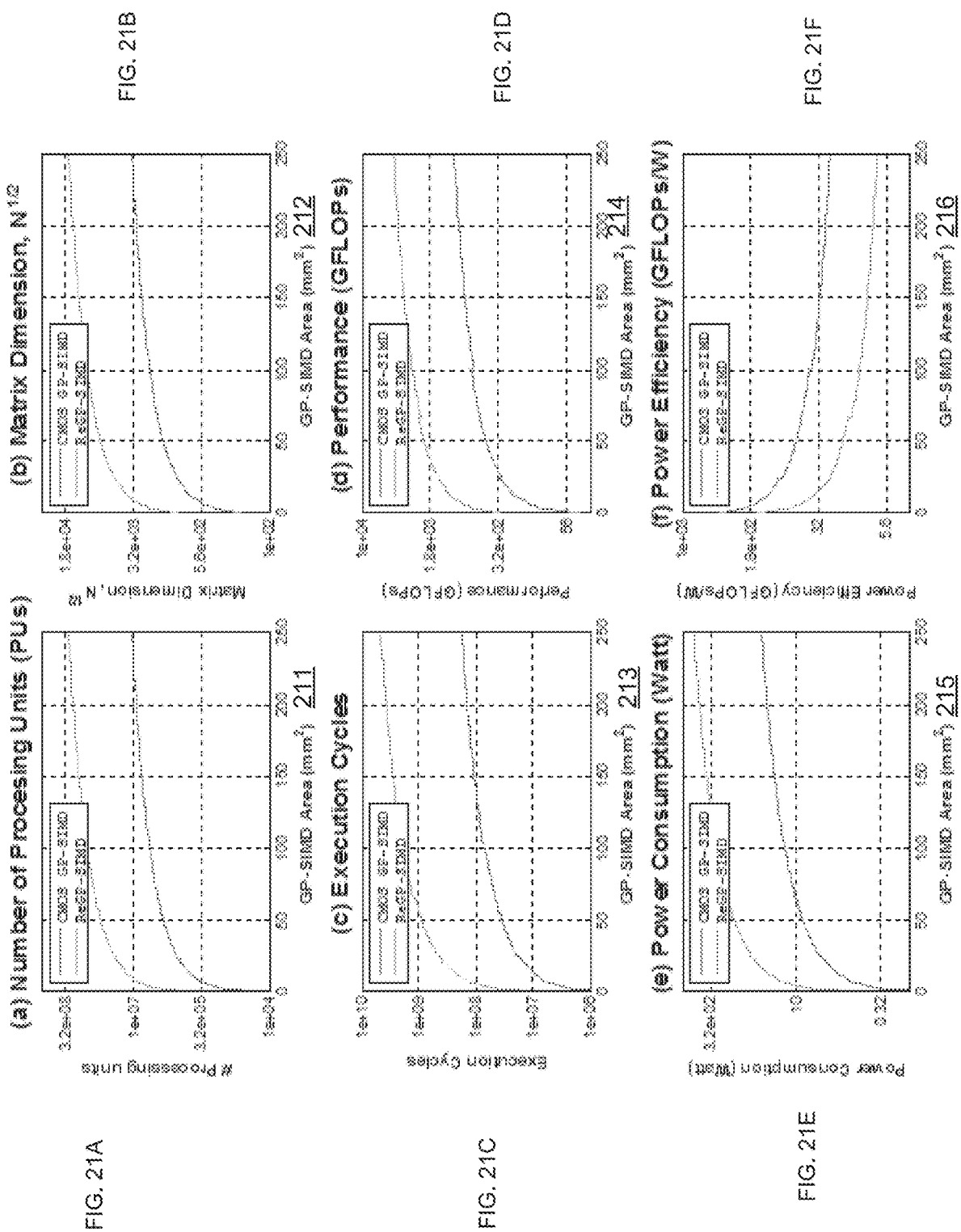
FIGS. 21A-F illustrate analytic results according to an embodiment of the invention.

The power consumption and the power efficiency result are depicted in graphs 215 and 216 of FIG. 21E and FIG. 21F. Performance and power in both versions grow linearly with area data and set size. At area of 200 mm$^2$, the CMOS GP-SIMD contains 8.2M PUs and achieves maximum DMM performance of 340 GFLOPS while consuming only 36.6W (TABLE 5). Given the same area, the ReGP-SIMD would consume unrealistic power of ~830W. At these figures, ReGP-SIMD achieves about 5 times the performance of the CMOS version, but only about one-fifth of its power efficiency.

TABLE 5

GP-SIMD vs. ReGP-SIMD (constrained area 200 mm$^2$)

| | Resistive | CMOS | Ratio |
| --- | --- | --- | --- |
| Die Area (mm ) | 200 | 200 | 1 |
| Number of PUs (×10$^6$) | 202 | 8.2 | 24.5 |
| Matrix Dimension ($\sqrt{N}$) | 14213 | 2873 | 4.9 |
| GFLOPS | 3909 | 851 | 4.6 |
| Power (W) | 496 | 32 | 15.5 |
| Power Density (W/mm$^2$) | 2.48 | 0.16 | 15.5 |
| Power Efficiency (GFLOPs/W) | 7.9 | 26.6 | 0.3 |

To address the high power requirement of ReGP-SIMD, we consider a version constrained to dissipating 150W in Table 2. It requires only 62 mm$^2$. A same area CMOS version achieves only ~1/25 of its density and ~1/5 of its performance. Power efficiency remains ~1:3 in favor of the CMOS GP-SIMD, but both versions exhibit better DMM power efficiency (50.8 and 15.2 GFLOPS/W) than NVidia GTX480 GPU (5 GFLOPS/W according to [0111] scaled to 22 nm CMOS).

Area and Power Constrained ReGP-SIMD

When both area and power constraints are applied, CMOS and resistive GP-SIMD exhibit the relative ratios shown in TABLE 9 (the cells in the table that are indicative of (a) die area of the CMOS GP-SIMD, and (b) the power of the resistive GP-SIMD shows the limiting factor of each architecture).

TABLE 8

|  | Resistive GP-SIMD | CMOS GP-SIMD | Ratio (Resistive/CMOS) |
|---|---|---|---|
| Die Area (mm$^2$) | 39 | 200 | 0.2 |
| Number of PUs (x10$^6$) | 39.4 | 8.3 | 4.8 |
| Matrix Dimension ($\sqrt{N}$) | 6276 | 2873 | 2.2 |
| GFLOPS | 721 | 340 | 2.1 |
| Power (W) | 151.4 | 36.6 | 4.1 |
| Power Density (W/mm$^2$) | 3.88 | 0.18 | 21.2 |
| Power Efficiency (GFLOPs/W) | 4.8 | 9.3 | 0.5 |

Subtraction and addition can be used to perform long multiplication and division. RESET is accomplished by reading the current multi-valued value and subtracting from it the negated value. This unique capability potentially transforms the resistive crossbar to massively parallel multi-cell processor grid, capable of executing many calculations in parallel, in a small die.

Cycle Accurate Simulation, SpMM

In the previous section, ReGP-SIMD and CMOS GP-SIMD were simulated using the compute intensive Dense Matrix Multiplication (DMM) benchmark. In this section, ReGP-SIMD and CMOS GP-SIMD are compared using a Sparse Matrix Multiplication (SpMM) benchmark, leading to irregular read and write patterns. Our cycle accurate simulation results are compared with those of nVidea K20 [0037], Intel XEON PHI [0037] and the Associative Processor (AP) [0044]. We followed the methodology outlined in [0030] and simulated 1,000 floating-point square matrices with the number of nonzero elements spanning from one hundred thousand to eight million, randomly selected from the collection of sparse matrices from the University of Florida [0014]. FIG. 27(a), (b) present the selected test-set.

As detailed in]28[, the sparse N×M matrix multiplication algorithm has a computational complexity of $O(N_{NNZ}MN_{NNZ} \log M)$, where $N_{NNZ}$ is the number of nonzero rows of the multiplier matrix A and $M_{NNZ}$ is the average number of nonzero elements per row (equal to number of nonzero elements of the multiplier matrix A, denoted by $A_{NNZ}$, divided by $N_{NNZ}$), and the efficiency grows with the number of multiplier matrix's average non-zero elements per row, and with the number of multiplicand matrix's columns. Further, GP-SIMD performance depends on data word-length rather than on data set size. If matrix elements are presented in a floating-point format, the word-length is 32 bit (IEEE754 single precision). Data set size in SpMM typically equals the number of nonzero elements in the sparse matrix.

Although the efficiency of the GP-SIMD SpMM algorithm [0030] grows with the number of columns of the multiplicand matrix, for fair comparison we limit our analysis to multiplicand matrices of 16 columns, as used in [0037]. Further, we assume that both ReGP-SIMD and CMOS GP-SIMD integrate 8 million PUs. We consider test-case sparse multiplier matrices having 1M columns or less and up to 8M nonzero elements, and dense multiplicand matrices having 16 columns. FIG. 22(c) presents the sparse by dense matrix multiplication execution times for these matrices.

The spread in execution times depicted in Figure (c) stems from the sensitivity of the GP-SIMD SpMM algorithm to the average number of non-zero elements per row. This sensitivity is shared, although possibly to a lesser extent, by conventional SpMV and SpMM implementations (on GPU or multi-core) [0021][0027]. Since the average of nonzero elements per row in our test-set is somewhat capped (see Figure (b)), as the number of nonzero elements grows, so does the average number of rows and columns of matrices. The execution time of Broadcast command (see [0030]) depends on both the number of columns of matrix A and the number of rows. As the matrix gets larger (large number of rows each having a small number of nonzero elements), the execution time hinders the power efficiency of GP-SIMD. For two matrices with a similar number of nonzero elements, the difference of two orders of magnitude in the average number of nonzero elements per row results in a similar difference in the execution time.

The performance of the GP-SIMD SpMM algorithm as a function of the average number of nonzero elements per row is presented in Figure (d). The figure demonstrates a close to logarithmic dependency of the GP-SIMD SpMM algorithm performance on the average number of nonzero elements per row. Hence, if the average number of nonzero elements per row is small (which is consistently the case in the University of Florida collection matrices), the effectiveness of the ReGP-SIMD and CMOS GP-SIMD SpMM algorithm is limited. Also shown in Figure (d) are performance data for AP and two commercial processors (Intel XEON-PHI and K20 [0037]). The simulated power consumption of the GP-SIMD SpMM and AP (as well as reported power of NVidia K20 [0015]) is presented in Figure (e).

The ReGP-SIMD and GP-SIMD SpMM power efficiency is in the range of 0.1 to 100 GFLOPS/W (Figure (f)) with ReGP-SIMD taking the lead thanks to power efficient resistive implementation. The power efficiency declines with the number of nonzero elements (requiring higher power consumption). The SpMM/SpMV power efficiency of advanced contemporary GPUs such as NVidia's K20 and GTX660 is in the 0.1-0.5 GFLOPS/W range [0015]. A wide variety of multicore processors such as quad-core AMD Opteron 2214, quad-core Intel Xeon E5345, eight-core Sun UltraSparc T2+T5140 and eight-SPE IBM QS20 Cell reportedly reach the SpMM power efficiency of up to 0.03 GFLOPS/W [0042]. Several FPGA SpMV and SpMM implementation were proposed (for example [0030][0012]), however these studies focused on optimization of performance or energy-delay, and power dissipation figures were not reported.

The ReGP-SIMD, GP-SIMD and AP power efficiency advantage stem from in-memory computing (there are no data transfers between processing units and memory hierarchies) and from low-power design made possible by the very small size of each processing unit.

GP-SIMD Vs. ReGP-SIMD Having Identical PU Count

At area of 196 mm$^2$, the CMOS GP-SIMD integrates 8.1M PUs and achieves maximum DMM performance of 337 GFLOPS while consuming only 35.9W. The Resistive GP-SIMD having the same number of PUs occupies only 8 mm$^2$ and achieves the same DMM performance of 337 GFLOPS while consuming only 29.4W (TABLE 6)

TABLE 6

GP-SIMD vs. ReGP-SIMD having identical
number of PUs, executing DMM

|  | Resistive GP-SIMD | CMOS GP-SIMD | Ratio (Resistive/CMOS) |
| --- | --- | --- | --- |
| Die Area (mm$^2$) | 8 | 196 | 0.04 |
| Number of PUs (×10$^6$) | 8.1 | 8.1 | 1 |
| Matrix Dimension ($\sqrt{N}$) | 2844 | 2844 | 1 |
| GFLGOPS | 337 | 337 | 1 |
| Power (W) | 29.4 | 35.9 | 0.8 |
| Power Density (W/mm$^2$) | 3.67 | 0.18 | 20.1 |
| Power Efficiency (GFLOPs/W) | 11.5 | 9.4 | 1.2 |

Given the same number of PUs, the CMOS GP-SIMD occupies area 24.5 times larger than the resistive version and achieves only about four-fifths of the power efficiency.

The significant area savings of ReGP-SIMD may outweigh the additional cost of the resistive layer making ReGP-SIMD the preferred solution for cost effective implementation.

Area Constrained ReGP-SIMD

At area of 200 mm$^2$, the CMOS GP-SIMD contains 8.2M PUs and achieves maximum DMM performance of 340 GFLOPS while consuming only 36.6W (TABLE). Given the same area, the ReGP-SIMD would consume unrealistic power of ~830W. At these figures, ReGP-SIMD achieves about 5 times the performance of the CMOS version, but only about one-fifth of its power efficiency.

TABLE 7

GP-SIMD vs. ReGP-SIMD (constrained
area 200 mm$^2$) executing DMM

|  | Resistive GP-SIMD | CMOS GP-SIMD | Ratio (Rsistive/CMOS) |
| --- | --- | --- | --- |
| Die Area (mm$^2$) | 200 | 200 | 1 |
| Number of PUs (×10$^6$) | 202 | 8.3 | 24.5 |
| Matrix Dimension ($\sqrt{N}$) | 14213 | 2873 | 4.9 |
| GFLOPS | 1564 | 340 | 4.6 |
| Power (W) | 830.3 | 36.6 | 22.7 |
| Power Density (W/mm$^2$) | 4.15 | 0.18 | 22.7 |
| Power Efficiency (GFLOPs/W) | 1.9 | 9.3 | 0.2 |

Power Ratio Analysis

CMOS GP-SIMD and the ReGP-SIMD software models are identical, and for the purpose of simulation, the very same code is executed on both, making the number of read/write operations to the shared memory array identical. TABLE 7 states that while the number of ReGP-SIMD PUs is 24.5× larger than the number of CMOS GP-SIMD for the same silicon area, power dissipation of ReGP-SIMD is only 22.7× higher than that of CMOS GP-SIMD. This effect is explained by observing DMM implementation on both architectures.

For large matrices, broadcast consumes the largest part of compute time.

Broadcast consists of many reads and a single write [0030]. Since the energy for reading ReRAM cells is significantly lower than reading CMOS memory, power increases less than the increase in the number of PUs.

Power Constrained ReGP-SIMD

To address the high power requirement of ReGP-SIMD, we consider a version constrained to dissipating 150W in TABLE 5. It requires only 39 mm$^2$. A same area CMOS version achieves only ~1/25 of its density and ~1/5 of its performance. Power efficiency remains ~1:5 in favor of the CMOS GP-SIMD, but both versions exhibit similar or better DMM power efficiency (23.6 and 4.8 GFLOPS/W) than NVidia GTX480 GPU (5 GFLOPS/W according to [0011] scaled to 22 nm CMOS).

TABLE 8

ReGP-SIMD (constrained power 150 W) and
CMOS GP-SIMD (same area) executing DMM

|  | Resistive P-SIMD | CMOS GP-SIMD | Ratio (Resistive/CMOS) |
| --- | --- | --- | --- |
| Die Area (mm$^2$) | 39 | 39 | 1 |
| Number of PUs (×10$^6$) | 39.4 | 1.6 | 24.5 |
| Matrix Dimension ($\sqrt{N}$) | 6276 | 1268 | 4.9 |
| GFLOPS | 721 | 149 | 4.8 |
| Power (W) | 151.4 | 6.3 | 24 |
| Power Density (W/mm$^2$) | 3.88 | 0.16 | 24 |
| Power Efficiency (GFLOPs/W) | 4.8 | 23.6 | 0.2 |
| GTXX480 Performance (GFLOPs/W) |  |  | 5 |

Area and Power Constrained ReGP-SIMD

When both area and power constraints are applied, CMOS and resistive GP-SIMD exhibit the relative ratios shown in TABLE 9 (the highlighted cells shows the limiting factor of each architecture).

TABLE 9

ReGP-SIMD (constrained power 150 W) and CMOS GP-SIMD
(constrained area 200 mm$^2$) executing DMM

|  | Resistive GP-SIMD | CMOS GP-SIMD | Ratio (Resistive/CMOS) |
| --- | --- | --- | --- |
| Die Area (mm$^2$) | 39 | 200 | 0.2 |
| Number of PUs (×10$^6$) | 39.4 | 8.3 | 4.8 |
| Matrix Dimension ($\sqrt{N}$) | 6276 | 2873 | 2.2 |
| GFLOPS | 721 | 340 | 2.1 |
| Power (W) | 151.4 | 36.6 | 4.1 |
| Power Density (W/mm$^2$) | 3.88 | 0.18 | 21.2 |
| Power Efficiency (GFLOPs/W) | 4.8 | 9.3 | 0.5 |

We note that the GP-SIMD retains the entire data structure (two large dense matrices, temporaries and program variables) on chip, and thus neither time nor power are spent for data exchange with off-chip memory. Note further that a 200M rows GP-SIMD array having 256 bits per row translate to 6.4 GByte on-chip memory. However, the architect may increase the number of bits per row to 475 (matching PU width) without changing the characteristics of ReGP-SIMD. Additional layers may be used to increase the overall ReGP-SIMD on-chip storage, further reducing off-chip communication bandwidth (and hence power) in cases of very large work-load. For example, a 200 mm$^2$ die may have 11.8 GByte (475 bits per row) on-chip storage, 23.6 GBytes with double ReRAM layer, and so on.

ReRAM Multi-valued Arithmetic

Multi-valued resistive memory may become available in the future [0029][0039][0010][0043][0047][0035]. Certain such devices may portray a linear range of operation: the resistivity may be set to a value k by applying a certain fixed voltage for time $kt_0$ (a 'pulse'), where to is a constant time unit. Moreover, the device is additive: If a first pulse lasting $k_1$ time units is followed by a second pulse lasting $k_2$ time units, the resulting stored value is $k_1 + k_2$ (as long as the result lies within the range of allowed values for the multi-valued device). Reading a multi-valued cell requires converting the voltage to a digital number, e.g. by means of an analog-to-digital converter at the periphery of the ReRAM array. Writing, on the other hand, calls for converting a digital number into pulse duration.

Addition may be performed by passing a timed voltage pulse corresponding to the first operand, to the resistive cell storing the second operand. The voltage is applied in the direction that decreases the resistivity of the cell. Subtraction is performed similarly, by applying the voltage in the opposite direction. To exemplify the accumulation process, assume a resistive cell capable of storing four bits or 16 levels. If the cell stores 9, and we wish to subtract 6, we subject the cell to a $6t_0$ voltage pulse in the direction that increases the resistivity of the cell. At the end of the operation, the cell contains 3. Since no carry operation is implemented, this is saturation arithmetic (note that we assume power-of-2 multi-valued cells).

The single bit ReRAM cell dissipates about 1fJ when driven from $R_{ON}$ to $R_{OFF}$ and vice versa. Multi-valued arithmetic requires driving the cells from and to levels within the ReRAM's dynamic range limited by $R_{ON}$ and $R_{OFF}$. Thus, a single cell arithmetic operation may dissipate up to 1fJ. However, the peripheral circuitry incorporates A/D converter for reading out the contents of the multi-valued cell, taking larger area and consuming more power. These parameters have been simulated and validated using the TEAM model [0022][0024][0045] and the SPICE simulator.

Figure 28:
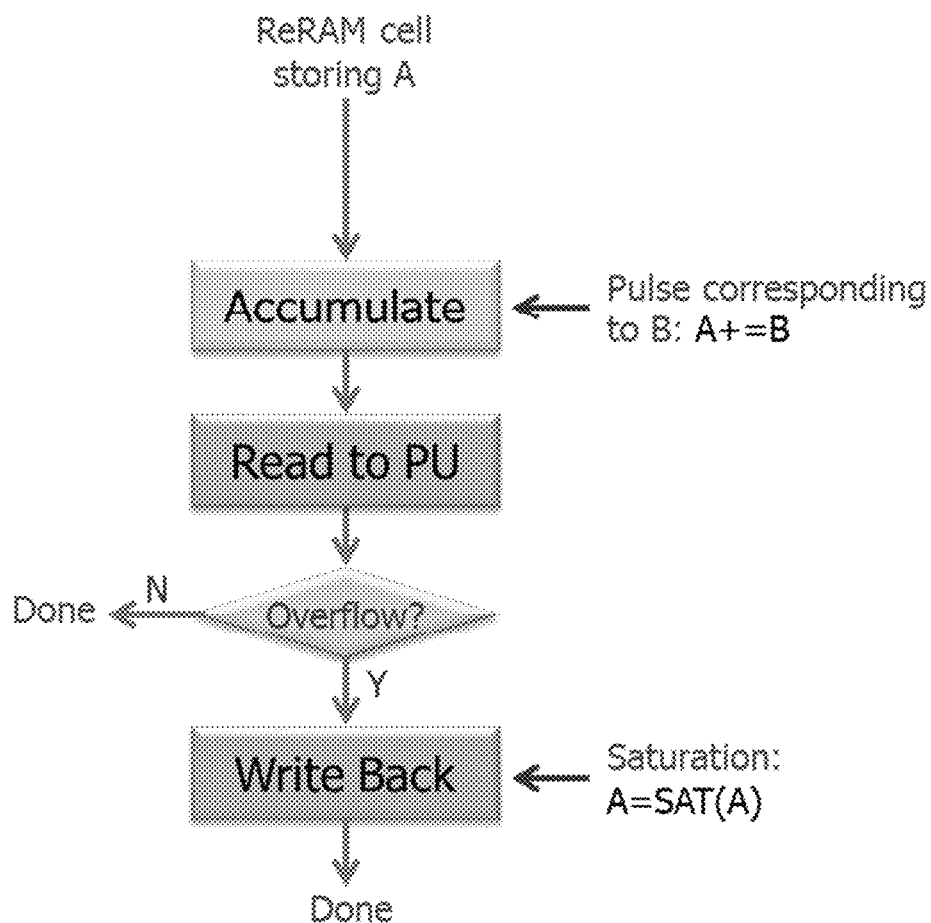
FIGS. 28-30 illustrate flow diagrams of various calculations according to embodiments of the invention.

Assume N bit multivalued ReRAM Cell storing a 2's complement binary number in which the last (most significant) bit represents the overflow ("O"), and the second to last bit represents sign ("S"). The addition and subtraction flow diagram is depicted in. Initially, the first operand (A) is stored in the ReRAM cell. The cell is then subjected to a timed pulse corresponding to the second operand (B). The cell accumulates both operands and retains the result in-place. The result is read back to the PU, and subsequently overflow condition is tested as follows:

The PU retains the sign bit of the operands (OPA_SIGN, OPB_SIGN) and result sign bit (RES_SIGN). Following arithmetic operation,
If (OPA_SIGN==OPB_SIGN==0) && (RES_SIGN==1)
//both operands are positive and the result is negative
Overflow detected
elseif (OPA_SIGN==OPB_SIGN==1) && (RES_SIGN=0)
//both operands are negative and the result is positive
Overflow detected
If(O==1)
 Reset "O" bit The overflow detection protects from overflowing the cell's dynamic range. If overflow is found, saturation is applied followed by write-back. When the overflow ("O" bit) becomes "1", the ReRAM is driven with sufficient interval to reset it back to zero, preserving the result that has not over-flown. Thus, fixed point m bit addition/subtraction consumes, worst case, four cycles, regardless of the ReGP-SIMD vector size. Note that we assume that it takes a single cycle to switch the resistive cell from low to high resistivity (i.e., from the value 0 to N−1 in N bit multivalued cell). A long word containing K bits (including the sign bit), where K>N−1, may be partitioned into L=[K/(N−1)] ReRAM cells. The long addition and subtraction flow diagram is depicted in FIG. 28. Initially, the first operand (A) is partitioned into l ReRAM cells (the sign bit is allocated only in the most significant cell). Addition of the first cell is performed in the same manner as above. If overflow is found, the overflow bit is reset and carried to the next cell. First the carry is added to that cell, followed by the second operand's N−1 bits. The process repeats until all L ReRAM cells are addressed. The last step is testing for saturation condition; if the last cell is saturated, all previous L−1 cells are set to saturation. Thus, fixed point K bit vector addition, where K>N−1, requires $6\times[K/(N-1)]+L+5\in O(K/(N-1))$ cycles, regardless of the ReGP-SIMD vector size.

Figure 29:
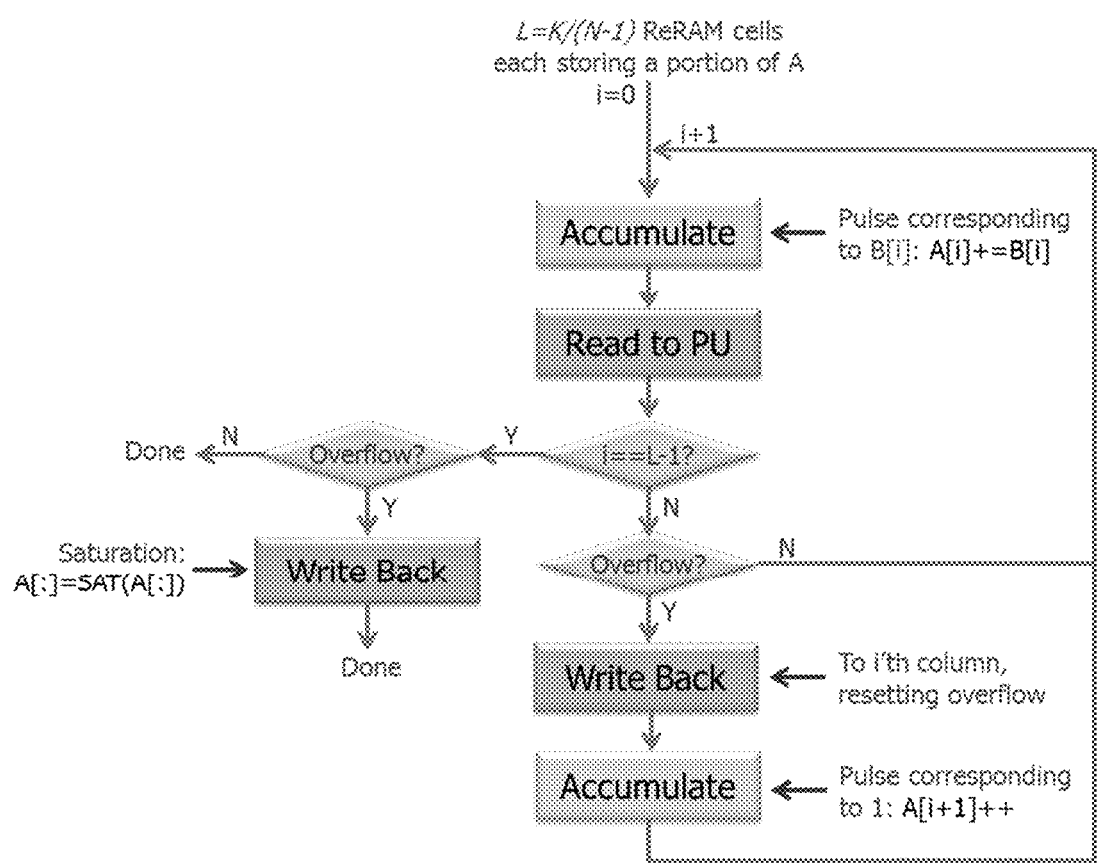

FIG. 29 illustrates in-cell (m×m) Multiplication takes 1+5m cycles

Figure 30:
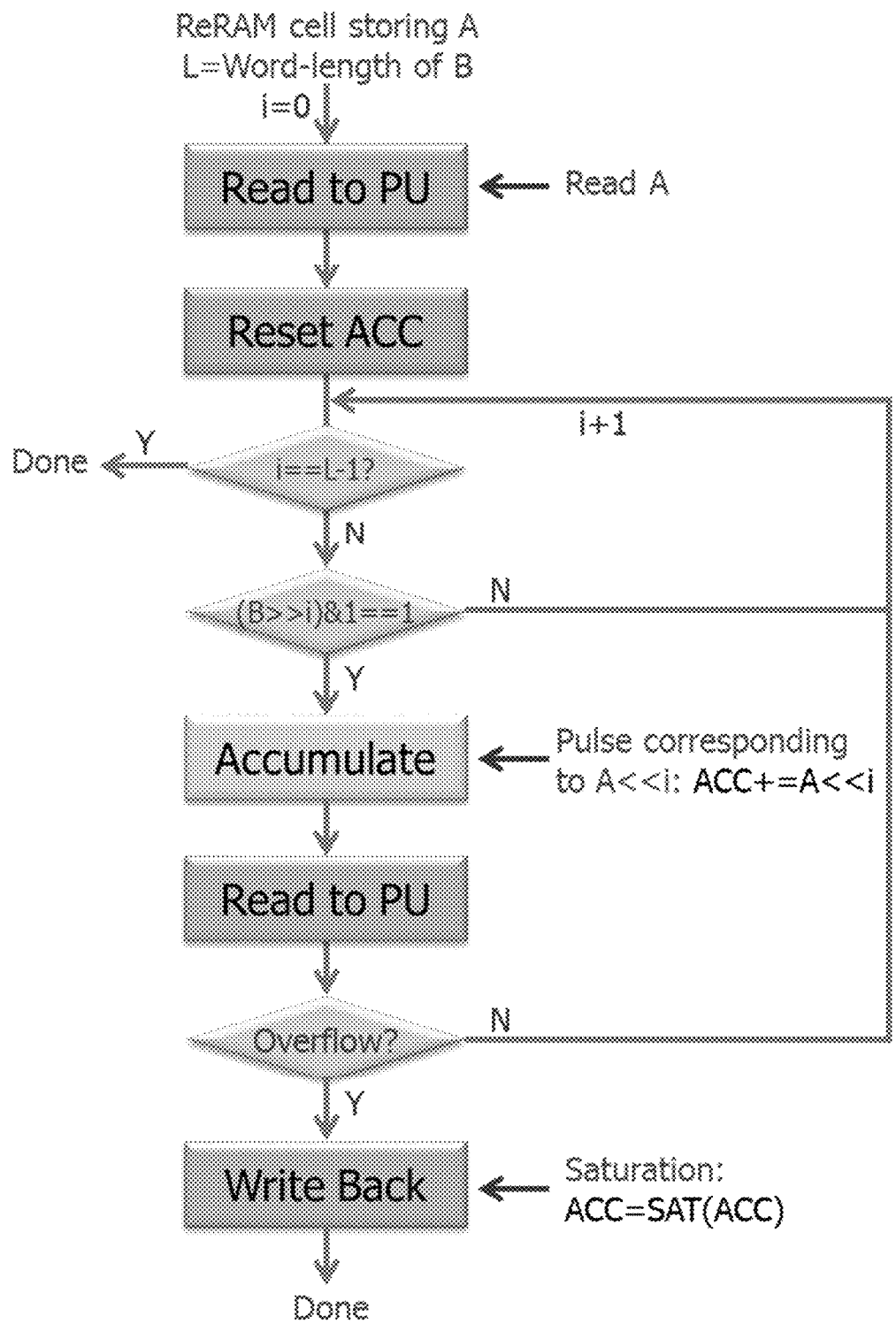

Fixed point single-cell multiplication and division in multi-valued ReGP-SIMD are computed serially, performing a series of add-shift and subtract-shift vector operations (see flow diagram in 29). When multiplying A×B, and assuming the product may be stored in a single ReRAM cell (that is, $\log_2 A \times B < N-1$), both operands are fetched to the PU. If the $i^{th}$ bit of B is one, the operand A (left-shifted by i places) is added to the accumulator which resides in the ReRAM. For each i, the loop takes five cycles. Thus, fixed point m×m bit vector multiplication requires $1+5m \in O(m)$ cycles. The above may be extended to long word operands following the flow-diagram of FIG. 30. Cell reset is accomplished by reading the content of the multi-valued cell and adding to it the negated 2's complement content. The fixed point single-cell multiplication may be extended to fixed point long word multiplication in a similar manner to long word addition.

The potential energy and area savings of multi-valued ReRAM computation is a promise worth investigating. In a standard 45 nm CMOS process, a register file access consume 6pJ (12pJ for read and write) while an 8 bit integer addition consume only 0.03pJ [0017]. The total 8 bit load/add/store operation thus entails 12.03pJ. With an 8 bit multi-bit ReRAM cell, the energy for the same operation is expected to be less than 1fJ, four orders of magnitude lower energy than typical CMOS. More so, the addition is performed on a tiny $4F^2$ cell, with processing time similar to SRAM cell access time.

This ReRAM multi-valued arithmetic capability can potentially transform the resistive crossbar to a massively parallel multi-cell processor grid, capable of executing many calculations in parallel, in a small footprint. Further, multi-valued arithmetic may significantly improve ReGP-SIMD power efficiency as the operations are performed right on the cell, concurrently for the entire cell-column, rather than moving information in bit-wise manner back and forth between the cell-column and the PUs.

CONCLUSIONS

GP-SIMD architecture combines a general purpose sequential processor and a massive parallel SIMD co-processor with a large shared memory array. Since the shared memory is accessible by both processors, data is not transferred (synchronized) back and forth between separate memories of the two processors. Unlike conventional processors or SIMD accelerators, GP-SIMD's core component (and by far, the largest area-wise) is the shared memory array, thus it stands to benefit the most from a reduced bit-cell architecture offered by a resistive crossbar.

This paper explores a resistive design of the GP-SIMD (ReGP-SIMD), which has the potential to scale the GP-SIMD from a few millions of PUs to a few hundred millions of PUs on a single silicon die. In resistive GP-SIMD, a novel resistive row and column addressable $4F^2$ crossbar is utilized, replacing the modified CMOS $190F^2$ SRAM storage previously proposed for GP-SIMD architecture. We find that PiM architectures and specifically, GP-SIMD, benefit more than other many-core architectures from using resistive memory.

Our simulations show that although high power density and finite endurance of the ReRAM and the CMOS PU limit the potential of ReGP-SIMD, it allows significantly better scalability and performance as compared to a CMOS GP-SIMD as well as other conventional SIMD accelerators. Future progress in ReRAM technologies is likely to offer continuous scalability, improved power efficiency, and higher endurance for ReRAM and thus further enhance ReGP-SIMD. A hybrid CMOS-memristor PUs are possible to further scale the ReGP-SIMD. Additional notable advantage is the placement of the PUs under the resistive shared memory crossbar leading to a significant area savings over the CMOS GP-SIMD. Finally, we noted that the large ReGP-SIMD on-chip memory helps to reduce the latency and power consumption of addressing an off-chip memory.

A conceptual multi-valued arithmetic in a single resistive storage device is explored. Such a device can potentially transform the resistive crossbar to massively parallel multi-cell processor grid, capable of executing a large amount of calculations in parallel, in a small die. Future research is needed to optimize such devices and to devise PiM architectures that realize and extend these density and performance potentials.

In resistive GP-SIMD, a novel resistive row and column addressable $4F^2$ crossbar is utilized, replacing the modified CMOS $190F^2$ SRAM storage previously proposed for GP-SIMD architecture. We find that PiM architectures and specifically, GP-SIMD, benefit more than other many-core architectures from using resistive memory.

GP-SIMD is a novel processor architecture that combines a general purpose sequential processor, a massively parallel SIMD array, and a large memory shared by both processors. The shared memory may be accessed simultaneously by the sequential processor (providing a row address and accessing the data columns) and by the SIMD processor (providing a column address while each processing unit, PU, accesses a memory row). Thus, data do not need to be transferred (synchronized) back and forth between separate memories of the two processors.

CMOS GP-SIMD is compared with two other massively parallel, processing-in-memory (PIM) architectures: Conventional SIMD (CSIMD) employing separate memories for the SIMD and sequential processors and requiring data synchronization (the SIMD array comprising a moderate number of FPUs, a-la GPU), and an Associative Processor (AP) combining storage and processing in each cell. Comparison is made by means of analytical study, and a cycle-accurate simulator is employed to validate performance and energy of four benchmarks on GP-SIMD.

GP-SIMD speedup grows faster with area than that of CSIMD due to finer granularity of its processing unit, resulting in more processing units per equivalent area. GP-SIMD speedup also grows faster with area than that of the Associative Processor due to the finer granularity of its storage elements, resulting in larger memory per equivalent area. Unlike CSIMD, the performance of GP-SIMD depends on the data word-length rather than data set size. As area budget grows beyond the speedup breakeven point, the GP-SIMD's energy remains below that of the CSIMD coprocessor, and it thus outperforms CSIMD in terms of speedup/energy ratio over a broad spectrum of area and power budget for workloads with high data-level parallelism. In general, GP-SIMD achieves higher performance than CSIMD due to CSIMD stalling on synchronization. GP-SIMD achieves higher performance-per-area than AP due to its lower memory cell area, allowing the integration of twice the amount of PUs and memory rows per given area, and its more than twice faster floating point implementation due to GP-SIMD arithmetic PU vs. associative-only PU of AP. GP-SIMD however is not universally efficient. While yielding high speed up when implementing fine-grain massively data-parallel workloads (such as sparse linear algebra and machine learning algorithms), its efficiency is much lower under workloads with low data-level parallelism, or where little or no data synchronization is required. To conclude, GP-SIMD architecture may achieve significantly higher performance or power efficiency over other conventional architectures.

GP-SIMD architecture combines a general purpose sequential processor and a massive parallel SIMD co-processor with a large shared memory array. Since the shared memory is accessible by both processors, data is not transferred (synchronized) back and forth between separate memories of the two processors. Unlike conventional processors or SIMD accelerators, GP-SIMD's core component (and by far, the largest area-wise) is the shared memory array, thus it stands to benefit the most from a reduced bit-cell architecture offered by a resistive crossbar.

This application explores a resistive design of the GP-SIMD (ReGP-SIMD), which has the potential to scale the GP-SIMD from a few millions of PUs to a few hundred millions of PUs on a single silicon die. Our simulations show that although high power density and finite endurance of the ReRAM and the CMOS PU limit the potential of ReGP-SIMD, it allows significantly better scalability and performance as compared to a CMOS GP-SIMD as well as other conventional SIMD accelerators. Future progress in ReRAM technologies is likely to offer continuous scalability, improved power efficiency, and higher endurance for ReRAM and thus further enhance ReGP-SIMD. A hybrid CMOS-memristor PUs are possible to further scale the ReGP-SIMD. Additional notable advantage is the placement of the PUs under the resistive shared memory crossbar leading to a significant area savings over the CMOS GP-SIMD. Finally, we noted that the large ReGP-SIMD on-chip memory helps to reduce the latency and power consumption of addressing an off-chip memory.

A conceptual multi-valued arithmetic in a single resistive storage device is explored. Such a device can potentially transform the resistive crossbar to massively parallel multi-cell processor grid, capable of executing a large amount of calculations in parallel, in a small die. Future research is needed to optimize such devices and to devise PiM architectures that realize and extend these density and performance potentials.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A hybrid computer that comprises a sequential processor, a single instruction massively parallel (SIMD) processor, and shared memory module that is configured to store shared data that is shared between the sequential processor and the SIMD processor; wherein the sequential processor is configured to access data in the shared memory module during an execution of sequential segments of a workload; and wherein the SIMD processor is configured to access the data in the shared memory module during an execution of parallelizable segments of the workload; wherein the SIMD processor comprises a sequencer and processing units that comprise register files, wherein the sequencer is configured to control data transfers from the shared memory to the SIMD by broadcasting a conditional micro-instruction to the processing units, wherein an execution of at least one conditional micro-instruction by a processing unit is conditioned by a single bit register and wherein the conditional micro-instruction comprises a multi-bit field that is indicative of a type, out of multiple types, of the conditional micro-instruction.

2. The hybrid computer according to claim 1 wherein the shared memory module is configured to support row access to rows of the shared memory module and to support column access to columns of the shared memory module; and wherein the SIMD processor is arranged to perform a row access of the shared memory module while the sequential processor is arranged to perform a column access of the shared memory module.

3. The hybrid computer according to claim 1 wherein the SIMD processor and the sequential processor are arranged to concurrently access the shared memory module.

4. The hybrid computer according to claim 1 wherein the SIMD processor and the sequential processor are arranged to access the shared memory module in an interleaved manner without a timing overlap, wherein an access of the shared memory module by the SIMD processor and an access of the sequential processor to the shared memory modules are separated into distinct operations.

5. The hybrid computer according to claim 1 wherein the shared memory module comprises at least one SIMD memory region that is writable only by the SIMD processor and at least one sequential processor memory region that is writable only by the sequential processor.

6. The hybrid computer according to claim 1 wherein the shared memory module comprises at least one SIMD memory region that is writable only by the SIMD processor.

7. The hybrid computer according to claim 1 wherein the shared memory module comprises at least one SIMD memory region that is writable only by the SIMD processor; wherein the sequential processor is configured to read content stored in the SIMD memory region.

8. The hybrid computer according to claim 1 wherein the shared memory module comprises at least one SIMD memory region that is writable only by the SIMD processor; wherein the sequential processor is prevented from reading content stored in the SIMD memory region.

9. The hybrid computer according to claim 1 wherein the shared memory module comprises shared memory cells that are shared by the SIMD processor and by the sequential processor, and non-shared memory cells that are accessed only by one of the SIMD processor and the sequential processor; wherein the shared memory cells comprises more transistors than the non-shared memory cells.

10. The hybrid computer according to claim 1 wherein the shared memory module comprises shared memory cells that are shared by the SIMD processor and by the sequential processor, and non-shared memory cells that are accessed only by one of the SIMD processor and the sequential processor; wherein at least some shared memory cells are coupled to at least four control lines.

11. The hybrid computer according to claim 1 wherein the shared memory module comprises at least one sequential processor memory region that is writable only by the sequential processor; wherein the SIMD processor is configured to read content stored in the sequential processor memory region.

12. The hybrid computer according to claim 1 wherein the sequential processor is configured to control an access of the SIMD processor to the shared memory module.

13. The hybrid computer according to claim 1 wherein the SIMD processor comprises multiple processing units that are configured to operate in parallel to each other.

14. The hybrid computer according to claim 1 wherein the SIMD processor comprises multiple one bit processing units.

15. The hybrid computer according to claim 1 wherein the SIMD processor comprises multiple multi-bit processing units.

16. The hybrid computer according to claim 1 wherein the sequencer is configured to issue commands to at least some of the multiple processing units, an interconnect and a network on chip (NOC) unit.

17. The hybrid computer according to claim 1 wherein the sequencer is configured to issue commands to at least some of the multiple processing units, a reduction tree and a network on chip (NOC) unit.

18. The hybrid computer according to claim 1 wherein the SIMD processor comprises multiple processing units and a reduction tree, wherein the reduction tree comprises a group of adders that are coupled to each other and to outputs of the multiple processing units.

19. The hybrid computer according to claim 1 wherein the SIMD processor comprises multiple processing units, each processing unit comprises an adder, multiple registers, and a function generator.

20. The hybrid computer according to claim 1 wherein the SIMD processor comprises multiple one bit processing units, each one bit processing unit comprises a one bit adder, multiple one bit registers, and a one bit function generator.

21. The hybrid computer according to claim 1 wherein the SIMD processor comprises a first number (N1) of processing units, wherein the SIMD processor is arranged to perform arithmetic operations on vectors that have a second number (N2) of elements by performing multiple iterations of N1 length arithmetic operations; wherein N2 exceeds N1.

22. The hybrid computer according to claim 1 wherein the SIMD processor comprises a first number (N1) of processing units, wherein the SIMD processor is arranged to perform a search for a key within a vector of a second number (N2) of elements by performing multiple compare operations with different segments of the vector wherein a length of the key does not exceed N1 and wherein N2 exceeds N1.

23. The hybrid computer according to claim 1 comprising a group of SIMD processors, wherein the shared memory module is virtually segmented to a group of shared memory segments; wherein each SIMD processor of the group of SIMD processors is arranged to access a single shared memory segment of the group of shared memory segments.

24. The hybrid computer according to claim 1 comprising a group of SIMD processors, wherein the shared memory module is virtually segmented to a group of shared memory segments; wherein the sequential processor is arranged to access to each shared memory segment of the group of shared memory segments; wherein each SIMD processor of the group of SIMD processors is arranged to access a single shared memory segment of the group of shared memory segments.

25. The hybrid computer according to claim 1 wherein the shared memory module comprises memory cells that comprise memristive devices.

26. The hybrid computer according to claim 1 wherein the shared memory module comprises shared memory cells that are accessible to both the SIMD processor and to the sequential processor; wherein the shared memory cells comprise memristive devices and diodes.

27. The hybrid computer according to claim 1 wherein the shared memory module comprises shared memory cells that are accessible to both the SIMD processor and to the sequential processor; wherein the shared memory cells comprise memristive devices; wherein one end of each shared memory cell is coupled to SIMD processor access circuits and wherein another end of each shared memory cell is coupled to sequential processor access circuits.

28. The hybrid computer according to claim 1 wherein the SIMD processor comprises multiple processing units that comprise memristive devices.

29. The hybrid computer according to claim 1 wherein the shared memory module and the SIMD processor are integrated and comprise memristive devices that are configured to operate as memory cells and to perform arithmetic operations.

30. The hybrid computer according to claim 1 wherein the shared memory module comprises memory cells that comprise multiple bit memristive devices.

31. The hybrid computer according to claim 1 wherein SIMD processor and the shared memory module are integrated and comprise combined memory and computation cells; wherein each memory and computation cell comprises a memristive device; wherein the hybrid computer is configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device.

32. The hybrid computer according to claim 1 wherein SIMD processor and the shared memory module are integrated and comprise combined memory and computation cells; wherein each memory and computation cell comprises a memristive device; wherein the hybrid computer is configured to perform a subtraction operation of first and second operands, using a certain memristive device of a certain combined memory and computation cell, by storing in the certain memristive device a value that corresponds to the second operand and feeding the certain memristive devices with one or more programming pulses that correspond to the first operand in a direction that increases a resistivity of the certain memristive device.

33. The hybrid computer according to claim 1 wherein SIMD processor and the shared memory module are integrated and comprise combined memory and computation cells; wherein each memory and computation cell comprises a memristive device; wherein the hybrid computer is configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device; wherein the hybrid computer is configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device; wherein the hybrid computer is configured to perform long multiplications and long divisions by repeating subtraction and addition operations.

34. The hybrid computer according to claim 1 wherein SIMD processor and the shared memory module are integrated and comprise combined memory and computation cells; wherein each memory and computation cell comprises only a single memristive device; wherein the hybrid computer is configured to perform an addition operation of first and second operands, using a certain memristive device of a certain combined memory and computation cell, by storing in the certain memristive device a value that corresponds to the second operand and feeding the certain memristive devices with one or more programming pulses that correspond to the first operand in a direction that decreases a resistivity of the certain memristive device; wherein the hybrid computer is configured to perform a subtraction operation of the first and second operands, using the certain memristive device, by storing in the certain memristive device the value that corresponds to the second operand and feeding the certain memristive devices with one or more programming pulses that correspond to the first operand in a direction that increases the resistivity of the certain memristive device.

35. A hybrid computer that comprises a sequential processor, a single instruction massively parallel (SIMD) processor, and shared memory module that is configured to store shared data that is shared between the sequential processor and the SIMD processor; wherein the sequential processor is configured to access data in the shared memory module during an execution of sequential segments of a workload; and wherein the SIMD processor is configured to access the data in the shared memory module during an execution of parallelizable segments of the workload, wherein the hybrid computer is configured to perform dense matrix multiplication of a first matrix (A) by a second matrix (B), wherein during the performing of the dense matrix multiplication the sequential processor is configured to match row elements of the second matrix with corresponding column elements of the first matrix; wherein the match is executed as a sequence of associative operations; and wherein the SIMD processor is configured to multiply pairs of matched row elements of the second matrix by the corresponding column elements of the first matrix to provide singleton products and to add single products together.

36. A hybrid computer that comprises a sequential processor, a single instruction massively parallel (SMD) processor, and shared memory module that is configured to store shared data that is shared between the sequential processor and the SMD processor; wherein he sequential processor is configured to access data in the shared memory module during an execution of sequential segments of a workload; and wherein the SMD processor is configured to access the data in the shared memory module during an execution of parallelizable segments of the workload, wherein the hybrid computer is configured to perform sparse matrix multiplication of a first matrix (A) by a second matrix (B), wherein during the performing of the sparse matrix multiplication the sequential processor is configured to match row elements of the second matrix with corresponding non-zero column elements of the first matrix; wherein the match is executed as a sequence of associative operations; and wherein the SMD processor is configured to multiply pairs of matched row elements of the second matrix by the corresponding column elements of nonzero columns of the first matrix to provide singleton products and to add single products together.

* * * * *